(12) United States Patent
Babcock et al.

(10) Patent No.: US 12,271,887 B2
(45) Date of Patent: Apr. 8, 2025

(54) QR CODE INITIATIVE: FRAUD DETECTION

(71) Applicant: PayPal, Inc., San Jose, CA (US)

(72) Inventors: Patrick Babcock, Sturbridge, MA (US); Laura Clark, Charlotte, NC (US); Oscar Charles Edward Sanderson, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/095,449

(22) Filed: Nov. 11, 2020

(65) Prior Publication Data

US 2022/0147970 A1 May 12, 2022

(51) Int. Cl.
*G06Q 20/00* (2012.01)
*G06Q 20/20* (2012.01)
(Continued)

(52) U.S. Cl.
CPC ....... *G06Q 20/3274* (2013.01); *G06Q 20/204* (2013.01); *G06Q 20/40145* (2013.01); *G06Q 20/4015* (2020.05); *G06Q 20/4016* (2013.01)

(58) Field of Classification Search
CPC ............. G06Q 20/204; G06Q 20/3274; G06Q 20/4015; G06Q 20/40145
See application file for complete search history.

(56) References Cited

U.S. PATENT DOCUMENTS 8,905,303 B1 * 12/2014 Ben Ayed ............ G06Q 20/401
   235/375
8,985,437 B2   3/2015 Burkhart et al.
(Continued)

FOREIGN PATENT DOCUMENTS

CA    2781512 A1    12/2012
WO    2020/172471 A1    8/2020

OTHER PUBLICATIONS

Security in Next Generation Mobile Payment Systems: A Comprehensive Survey, IEEE (Year: 2021).*
(Continued)

*Primary Examiner* — Bruce I Ebersman
(74) *Attorney, Agent, or Firm* — Greenberg Traurig, LLP

(57) ABSTRACT

Systems, computer-implemented methods, apparatus, and/or computer program products that can facilitate electronic generation of enhanced, transaction-based QR codes for improved fraud detection are provided. In various aspects, a processor can receive a signal from an electronic beacon of a point-of-sale device, wherein the signal includes information associated with a first merchant. In various instances, in response to receiving the signal from the electronic beacon, the processor can identify a quick response (QR) code from a set of quick response codes that corresponds to the first merchant. In various cases, the processor can render the identified QR code on an electronic display that is scannable by the point-of-sale device, wherein scanning the identified QR code causes the point-of-sale device to transmit the identified QR code and a second merchant identifier to a payment processor. In various aspects, the processor can receive a transaction confirmation based on a verification of a transaction completed using the identified QR code from the payment processor, wherein the verification is based on determining that the identified QR code corresponds to the merchant identifier transmitted by the point-of-sale device. In various embodiments, the identified QR code can correspond to other types of verification data (e.g., geo-location stamps, time stamps, product or service identifiers, price identifiers).

17 Claims, 40 Drawing Sheets

(51) Int. Cl.
*G06Q 20/32* (2012.01)
*G06Q 20/40* (2012.01)

(56) References Cited

U.S. PATENT DOCUMENTS

| | | | |
|---|---|---|---|
| 9,082,052 B2 | 7/2015 | Rodriguez et al. | |
| 9,195,848 B2 | 11/2015 | Davis et al. | |
| 10,079,811 B2 | 9/2018 | Davis et al. | |
| 10,572,783 B2 | 2/2020 | Studnicka | |
| 10,592,883 B2* | 3/2020 | Priebatsch | G06Q 20/202 |
| 10,891,647 B2* | 1/2021 | Gantert | G06Q 20/3224 |
| 10,970,714 B2* | 4/2021 | Campos | G06Q 20/3276 |
| 11,250,414 B2* | 2/2022 | Khan | G06Q 20/3223 |
| 11,334,883 B1* | 5/2022 | Auerbach | G06Q 20/223 |
| 2008/0127331 A1 | 5/2008 | Seidman et al. | |
| 2009/0106645 A1* | 4/2009 | Knobel | G06F 16/4393 |
| | | | 715/236 |
| 2010/0218087 A1* | 8/2010 | Knobel | G06F 16/435 |
| | | | 715/236 |
| 2011/0053574 A1 | 3/2011 | Rice | |
| 2011/0251892 A1* | 10/2011 | Laracey | G06Q 20/20 |
| | | | 705/16 |
| 2012/0004965 A1* | 1/2012 | Satyavolu | G06Q 20/387 |
| | | | 705/14.25 |
| 2012/0188442 A1 | 7/2012 | Kennedy | |
| 2012/0211567 A1 | 8/2012 | Herzig | |
| 2014/0058815 A1* | 2/2014 | Hiremath | G06Q 20/384 |
| | | | 705/14.17 |
| 2014/0081861 A1* | 3/2014 | Berland | G06Q 10/087 |
| | | | 705/44 |
| 2014/0129422 A1* | 5/2014 | Zhou | G06Q 40/03 |
| | | | 705/38 |
| 2014/0143037 A1* | 5/2014 | Zhou | G06Q 30/0226 |
| | | | 705/14.17 |
| 2014/0143089 A1* | 5/2014 | Campos | G06Q 20/28 |
| | | | 705/26.8 |
| 2015/0066613 A1* | 3/2015 | Zhou | G06Q 20/321 |
| | | | 705/14.12 |
| 2015/0088757 A1* | 3/2015 | Zhou | G06Q 30/0209 |
| | | | 705/73 |
| 2015/0154597 A1* | 6/2015 | Bacastow | G06Q 20/26 |
| | | | 705/72 |
| 2015/0161638 A1* | 6/2015 | Chapman, Jr. | G07F 17/3237 |
| | | | 705/14.12 |
| 2015/0178721 A1 | 6/2015 | Pandiarajan et al. | |
| 2015/0248664 A1* | 9/2015 | Makhdumi | G06Q 20/3274 |
| | | | 235/380 |
| 2015/0248696 A1* | 9/2015 | Fernandez | G06Q 30/0268 |
| | | | 705/14.51 |
| 2015/0310417 A1* | 10/2015 | Syed | G06Q 20/322 |
| | | | 705/39 |
| 2015/0339696 A1* | 11/2015 | Zhou | G06Q 20/322 |
| | | | 705/14.23 |
| 2015/0371215 A1 | 12/2015 | Zhou et al. | |
| 2016/0055474 A1* | 2/2016 | Syed | H04W 4/029 |
| | | | 705/39 |
| 2016/0125458 A1* | 5/2016 | Enriquez | G06Q 30/0267 |
| | | | 705/14.27 |
| 2016/0171486 A1* | 6/2016 | Wagner | G06Q 20/326 |
| | | | 705/39 |
| 2016/0189137 A1* | 6/2016 | Zhou | G06Q 20/3267 |
| | | | 705/14.34 |
| 2016/0260075 A1* | 9/2016 | deKozan | G06Q 20/36 |
| 2016/0275471 A1* | 9/2016 | Rajamannar | G06Q 20/321 |
| 2016/0275482 A1* | 9/2016 | Zhou | G06Q 30/0267 |
| 2016/0275483 A1* | 9/2016 | Zhou | H04B 1/385 |
| 2016/0314452 A1* | 10/2016 | Pochic | G06Q 20/322 |
| 2017/0053301 A1* | 2/2017 | Khan | G06Q 30/0222 |
| 2017/0076262 A1* | 3/2017 | Xing | G06Q 30/0267 |
| 2017/0098210 A1* | 4/2017 | Laracey | G06Q 20/3224 |
| 2017/0116601 A1* | 4/2017 | Lore | G06Q 20/3825 |
| 2017/0116635 A1* | 4/2017 | Gantert | G06Q 30/0226 |
| 2017/0243262 A1* | 8/2017 | Pan | G06Q 20/3224 |
| 2017/0334062 A1* | 11/2017 | Allen | B25J 5/02 |
| 2018/0005220 A1* | 1/2018 | Laracey | G06Q 20/3278 |
| 2018/0039968 A1 | 2/2018 | Collinge et al. | |
| 2018/0253718 A1* | 9/2018 | Khan | G06Q 20/326 |
| 2018/0330361 A1* | 11/2018 | Marra | G06F 21/35 |
| 2019/0026768 A1* | 1/2019 | Coli | H04W 4/00 |
| 2019/0034683 A1 | 1/2019 | Giordano et al. | |
| 2019/0205865 A1 | 7/2019 | Jamkhedkar et al. | |
| 2019/0230505 A1 | 7/2019 | Stimm et al. | |
| 2019/0236594 A1* | 8/2019 | Ehrlich-Quinn | G06Q 20/401 |
| 2019/0303909 A1* | 10/2019 | De la Torre | G06Q 20/351 |
| 2019/0325407 A1 | 10/2019 | Zhou et al. | |
| 2020/0058047 A1* | 2/2020 | Khan | G06Q 20/3227 |
| 2020/0098018 A1* | 3/2020 | Narula | G06Q 20/363 |
| 2020/0126080 A1* | 4/2020 | Bacastow | G06Q 20/26 |
| 2020/0134665 A1* | 4/2020 | Enriquez | G06Q 30/0226 |
| 2020/0279245 A1 | 9/2020 | Venkat et al. | |
| 2021/0035086 A1* | 2/2021 | Khan | G06Q 20/204 |
| 2021/0350096 A1* | 11/2021 | Filter | G06K 7/1456 |
| 2021/0365968 A1* | 11/2021 | Narula | G06Q 30/0201 |
| 2021/0374715 A1* | 12/2021 | Bergeron | G06K 19/07769 |
| 2021/0406868 A1* | 12/2021 | Brightman | G06K 19/06037 |
| 2022/0101304 A1* | 3/2022 | Kang | G06Q 20/3276 |
| 2022/0147966 A1 | 5/2022 | Babcock | |
| 2022/0148009 A1* | 5/2022 | Vyas | G06K 7/1413 |

OTHER PUBLICATIONS

A 2D Barcode-Based Mobile Payment System, IEEE (Year: 2009).*
International Search Report and Written Opinion received for International PCT Application Serial No. PCT/US2021/057864 dated Feb. 2, 2022, 15 pages.
Dodson et al., "Secure, Consumer-Friendly Web Authentication and Payments with a Phone", Mobicase, LNICST, vol. 76, 2012, pp. 17-38.
International Search Report and Written Opinion received for International PCT Application Serial No. PCT/US2021/051377 dated Dec. 16, 2021, 15 pages.
Chen, Alexander N; Zeltmann, Steven M; Griffin, Ken; Rubach, Michael; Ellis, Michael E. Trends and Technology in E-Payment. Competition Forum; Indiana vol. 17, Iss. 2, (2019): 402-412. (Year: 2019) (U.S. Appl. No. 17/095,467, unavailable for download in Patent Center).
Non-final Office Action from U.S. Appl. No. 17/095,467, dated Aug. 22, 2023, 28 pp.
Final Office Action for U.S. Appl. No. 17/095,449, mailed on Feb. 23, 2023, 48 pages.
International Preliminary Report on Patentability for Application No. PCT/US2021/057864 mailed on May 25, 2023, 11 pages.
Final Office Action from U.S. Appl. No. 17/095,467, dated Feb. 2, 2024, 11 pp.

* cited by examiner

QR CODE INITIATIVE: FRAUD DETECTION

TECHNICAL FIELD

The subject disclosure relates generally to quick response (QR) codes, and more specifically to computing devices that employ enhanced, transaction-based QR codes for improved privacy and fraud detection.

BACKGROUND

Conventionally, when a commercial transaction occurs between a first entity (e.g., a buyer, user, consumer, client, customer) and a second entity (e.g., a seller, merchant, vendor, product/service provider), computerized payment processing systems and/or techniques can be used to facilitate and/or transfer payment from the first entity to the second entity. Such conventional computerized payment processing systems and/or techniques generally involve the first entity presenting a financial instrument (e.g., a credit card, a debit card) to the second entity at a point-of-sale device (e.g., a credit card reader and/or scanner). The point-of-sale device reads/scans the financial instrument to extract payment information (e.g., credit card account number, bank account number) that is encoded on and/or within the financial instrument (e.g., encoded on and/or within the financial instrument via a microchip and/or via a magstripe). The point-of-sale device can subsequently transmit the extracted payment information to a payment processing system for processing, and the payment processing system can relay the extracted payment information to a transaction settlement system for settlement (e.g., to actually facilitate the transfer of funds from an account associated with the first entity to an account associated with the second entity). Such conventional computerized payment processing systems and/or techniques are vulnerable to fraud and/or misuse by the first entity, and are generally static and un-customizable by the first entity.

Systems and/or techniques that can ameliorate one or more of these issues are desirable.

DETAILED DESCRIPTION

Figure 1:
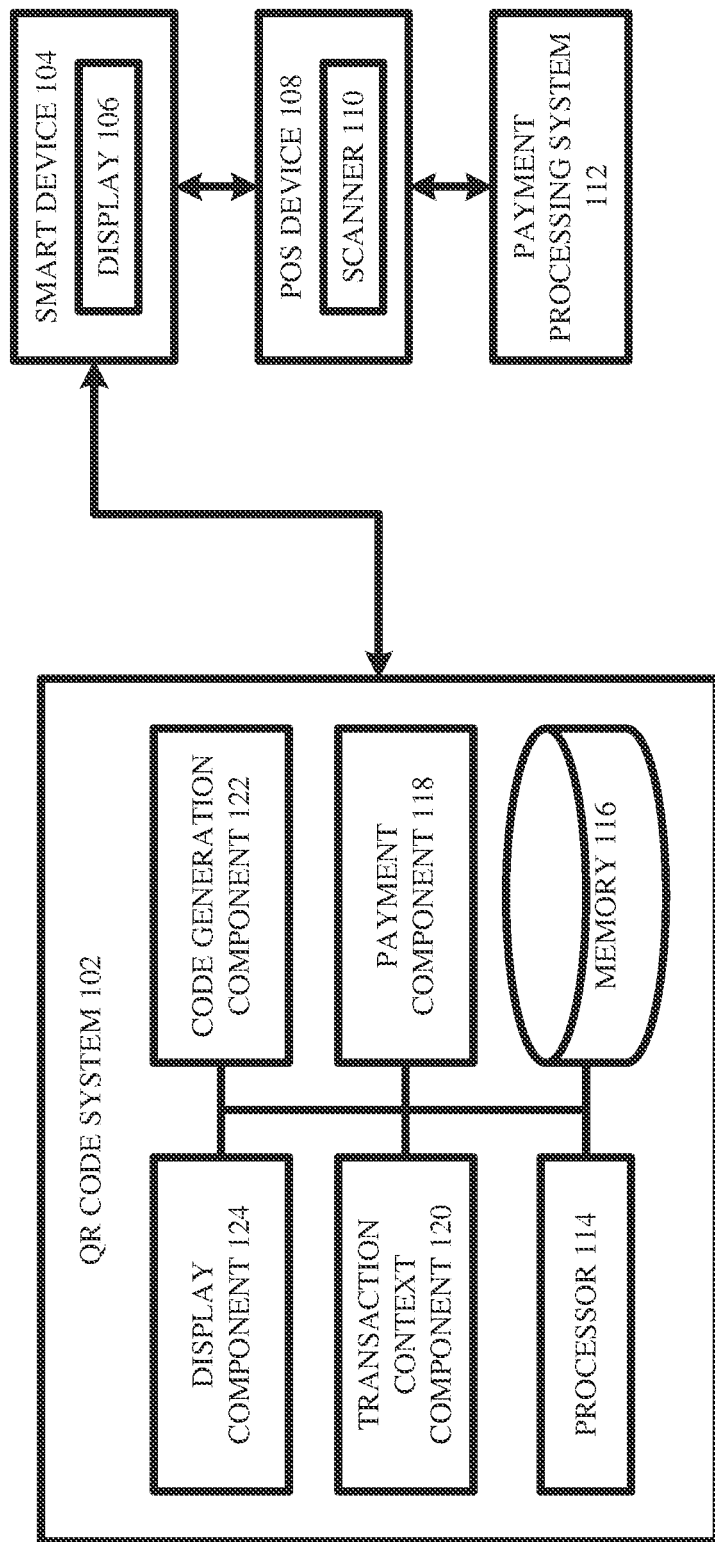
FIG. 1 illustrates a high-level block diagram of an example, non-limiting system that facilitates enhanced, context-based QR code generation in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Conventionally, when a commercial transaction occurs between a first entity (e.g., a buyer, user, consumer, client, customer) and a second entity (e.g., a seller, merchant, vendor, product/service provider), computerized payment processing systems and/or techniques can be used to facilitate and/or transfer payment from the first entity to the second entity. Such conventional computerized payment processing systems and/or techniques generally involve the first entity presenting a financial instrument (e.g., a credit card, a debit card) to the second entity at a point-of-sale device (e.g., a credit card reader and/or scanner). The point-of-sale device reads/scans the financial instrument to extract payment information (e.g., credit card account number, bank account number) that is encoded on and/or within the financial instrument (e.g., stored on and/or within the financial instrument via a microchip and/or via a magstripe). The point-of-sale device can subsequently transmit the extracted payment information to a payment processing system for processing, which can then relay the extracted payment information to a transaction settlement system for settlement (e.g., to actually facilitate the transfer of funds from a financial account associated with the first entity to a financial account associated with the second entity).

Such conventional computerized payment processing systems and/or techniques are vulnerable to fraud and/or misuse. For example, it is possible that the first entity can have stolen the financial instrument from the true owner of the financial instrument. In such case, the first entity can receive a product/service from the second entity without properly paying for the product/service. After all, since the financial instrument does not truly belong to the first entity in such example, the payment information encoded on and/or within the financial instrument does not correspond to the first entity. Yet, conventional computerized payment processing systems and/or techniques nevertheless permit the first entity to present the financial instrument to the second entity as if the first entity were the true owner of the financial instrument. So, in such case, the first entity presents the financial instrument to the second entity, the first entity absconds with the product/service, and the true owner is wrongly charged for the product/service. Conventional computerized payment processing systems are vulnerable to such fraud.

As another example, suppose the true owner of the financial instrument temporarily lends the financial instrument to the first entity subject to certain use restrictions and/or conditions specified by the true owner. For example, the true owner can permit the first entity to spend at most X amount of money in a given transaction (e.g., a spending cap), the true owner can permit the first entity to purchase/rent only products/services from merchant Y (e.g., authorizing use of the financial instrument with only certain enumerated merchants), and/or the true owner can permit the first entity to purchase/rent only product/service Z and not other types of products/services (e.g., authorizing use of the financial instrument with only certain enumerated products/services). As a more specific example, a parent (e.g., true owner) can lend their credit card to their child (e.g., first entity), and the parent can instruct the child to charge no more than X dollars to the credit card, to use the credit card only at merchant Y, and/or to purchase/rent only product/service Z. As another example, a credit card company can extend credit to the first entity subject to such specified use restrictions and/or conditions. In any case, conventional computerized payment processing systems and/or techniques are not concerned at all with such use restrictions and/or conditions. In other words, conventional computerized payment processing systems and/or techniques do not convey such use restrictions and/or conditions to the second entity or otherwise provide any safeguards for enforcing such use restrictions and/or conditions. So, with conventional computerized payment processing systems and/or techniques, it is possible for the first entity to use the financial instrument in violation of these use restrictions and/or conditions (e.g., the first entity can use the financial instrument in a transaction that is priced above X dollars, the first entity can use the financial instrument in a transaction with a merchant other than merchant Y, and/or the first entity can use the financial instrument in a transaction for products/services other than product/service Z).

Such conventional computerized payment processing systems and/or techniques are also static and un-customizable. As mentioned above, conventional computerized payment processing systems and/or techniques involve a financial instrument (e.g., presented by the first entity) being scanned/read by a point-of-sale device (e.g., owned and/or operated by the second entity) so as to extract payment information that is encoded on and/or within the financial instrument. As a simple example, a customer can walk into a merchant's store, can select a product for purchase from the merchant's shelves, and can present a credit card to the merchant at a point-of-sale device of the merchant, and the point-of-sale device can scan/read the credit card so as to extract the customer's credit card number. In this way, payment information is conveyed and/or transferred from the first entity to the second entity. However, in conventional computerized payment processing systems and/or techniques, only payment information is conveyed and/or transferred in such way. In other words, only payment information (e.g., a static/unchanging credit card number) is encoded/stored on/within the financial instrument and/or otherwise correlated/mapped to the financial instrument; other types of potentially useful information pertaining to the first entity are not stored/encoded on/within the financial instrument and/or otherwise correlated/mapped to the financial instrument in any way (e.g., context-based information regarding a particular transaction is not stored/encoded on/within the financial instrument and/or otherwise correlated/mapped to the financial instrument; transaction-based restrictions, conditions, and/or triggering criteria are not stored/encoded on/within the financial instrument and/or otherwise correlated/mapped to the financial instrument; preferences, contact information, and/or biographical information of the first entity are not stored/encoded on/within the financial instrument and/or otherwise correlated/mapped to the financial instrument). In some cases, the point-of-sale device and/or a payment processing system can subsequently utilize the extracted payment information to look up in a backend database certain additional information pertaining to the first entity (e.g., once the merchant extracts the customer's credit card number, the merchant can look up the credit card number in an appropriate database to determine whether the credit card number is valid and/or to determine whether the credit card number is past its expiration date). However, this can increase backend processing time and/or can result in unnecessary expenditure of computing resources. After all, in such case, such additional information is not stored, encoded, encrypted, and/or indicated directly on and/or within the financial instrument itself.

Moreover, in conventional computerized payment processing systems and/or techniques, the information stored/encoded on/within a financial instrument is completely static. That is, the information that is stored, encoded, encrypted, and/or indicated directly on and/or within the financial instrument cannot be altered and/or amended once the financial instrument is created (e.g., the information stored on the magstripe of a credit card cannot be changed; instead, a different credit card with a different magstripe would need to be manufactured to facilitate different payment information). Overall, conventional computerized payment processing systems and/or techniques encode/store only static payment information on the financial instrument; they do not permit the first entity to change, supplement, and/or customize the information encoded/stored on and/or within the financial instrument.

Various embodiments of the subject innovation can address one or more of these technical issues/problems by facilitating computerized generation of enhanced and/or enriched transaction-based quick response (QR) codes for improved privacy and/or fraud detection. One or more embodiments described herein include systems, computer-implemented methods, apparatus, and/or computer-program products that can facilitate the digital creation and/or generation of context-based and/or transaction-based QR codes using smart devices (e.g., smart phones, smart tablets, smart personal digital assistants, laptop computers, desktop computers, vehicle-integrated computers, and/or any other suitable computing devices). In various instances, a first entity (e.g., a buyer, user, consumer, client, customer) can possess a smart device and can desire to purchase/rent a product/service from a second entity (e.g., a seller, merchant, vendor, product/service provider). In various aspects, embodiments of the subject innovation can leverage the smart device in order to safely, securely, and/or privately transfer electronic payment information from the first entity to the second entity. Specifically, in various cases, embodiments of the subject innovation can be implemented as software, hardware, and/or any suitable combination of software and/or hardware on the smart device, which can enable the smart device to digitally and/or electronically generate a context-based and/or transaction-based QR code (and/or any other suitable optical barcode) representing the payment information of the first entity.

Although the herein disclosure often refers to the electronic generation of QR codes, this is exemplary and non-limiting. In various aspects, embodiments of the subject innovation can select and/or identify suitable QR codes (e.g., based on transactional context) from a stored set of already-generated QR codes. In such cases, rather than generating a QR code in real-time based on a known transactional context, various embodiments of the subject innovation can identify from a stored set of already-generated QR codes a QR code that corresponds to, that is correlated with, and/or that is mapped to the known transactional context.

In various aspects, a QR code (e.g., a quick response code) can be an optical barcode (e.g., a machine-readable optical label and/or machine-readable optical image) that contains, represents, and/or indicates encoded information, and/or that is otherwise correlated/mapped to such encoded information. In various cases, any suitable cryptographic technique and/or any suitable encoding mode can be used to generate a QR code and/or to store, encrypt, encode, and/or embed information into a QR code, such as numeric, alphanumeric, byte/binary, and/or kanji. Once generated, a QR code can be displayed on any suitable electronic display (e.g., smart device screen, computer monitor, optical projector, hologram display) and/or can, in some cases, be printed and/or reproduced on any suitable tangible medium (e.g., printed on paper and/or cardboard). In various instances, a QR code, once generated and displayed, can visually appear to be a two-dimensional matrix and/or rectilinear grid of black and/or white squares, where the particular arrangement and/or pattern of the black and/or white squares in the matrix/grid can represent, indicate, and/or correspond to stored, encrypted, encoded, and/or embedded information. Although a QR code can be a two-dimensional matrix and/or rectilinear grid of black and/or white squares, this is exemplary and non-limiting. In some cases, a QR code can exhibit any suitable dimensionality (e.g., can be a one-dimensional barcode), can exhibit any suitable shape (e.g., can be circular, polygonal, slanted, irregular, and/or not necessarily rectilinear), and/or can exhibit any suitable colors and/or combinations of colors. In various aspects, the information stored, encoded, encrypted, and/or embedded within a QR code (and/or otherwise correlated and/or mapped to the QR code) can be extracted, read, processed, and/or interpreted by any suitable QR code scanner/reader (e.g., the QR code scanner/reader can capture an image of the QR code and/or can capture any other suitable optical characteristics of the QR code and can apply any suitable cryptographic technique to the captured image and/or optical characteristics in order to decrypt the information that is stored, encrypted, encoded, and/or embedded within the QR code and/or otherwise correlated/mapped to the QR code).

Thus, electronically generated QR codes can be used to securely and/or privately transfer information from one entity to another. For example, the first entity can employ a computing device to electronically generate a QR code by encrypting, encoding, and/or embedding desired information into the QR code (and/or otherwise correlating/mapping the desired information to the QR code via any suitable cryptographic technique). In various instances, the computing device can electronically display the electronically generated QR code to a scanner/reader device of the second entity (e.g., such that the electronically generated QR code is visible to the scanner/reader device of the second entity). In various aspects, the scanner/reader device can scan, process, and/or decipher the desired information that is encrypted, encoded, and/or embedded within the QR code. The scanner/reader device can then transmit the scanned information to a payment processing system for processing.

In various instances, embodiments of the subject innovation can apply and/or leverage the safe, secure, and/or private information transmission capabilities of electronically generated QR codes to enhance the fidelity and/or security of commercial transactions between entities (e.g., between buyers and sellers, between consumers and merchants, between customers and vendors). Specifically, as mentioned above, suppose that a first entity (e.g., a buyer, user, consumer, client, customer) desires to purchase/rent a product/service from a second entity (e.g., a seller, merchant, vendor, product/service provider). Moreover, suppose that the first entity possesses a smart device (e.g., smart phone and/or smart tablet). In various aspects, the smart device can be outfitted with software and/or hardware that allows the smart device to electronically generate (e.g., via any suitable cryptographic, mathematical, statistical, and/or computational techniques) a QR code that contains, stores, encodes, embeds, indicates, and/or is correlated/mapped to payment information (e.g., credit card number, bank account number) of the first entity. That is, the smart device can electronically create a QR code that represents the payment information of the first entity, and the smart device can electronically display that QR code on its screen. In various cases, a point-of-sale device (e.g., QR code scanner/reader device) of the second entity can capture an image of the electronically generated QR code that is displayed on the screen of the smart device, and the point-of-sale device can process, decrypt, decipher, and/or interpret (e.g., via any suitable cryptographic, mathematical, statistical, and/or computational techniques) the electronically generated QR code so as to extract the payment information that is contained, stored, encoded, encrypted, embedded, and/or represented in (and/or otherwise correlated/mapped to) the electronically generated QR code. In this way, the payment information of the first entity can be safely, securely, and/or privately transferred from the first entity to the second entity.

In various aspects, embodiments of the subject innovation can involve storing, encoding, encrypting, and/or embedding other types of potentially useful information into the electronically generated QR code (and/or otherwise correlating/mapping such potentially useful information to the electrically generated QR code), so as to enhance the safety, security, and/or privacy of the transaction between the first entity and the second entity and/or so as to reduce an amount and/or time of backend processing. Specifically, in various instances, embodiments of the subject innovation can store, encode, encrypt, and/or embed into the electronically generated QR code (and/or can otherwise correlate/map to the electronically generated QR code) context-based information regarding the transaction between the first entity and the second entity. In various cases, context-based information can include any suitable metadata that describes and/or indicates the circumstances and/or characteristics of the transaction between the first entity and the second entity. Such context-based information can be cross-checked by the point-of-sale device of the second entity in order to verify whether the first entity is authorized to use the payment information that is encoded within and/or correlated to the electronically generated QR code. In various other embodiments, such cross-checking can be facilitated by a payment processing system that is remote and/or separate from the point-of-sale device.

Although the herein disclosure often discusses storing, encoding, encrypting, and/or embedding context-based information directly into QR codes, this is exemplary and non-limiting. In some cases, rather than storing, encoding, encrypting, and/or embedding context-based information directly into QR codes, various embodiments of the subject innovation can correlate and/or map via any suitable technique context-based information to QR codes (e.g., can correlate and/or map particular context-based information to the particular optical barcode pattern exhibited by a particular QR code). In any case, any suitable QR code generation and/or fabrication technique can be implemented in various embodiments so that a displayed QR code corresponds to and/or otherwise represents desired information.

In some cases, such context-based information can include geo-location information associated with the transaction. That is, the geographic location where the transaction is occurring can be specified, identified, encrypted, encoded, and/or embedded into the electronically generated QR code by the smart device (and/or can be otherwise correlated/mapped to the electronically generated QR code by the smart device). In various cases, the geographic location of the transaction can be recited and/or indicated in any suitable way and/or at any suitable level of granularity (e.g., continent, country, state/province, city, town, address, latitude, longitude, and/or elevation). In various aspects, the geographic location of the transaction can be recorded and/or identified by any suitable global positioning system (GPS) device (and/or any other suitable geo-location sensor) that is incorporated into the smart device (e.g., many smart phones and/or smart tablets include hardware and/or software that track and/or record geographic location of the smart device over time). In some cases, an electronic beacon at or near the point-of-sale device can transmit a signal that indicates and/or conveys the geographic location of the point-of-sale device (e.g., the geographic location of the transaction). In such case, the smart device can receive the signal from the electronic beacon and can incorporate the geographic location indicated by the electronic beacon into the electronically generated QR code. In various cases, the smart device can receive input (e.g., via a keyboard, touchscreen, buttons, voice commands, and/or any other suitable human-interface device) from the first entity that identifies the geographic location of the transaction and/or of the smart device (e.g., the first entity can manually identify the geographic information to be encoded into and/or otherwise correlated/mapped to the QR code). In various aspects, the geographic location of the smart device that generates the QR code can be considered as a proxy for the geographic location of the transaction for which the QR code is intended to be used. For instance, if the QR code is genuinely electronically generated for the particular transaction in question (e.g., if there is no attempted fraud on the part of the first entity), the smart device can generate the QR code at the location of the transaction (e.g., at the location of the point-of-sale device) when the transaction is transpiring. So, the geographic location of the smart device at the time that the smart device generates the QR code can match and/or correspond to the geographic location of the transaction (e.g., can match and/or correspond to the geographic location of the point-of-sale device). Thus, in some cases, when the QR code is electronically generated (and/or selected) by the smart device, the geographic location of the smart device at the time of generation of the QR code can be included/encoded within the QR code (and/or can be otherwise correlated/mapped to the QR code), and can be considered as a proxy for the geographic location of the transaction for which the QR code is electronically generated.

In various aspects, including/encoding the geographic location of the transaction in (and/or otherwise correlating/mapping the geographic location of the transaction to) the electronically generated QR code can help to enhance the safety, security, and/or privacy of the transaction between the first entity and the second entity, because it allows the point-of-sale device and/or the payment processing system to cross-check the geographic location that is indicated by the electronically generated QR code (e.g., that is, the geographic location of the smart device when the smart device generates/selects the QR code) with the actual geographical location of the transaction known by the point-of-sale device. For instance, suppose that the transaction between the first entity and the second entity occurs at a geo-location A. In a situation where no fraud is attempted by the first entity, the smart device of the first entity can electronically generate the QR code while the first entity (and thus while the smart device) is physically located at the geo-location A (e.g., while physically near the point-of-sale device and/or while physically within the store and/or building of the second entity). In such case, the smart device can incorporate, store, encode, encrypt, and/or embed both the payment information of the first entity and an indication of the geo-location A (e.g., the location of the smart device at the time that the smart device generates the QR code) into the electronically generated QR code. The smart device can display to the point-of-sale device the electronically generated QR code, and the point-of-sale device can scan/read the electronically generated QR code, thereby extracting both the payment information and the indication of the geo-location A from the electronically generated QR code. In various cases, the point-of-sale device can independently track and/or know the location of the transaction (e.g., the point-of-sale device can already know its own geographic location and/or the geographic location of the second entity's place of business). Thus, the point-of-sale device can transmit the electronically generated QR code and the known geographic location of the transaction to a payment processing system, and the payment processing system can compare the geographic location encrypted within (and/or correlated to) the electronically generated QR code with the known geographic location of the transaction (e.g., the known geographic location of the point-of-sale device). Since the geo-location A is the known geographic location of the transaction and since the electronically generated QR code indicates and/or corresponds to the geo-location A, the payment processing system can determine that the geographic information stored within and/or correlated to the electronically generated QR code matches and/or corresponds to the known geographic location of the point-of-sale device and/or transaction (e.g., and/or is within an acceptable range and/or distance of the known geographic location of the point-of-sale device and/or transaction). Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity.

However, consider a situation where fraud is being attempted by the first entity. In such case, the smart device of the first entity can be different from the smart device that actually generates the QR code (e.g., the smart device of the first entity can have screen-captured an electronically generated QR code that was generated by a different smart device on behalf of a different entity unaffiliated with the first entity, meaning that the payment information stored within and/or correlated to the electronically generated QR code can be unassociated with the first entity). For instance, suppose that the first entity uses its smart device to capture an image of an electronically generated QR code generated and displayed by a different smart device of some unrelated entity at geo-location B (e.g., the unrelated entity can have been engaging in a transaction at geo-location B, not geo-location A, at the time of generation of the QR code and/or at the time of screen-capture by the first entity). Thus, the electronically generated QR code can include and/or be correlated to the payment information of the unrelated entity and can include and/or be correlated to an indication of the geo-location B, rather than the geo-location A. In various cases, the first entity can attempt to purchase some product/service from the second entity by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the geo-location B from the electronically generated QR code. As mentioned above, the point-of-sale device can independently track and/or know its own location and/or the location of the transaction. As also mentioned, the point-of-sale device can then transmit both the electronically generated QR code (e.g., the information extracted from the electronically generated QR code) and the known geo-location of the transaction to the payment processing system. In various cases, the payment processing system can compare the indicated geographic location encrypted within and/or correlated to the electronically generated QR code with the known geographic location of the transaction. Since the geo-location A is the known geographic location of the transaction and since the electronically generated QR code indicates the geo-location B, the payment processing system can determine that the geographic information stored within and/or correlated to the electronically generated QR code does not match and/or correspond to the known geographic location of the point-of-sale device and/or the transaction (e.g., and/or is outside of an acceptable range and/or distance from the actual geographic location of the point-of-sale device and/or the transaction). Thus, the payment processing system can determine that the transaction is not valid and/or that fraud is being attempted by the first entity. Accordingly, the payment processing system can send an unsuccessful verification/validation message to the point-of-sale device and/or can otherwise instruct the point-of-sale device to refuse to accept the payment information stored within the electronically generated QR code and/or to refuse to provide the product/service to the first entity.

In some cases, the context-based information encoded with and/or correlated to the electronically generated QR code can include time/date information associated with the transaction. That is, the time and/or date at which the transaction is occurring can be specified, identified, encrypted, encoded, and/or embedded into the electronically generated QR code (and/or can be otherwise correlated/mapped to the electronically generated QR code) by the smart device. In various cases, the time and/or date of the transaction can be recited and/or indicated in any suitable way and/or at any suitable level of granularity (e.g., decade, year, month, day, hour, minute, second, fraction of a second, morning, afternoon, evening, and/or season). In various aspects, the time and/or date of the transaction can be recorded and/or identified by any suitable clock (and/or any other suitable timing device such as an electronic calendar) that is incorporated into the smart device (e.g., many smart phones and/or smart tablets include hardware and/or software that track and/or record time and/or date). In some cases, an electronic beacon at or near the point-of-sale device can transmit a signal that indicates and/or conveys the current time and/or date. In such case, the smart device can receive the signal from the electronic beacon and can incorporate the current time and/or date indicated by the electronic beacon into the electronically generated QR code. In various cases, the smart device can receive input (e.g., via a keyboard, touchscreen, buttons, voice commands, and/or any other suitable human-interface device) from the first entity that identifies the time and/or date of the transaction (e.g., the first entity can manually identify the time and/or date to be encoded into and/or otherwise correlated/mapped to the QR code). In various aspects, the time and/or date at which the smart device generates the QR code can be considered as a proxy for the time and/or date of the transaction for which the QR code is intended to be used. For instance, if the QR code is genuinely electronically generated for the particular transaction in question (e.g., if there is no attempted fraud on the part of the first entity), the smart device can generate the QR code at the time and/or date of the transaction and/or when the transaction is actually transpiring. So, the time and/or date that is indicated by the smart device at the time that the smart device generates the QR code can match and/or correspond to the time and/or date of the transaction. Thus, in some cases, when the QR code is electronically generated (and/or selected) by the smart device, the time and/or date indicated by the smart device when the QR code is generated can be included/encoded within the QR code (and/or can be otherwise correlated/mapped to the QR code), and can be considered as a proxy for the time and/or date of the transaction for which the QR code is electronically generated.

In various aspects, including/encoding the time and/or date of the transaction in (and/or otherwise correlating/mapping the time/date of the transaction to) the electronically generated QR code can help to enhance the safety, security, and/or privacy of the transaction between the first entity and the second entity, because it allows the point-of-sale device and/or the payment processing system to cross-check the time and/or date that is indicated by the electronically generated QR code (e.g., that is, the time and/or date indicated by the smart device when the smart device generates the QR code) with the actual time and/or date of the transaction known by the point-of-sale device. For instance, suppose that the transaction between the first entity and the second entity occurs at a time/date C. In a situation where no fraud is attempted by the first entity, the smart device of the first entity can electronically generate the QR code during and/or at the time/date C (e.g., while the transaction is transpiring). In such case, the smart device can incorporate, store, encode, encrypt, and/or embed both the payment information of the first entity and an indication of the time/date C (e.g., the time and/or date recorded by the smart device when the smart device generates the QR code) into the electronically generated QR code. The smart device can display to the point-of-sale device the electronically generated QR code, and the point-of-sale device can scan/read the electronically generated QR code, thereby extracting both the payment information and the indication of the time/date C from the electronically generated QR code. In various cases, the point-of-sale device can independently track and/or know the time and/or date of the transaction (e.g., the point-of-sale device can already know when the transaction is occurring, such as via its own internal clock and/or via an internet connection). Thus, the point-of-sale device can transmit the electronically generated QR code and the known time and/or date of the transaction to the payment processing system, and the payment processing system can compare the time and/or date encrypted within (and/or correlated to) the electronically generated QR code with the known time and/or date of the transaction (e.g., the known time and/or date recorded by the point-of-sale device). Since the time/date C is the known time/date of the transaction and since the electronically generated QR code indicates and/or corresponds to the time/date C, the payment processing system can determine that the time and/or date information stored within and/or correlated to the electronically generated QR code matches and/or corresponds to the known time and/or date information of the transaction (e.g., and/or is within an acceptable time window of the actual time of the transaction). Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity.

However, consider a situation where fraud is being attempted by the first entity. In such case, as mentioned above, the smart device of the first entity can be different from the smart device that actually generates the electronically generated QR code. For instance, suppose that the first entity uses its smart device to capture an image of an electronically generated QR code generated by a different smart device of some unrelated entity at time/date D (e.g., the unrelated entity can have been engaging in a transaction at time/date D, not time/date C, when the QR code was generated and/or at the time of screen-capture by the first entity). Thus, the electronically generated QR code can include and/or be correlated to the payment information of the unrelated entity and can include and/or be correlated to an indication of the time/date D. In various cases, the first entity can attempt to purchase some product/service from the second entity by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the time/date D from the electronically generated QR code. As mentioned above, the point-of-sale device can independently track and/or know the time and/or date of the transaction. As also mentioned, the point-of-sale device can then transmit both the electronically generated QR code (e.g., the information extracted from the electronically generated QR code) and the known time and/or date of the transaction to the payment processing system. In various cases, the payment processing system can compare the time and/or date encrypted within the electronically generated QR code with the known time and/or date of the transaction. Since the time/date C is the known time and/or date of the transaction and since the electronically generated QR code indicates the time/date D, the payment processing system can determine that the time and/or date stored within and/or correlated to the electronically generated QR code does not match and/or correspond to the known time and/or date of the transaction (e.g., and/or is outside of an acceptable time window of the actual time of the transaction). Thus, the payment processing system can determine that the transaction is not valid and/or that fraud is being attempted by the first entity. Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, the context-based information encoded with and/or correlated to the electronically generated QR code can include product/service information associated with the transaction. That is, an indication of the product and/or service that is being purchased, rented, and/or provided during the transaction can be specified, identified, encrypted, encoded, and/or embedded into (and/or can be otherwise correlated/mapped to) the electronically generated QR code. In various cases, the product and/or service involved in the transaction can be recited and/or indicated in any suitable way and/or at any suitable level of granularity (e.g., type and/or category and/or class of product/service, serial number and/or identification number of product/service, brand of product/service). In various aspects, the product and/or service involved in the transaction can be recorded and/or identified by any suitable camera (and/or any other suitable imaging device) of the smart device (e.g., many smart phones and smart tablets possess one or more cameras which can be used to capture images of products on a merchant's shelves and/or in a customer's cart, which images can be analyzed via computer vision algorithms to identify the depicted products; alternatively, the cameras can be used to capture images of and/or to scan universal product codes and/or any other suitable identification information associated with the products). In some cases, an electronic beacon at or near the point-of-sale device can transmit a signal that indicates and/or identifies the products and/or services involved in the transaction (e.g., the point-of-sale device can track which products/services are involved in the transaction by scanning barcodes during checkout). In such case, the smart device can receive the signal from the electronic beacon and can incorporate an indication of the products and/or services identified by the electronic beacon into the electronically generated QR code. In various cases, the smart device can receive input (e.g., via a keyboard, touchscreen, buttons, voice commands, and/or any other suitable human-interface device) from the first entity that identifies the products and/or services involved in the transaction (e.g., the first entity can manually identify the products and/or services to be encoded into and/or otherwise correlated/mapped to the QR code). In other embodiments, the products and/or services involved in the transaction can be automatically identified by referencing an electronic shopping list and/or online shopping cart and/or online wish list associated with the first entity. Thus, in some cases, when the QR code is electronically generated by the smart device, the products and/or services involved in the transaction can be included/encoded within and/or otherwise correlated/mapped to the QR code.

In various aspects, including/encoding the products and/or services involved in the transaction into (and/or otherwise correlating/mapping the products and/or services involved in the transaction to) the electronically generated QR code can help to enhance the safety, security, and/or privacy of the transaction between the first entity and the second entity, because it allows the point-of-sale device and/or the payment processing system to cross-check the products and/or services that are indicated by the electronically generated QR code with the actual products and/or services recorded/tracked by the point-of-sale device. For instance, suppose that the transaction between the first entity and the second entity involves product/service E. In a situation where no fraud is attempted by the first entity, the smart device can electronically generate the QR code so that the QR code indicates product/service E. In such case, the smart device can incorporate, store, encode, encrypt, and/or embed both the payment information of the first entity and an indication that the transaction is for the purchase/provision of the product/service E into the electronically generated QR code. The smart device can display to the point-of-sale device the electronically generated QR code, and the point-of-sale device can scan/read the electronically generated QR code, thereby extracting both the payment information and the indication of product/service E from the electronically generated QR code. In various cases, the point-of-sale device can independently track and/or know the products and/or services involved in the transaction (e.g., such as by scanning universal product codes and/or the like during checkout). Thus, the point-of-sale device can transmit the electronically generated QR code and an indication of the known products and/or services involved in the transaction to the payment processing system, and the payment processing system can compare the indicated products and/or services encrypted within the electronically generated QR code with the known products and/or services of the transaction. Since the product/service E is the known product and/or service of the transaction and since the electronically generated QR code indicates the product/service E, the payment processing system can determine that the product and/or service information stored within and/or correlated to the electronically generated QR code matches and/or corresponds to the known product and/or service information of the transaction. Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service E to the first entity.

However, consider a situation where fraud is being attempted by the first entity. In such case, as mentioned above, the smart device of the first entity can be different from the smart device that actually generates the QR code. For instance, suppose that the first entity uses its smart device to capture an image of an electronically generated QR code generated by a different smart device of some unrelated entity that was purchasing product/service F (e.g., the unrelated entity can have been engaging in a transaction for product/service F, not product/service E, at the time of generation of the QR code and/or at the time of screen-capture by the first entity). Thus, the electronically generated QR code can include and/or be correlated to the payment information of the unrelated entity and can include and/or be correlated to an indication of the product/service F. In various cases, the first entity can attempt to purchase the product/service E from the second entity by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the product/service F from the electronically generated QR code. As mentioned above, the point-of-sale device can independently track and/or know the products and/or services involved in the transaction. As also mentioned, the point-of-sale device can then transmit both the electronically generated QR code (e.g., the information extracted from the electronically generated QR code) and an indication of the known products and/or services involved in the transaction to the payment processing system. In various cases, the payment processing system can compare the indications of the products and/or services encrypted within and/or correlated to the electronically generated QR code with the known products and/or services involved in the transaction. Since the product/service E is the known product and/or service involved in the transaction and since the electronically generated QR code indicates the product/service F, the payment processing system can determine that the product and/or service information stored within and/or correlated to the electronically generated QR code does not match and/or correspond to the known products and/or services involved in the transaction. Thus, the payment processing system can determine that the transaction is not valid and/or that fraud is being attempted by the first entity. Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service E to the first entity.

In some cases, the context-based information encoded with and/or correlated to the electronically generated QR code can include price/value information associated with the transaction. That is, the overall price, cost, and/or value of the transaction can be specified, identified, encrypted, and/or encoded into (and/or can be otherwise correlated/mapped to) the electronically generated QR code by the smart device. In various cases, the price, cost, and/or value of the transaction can be recited and/or indicated in any suitable way and/or at any suitable level of granularity (e.g., overall currency amount, itemized currency amounts, currency amount exceeding a first threshold, currency amount not exceeding a second threshold). In various aspects, the price, cost, and/or value of the transaction can be recorded and/or identified by any suitable camera (and/or any other suitable imaging device) of the smart device (e.g., many smart phones and smart tablets possess one or more cameras which can be used to capture images of price tags and/or universal product codes associated with products, which images can be analyzed via computer vision algorithms to identify the depicted and/or represented prices). In some cases, an electronic beacon at or near the point-of-sale device can transmit a signal that indicates and/or identifies the price, cost, and/or value of the transaction (e.g., the point-of-sale device can scan price tags of products/services during checkout). In such case, the smart device can receive the signal from the electronic beacon and can incorporate the price, cost, and/or value indicated by the electronic beacon into the electronically generated QR code. In various cases, the smart device can receive input (e.g., via a keyboard, touchscreen, buttons, voice commands, and/or any other suitable human-interface device) from the first entity that identifies the price, cost, and/or value of the transaction (e.g., the first entity can manually identify the prices, costs, and/or values to be encoded into and/or correlated to the QR code). Thus, in some cases, when the QR code is electronically generated by the smart device, the price, cost, and/or value of the transaction can be included/encoded within and/or correlated/mapped to the QR code.

In various aspects, including/encoding the price, cost, and/or value of the transaction into (and/or otherwise correlation/mapping the price, cost, and/or value of the transaction to) the electronically generated QR code can help to enhance the safety, security, and/or privacy of the transaction between the first entity and the second entity, because it allows the point-of-sale device and/or the payment processing system to cross-check the prices, costs, and/or values that are indicated in the electronically generated QR code with the actual prices, costs, and/or values known by the point-of-sale device to be involved in the transaction. For instance, suppose that the transaction between the first entity and the second entity involves a price/value G. In a situation where no fraud is attempted by the first entity, the smart device of the first entity can electronically generate the QR code so that the QR code indicates the price/value G. In such case, the smart device can incorporate, store, and/or encode both the payment information of the first entity and an indication that the transaction involves the price/value G into the electronically generated QR code. The smart device can display to the point-of-sale device the electronically generated QR code, and the point-of-sale device can scan/read the electronically generated QR code, thereby extracting both the payment information and the indication of the price/value G from the electronically generated QR code. In various cases, the point-of-sale device can independently track and/or know the prices, costs, and/or values involved in the transaction (e.g., by scanning price tags and/or the like during checkout). Thus, the point-of-sale device can transmit the electronically generated QR code and the known prices, costs, and/or values of the transaction to the payment processing system, and the payment processing system can compare the indicated prices, costs, and/or values encrypted within and/or correlated to the electronically generated QR code with the known prices, costs, and/or values of the transaction. Since the price/value G is the known price, cost, and/or value of the transaction and since the electronically generated QR code indicates the price/value G, the payment processing system can determine that the price, cost, and/or value information stored within and/or correlated to the electronically generated QR code matches and/or corresponds to the known price, cost, and/or value information of the transaction. Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity.

However, consider a situation where fraud is being attempted by the first entity. In such case, as mentioned above, the smart device of the first entity can be different from the smart device that actually generates the QR code. For instance, suppose that the first entity uses its smart device to capture an image of an electronically generated QR code generated by a different smart device of some unrelated entity engaged in a transaction of price/value H (e.g., the unrelated entity can have been engaging in a transaction with price/value H, not price/value G, at the time of generation of the QR code and/or at the time of screen-capture by the first entity). Thus, the electronically generated QR code can include and/or be correlated to the payment information of the unrelated entity and can include and/or be correlated to an indication of the price/value H. In various cases, the first entity can attempt to purchase a product/service from the second entity by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the price/value H from the electronically generated QR code. As mentioned above, the point-of-sale device can independently track and/or know the prices, costs, and/or values involved in the transaction. As also mentioned, the point-of-sale device can then transmit both the electronically generated QR code (e.g., the information extracted from the electronically generated QR code) and the known prices, costs, and/or values of the transaction to the payment processing system. Thus, the payment processing system can compare the prices, costs, and/or values encrypted within and/or correlated to the electronically generated QR code with the known prices, costs, and/or values involved in the transaction. Since the price/value G is the known price, cost, and/or value of the transaction and since the electronically generated QR code indicates the price/value H, the payment processing system can determine that the price, cost, and/or value information stored within and/or correlated to the electronically generated QR code does not match and/or correspond to the known prices, costs, and/or values involved in the transaction. Thus, the payment processing system can determine that the transaction is not valid and/or that fraud is being attempted by the first entity. Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, the context-based information encoded within and/or correlated to the electronically generated QR code can include merchant identity information associated with the transaction. That is, the identity of the merchant (e.g., the second entity) that is facilitating the transaction can be specified, identified, encrypted, encoded, and/or embedded into (and/or can be otherwise correlated/mapped to) the electronically generated QR code by the smart device. In various cases, the merchant identity associated with the transaction can be recited and/or indicated in any suitable way and/or at any suitable level of granularity (e.g., merchant/vendor name, corporate/company name, brand name, an identification number associated with the merchant, a token and/or symbol associated with the merchant, and/or any other suitable identifier associated with the merchant). In various aspects, the identity of the merchant facilitating the transaction can be recorded and/or identified by any suitable camera (and/or any other suitable imaging device) of the smart device (e.g., many smart phones and smart tablets possess one or more cameras which can be used to capture images of logos, storefront signs, and/or name tags, which images can be analyzed via computer vision algorithms to identify the depicted merchant/business involved). In other cases, any suitable geo-location sensors of the smart device can be used to infer the identity of the merchant (e.g., the smart device can know/sense/learn its geographic location as mentioned above and can browse the Internet to search for a merchant with a business address at that geographic location). In some cases, an electronic beacon at or near the point-of-sale device can transmit a signal that indicates and/or identifies the merchant facilitating the transaction. In such case, the smart device can receive the signal from the electronic beacon and can incorporate the merchant identity indicated by the electronic beacon into the electronically generated QR code. In various cases, the smart device can receive input (e.g., via a keyboard, touchscreen, buttons, voice commands, and/or any other suitable human-interface device) from the first entity that identifies the merchant facilitating the transaction (e.g., the first entity can manually identify the merchant name and/or identification number to be encoded into and/or correlated to the QR code). Thus, in some cases, when the QR code is electronically generated by the smart device, the identify to the merchant facilitating the transaction (and/or some identifying piece of information associated with the merchant facilitating the transaction) can be included/encoded within and/or correlated/mapped to the QR code.

In various aspects, including/encoding the identity of the merchant facilitating the transaction into (and/or otherwise correlating/mapping the identity of the merchant facilitating the transaction to) the electronically generated QR code can help to enhance the safety, security, and/or privacy of the transaction between the first entity and the second entity, because it allows the point-of-sale device and/or the payment processing system to cross-check the merchant identity that is indicated by the electronically generated QR code with the actual identity of the second entity. For instance, suppose that the transaction occurs between the first entity and a merchant I. In a situation where no fraud is attempted by the first entity, the smart device of the first entity can electronically generate the QR code so that the QR code indicates the identity of the merchant I. In such case, the smart device can incorporate, store, encode, encrypt, and/or embed both the payment information of the first entity and an indication of the identity of the merchant I into the electronically generated QR code. The smart device can display to the point-of-sale device the electronically generated QR code, and the point-of-sale device can scan/read the electronically generated QR code, thereby extracting both the payment information and the indication of the identity of the merchant I from the electronically generated QR code. In various cases, the point-of-sale device can independently know the identity of the merchant facilitating the transaction (e.g., the point-of-sale device can already know the identity of the merchant that owns and/or operates the point-of-sale device). Thus, the point-of-sale device can transmit the electronically generated QR code and the known merchant identity to the payment processing system, and the payment processing system can compare the indicated merchant identity information encrypted within the electronically generated QR code with the known identity of the merchant facilitating the transaction. Since the merchant I is the known merchant facilitating the transaction and since the electronically generated QR code indicates the merchant I, the payment processing system can determine that the merchant identity information stored within and/or correlated to the electronically generated QR code matches and/or corresponds to the known merchant identity information of the transaction. Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity.

However, consider a situation where fraud is being attempted by the first entity. In such case, as mentioned above, the smart device of the first entity can be different from the smart device that actually generates the QR code. For instance, suppose that the first entity uses its smart device to capture an image of an electronically generated QR code generated by a different smart device of some unrelated entity engaged in a transaction with a merchant J (e.g., the unrelated entity can have been engaging in a transaction with the merchant J, not the merchant I, at the time of generation of the QR code and/or at the time of screen-capture by the first entity). Thus, the electronically generated QR code can include and/or be correlated to the payment information of the unrelated entity and can include and/or be correlated to an indication of the identity of the merchant J. In various cases, the first entity can attempt to purchase a product/service from the merchant I by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the identity of the merchant J from the electronically generated QR code. As mentioned above, the point-of-sale device can independently track and/or know the identity of the merchant facilitating the transaction. As also mentioned above, the point-of-sale device can then transmit both the electronically generated QR code (e.g., the information extracted from the electronically generated QR code) and the identity of the merchant known to be facilitating the transaction to the payment processing system. In various cases, the payment processing system can compare the merchant identity information encrypted within and/or correlated to the electronically generated QR code with the known identity of the merchant facilitating the transaction. Since the merchant I is known to be facilitating the transaction and since the electronically generated QR code indicates the identity of the merchant J, the payment processing system can determine that the merchant identity information stored within the electronically generated QR code does not match and/or correspond to the known identity of the merchant facilitating the transaction. Thus, the payment processing system can determine that the transaction is not valid and/or that fraud is being attempted by the first entity. Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, the context-based information encoded within and/or correlated to the electronically generated QR code can include user identity information associated with the transaction. That is, the identity of the user (e.g., the first entity) that is engaging in the transaction can be specified, identified, encrypted, encoded, and/or embedded into (and/or can be otherwise correlated/mapped to) the electronically generated QR code. In various cases, the user identity associated with the transaction can be recited and/or indicated in any suitable way and/or at any suitable level of granularity (e.g., full name, shortened name, residence/address, age, birthdate, social security number, driver's license number, occupation, mother's maiden name, name of first pet). In various aspects, the identity of the user engaging in the transaction can be discovered and/or identified by any suitable technique of the smart device (e.g., many smart phones and smart tablets can access social media accounts and/or other mobile applications that contain profile data regarding a user, such as name, address, age, birthdate, occupation). In various cases, the smart device can receive input (e.g., via a keyboard, touchscreen, buttons, voice commands, and/or any other suitable human-interface device) from the first entity that identifies and/or corresponds to the user engaging in the transaction (e.g., the first entity can manually indicate what identifying information to be encoded into and/or correlated to the QR code). Thus, in some cases, when the QR code is electronically generated by the smart device, the identity of the user engaging in the transaction (and/or some identifying piece of information associated with the user engaging in the transaction) can be included/encoded within and/or correlated/mapped to the QR code.

In various aspects, including/encoding the identity of the user engaging in the transaction into (and/or otherwise correlating/mapping the identity of the user engaging in the transaction to) the electronically generated QR code can help to enhance the safety, security, and/or privacy of the transaction between the first entity and the second entity, because it allows the point-of-sale device and/or the payment processing system to verify with the first entity the user identity that is indicated by the electronically generated QR code. For instance, suppose that the transaction occurs between the first entity and the second entity, and suppose that the first entity has a birthdate K. In a situation where no fraud is attempted by the first entity, the smart device of the first entity can electronically generate the QR code so that the QR code indicates the birthdate K. In such case, the smart device can incorporate, store, encode, encrypt, and/or embed both the payment information of the first entity and an indication of the birthdate K into the electronically generated QR code. The smart device can display to the point-of-sale device the electronically generated QR code, and the point-of-sale device can scan/read the electronically generated QR code, thereby extracting both the payment information and the indication of the birthdate K from the electronically generated QR code. In various cases, the point-of-sale device can query the first entity to provide its birthdate (e.g., to input its birthdate via a keyboard, touchscreen, voice command, and/or any other suitable human-interface device). In various cases, the point-of-sale device can then transmit the electronically generated QR code and the inputted birthdate to the payment processing system. Thus, the payment processing system can compare the indicated birthdate encrypted within and/or correlated to the electronically generated QR code with the inputted birthdate provided by the first entity. Since the first entity can indicate that it has a birthdate K and since the point-of-sale device can determine that the electronically generated QR code indicates the birthdate K, the payment processing system can determine that the user identity information stored within and/or correlated to the electronically generated QR code matches and/or corresponds to the inputted user identity information provided by the first entity. Thus, the payment processing system can determine that the transaction is valid and/or that no fraud is being attempted by the first entity. Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity.

However, consider a situation where fraud is being attempted by the first entity. In such case, as mentioned above, the smart device of the first entity can be different from the smart device that actually generates the QR code. For instance, suppose that the first entity uses its smart device to capture an image of an electronically generated QR code generated by a different smart device of some unrelated entity with a birthdate L. Thus, the electronically generated QR code can include and/or be correlated to the payment information of the unrelated entity and can include and/or be correlated to an indication of the birthdate L. In various cases, the first entity can attempt to purchase a product/service from the second entity by using the payment information of the unrelated entity (e.g., fraud). That is, the smart device can display to the point-of-sale device the electronically generated QR code, and the point-of-sale device can scan/read the electronically generated QR code, thereby extracting both the payment information and the indication of the birthdate L from the electronically generated QR code. As mentioned above, the point-of-sale device can query the first entity for its birthdate. As also mentioned, the point-of-sale device can then transmit both the electronically generated QR code (e.g., the information extracted from the electronically generated QR code) and the inputted user identity information to the payment processing system. Thus, the payment processing system can compare the user identity information encrypted within the electronically generated QR code with the inputted user identity information provided by the first entity. Since the first entity can input the birthdate K and since the electronically generated QR code indicates the birthdate L, the payment processing system can determine that user identity information stored within and/or correlated to the electronically generated QR code does not match and/or correspond to the inputted user identity information provided by the first entity. Thus, the payment processing system can determine that the transaction is not valid and/or that fraud is being attempted by the first entity. Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

That is, as explained above, various embodiments of the subject innovation can enhance the safety, security, and/or privacy of a commercial transaction by encrypting into (and/or correlating with) an electronically generated QR code context-based information describing the commercial transaction for which the QR code is generated and/or for which the QR code is intended to be used (e.g., geo-location of the transaction for which the QR code is generated and/or for which the QR code is intended to be used, time/date and/or time stamp of the transaction for which the QR code is generated and/or for which the QR code is intended to be used, products/services involved in the transaction for which the QR code is generated and/or for which the QR code is intended to be used, values/prices involved in the transaction for which the QR code is generated and/or for which the QR code is intended to be used, identification information of the merchant facilitating the transaction for which the QR code is generated and/or for which the QR code is intended to be used, and/or identification information of the user engaging in the transaction for which the QR code is generated and/or for which the QR code is intended to be used). Such context-based information can be verified and/or cross-checked by the point-of-sale device and/or by the payment processing system in order to reduce the occurrence of fraud (e.g., if the context-based information characterizing the transaction for which the QR code is generated and/or for which the QR code is intended to be used matches and/or corresponds to known context-based information of the current transaction, it can be determined that the QR code was generated for purposes of the current transaction and is thus valid; on the other hand, if the context-based information characterizing the transaction for which the QR code is generated and/or for which the QR code is intended to be used does not match and/or correspond to known context-based information of the current transaction, it can be determined that the QR code was not generated for purposes of the current transaction and is thus invalid). Although the above discussion involves the payment processing system performing and/or facilitating such verification and/or cross-checking, in various embodiments, the point-of-sale device can itself perform and/or facilitate such verification and/or cross-checking. Conventional computerized payment processing systems and/or techniques do not include and/or leverage such context-based information at all (e.g., a credit card only conveys a credit card account number to a point-of-sale device; the credit card does not convey in any way the location, time, products/services, prices/values, and/or merchant/user identities that are involved in the transaction).

In various instances, embodiments of the subject innovation can enhance transactional safety, security, and/or privacy by storing, encoding, encrypting, and/or embedding into (and/or by otherwise correlating/mapping to) the electronically generated QR code restriction-based information pertaining to the first entity. In various cases, restriction-based information can include any suitable types of conditions (e.g., which can be expressed in terms of Boolean operators) that are to be collectively satisfied (e.g., which collectively evaluate to true rather than false) in order for an electronically generated QR code to be accepted by the point-of-sale device (and/or, in some cases, in order for the QR code to be electronically generated at all by the smart device). Such restriction-based information can be evaluated by the point-of-sale device and/or the payment processing system in order to verify whether the first entity is authorized to use the payment information encoded within and/or correlated to the electronically generated QR code.

Although the herein disclosure often discusses storing, encoding, encrypting, and/or embedding restriction-based information into QR codes, this is exemplary and non-limiting. In various cases, rather than directly storing, encoding, encrypting, and/or embedding restriction-based information into QR codes, various embodiments of the subject innovation can correlate and/or map via any suitable technique restriction-based information to QR codes (e.g., can correlate and/or map particular restriction-based information to the particular optical barcode pattern exhibited by a particular QR code). In any case, any suitable QR code generation and/or fabrication technique can be implemented so that a displayed QR code corresponds to and/or otherwise represents desired information.

In some cases, such restriction-based information can include geo-fencing restrictions. That is, geographic areas and/or geographic regions in which the first entity is authorized (and/or is not authorized, in some cases) to use the electronically generated QR code can be specified, identified, encrypted, encoded, and/or embedded into (and/or can be otherwise correlated/mapped to) the electronically generated QR code. In various cases, these geographic areas and/or geographic regions can be recited and/or indicated in any suitable way and/or at any suitable level of granularity (e.g., authorized and/or unauthorized continents, authorized and/or unauthorized countries, authorized and/or unauthorized states/provinces, authorized and/or unauthorized cities, authorized and/or unauthorized towns, authorized and/or unauthorized addresses, authorized and/or unauthorized latitudes, authorized and/or unauthorized longitudes, and/or authorized and/or unauthorized elevations). In various instances, such geo-fencing restrictions can be predetermined and/or otherwise set and/or established prior to the transaction between the first entity and the second entity. In some cases, such geo-fencing restrictions can be required and/or inputted by a third entity that has authority over the first entity (e.g., a credit card company that extends credit to a customer can require the customer to abide by such geo-fencing restrictions; and/or a parent that lends their credit card to their child can require the child to abide by such geo-fencing restrictions). In various cases, such geo-fencing restrictions can be obtained and/or retrieved from any suitable database and/or data structure.

In various aspects, including/encoding such geo-fencing restrictions in (and/or correlating/mapping such geo-fencing restrictions to) the electronically generated QR code can help to enhance the safety, security, and/or privacy of the transaction between the first entity and the second entity, because it allows the point-of-sale device and/or the payment processing system to determine whether the geo-fencing restrictions that are indicated by the electronically generated QR code are satisfied by the actual geographical location of the transaction known by the point-of-sale device. For instance, consider an electronically generated QR code that includes and/or is correlated to payment information, and that includes and/or is correlated to an indication of geo-fencing restrictions defining the locations at which the payment information is deemed valid and/or defining the locations at which the payment information is deemed invalid. Suppose that the transaction between the first entity and the second entity occurs at a geo-location M. In various cases, the smart device can display to the point-of-sale device the electronically generated QR code, and the point-of-sale device can scan/read the electronically generated QR code, thereby extracting both the payment information and the indication of the geo-fencing restrictions from the electronically generated QR code. As mentioned above, the point-of-sale device can independently track and/or know its own location and/or the location of the transaction. Thus, the point-of-sale device can transmit both the electronically generated QR code and the known geographic location of the transaction to the payment processing system, and the payment processing system can compare the geo-fencing restrictions encrypted within and/or correlated to the electronically generated QR code with the known geographic location of the transaction and/or of the point-of-sale device. If the geographic location of the transaction and/or of the point-of-sale device (e.g., the geo-location M) satisfies the geo-fencing restrictions that are indicated by the electronically generated QR code, the payment processing system can determine that the transaction is valid and/or that no fraud is being attempted by the first entity (e.g., can determine that the first entity is not prohibited from using the payment information contained in the QR code at the geo-location M). Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity. However, if the geographic location of the transaction and/or of the point-of-sale device (e.g., the geo-location M) does not satisfy the geo-fencing restrictions that are indicated by the electronically generated QR code, the payment processing system can determine that the transaction is invalid and/or that fraud is being attempted by the first entity (e.g., can determine that the first entity is prohibited from using the payment information contained in the QR code at the geo-location M). Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, such restriction-based information can include temporal and/or time-fencing restrictions. That is, time windows and/or time intervals in which the first entity is authorized (and/or is not authorized, in some cases) to use the electronically generated QR code can be specified, identified, encrypted, encoded, and/or embedded into (and/or can be otherwise correlated/mapped to) the electronically generated QR code. In various cases, these time windows and/or time intervals can be recited and/or indicated in any suitable way and/or at any suitable level of granularity (e.g., authorized and/or unauthorized decades, authorized and/or unauthorized years, authorized and/or unauthorized months, authorized and/or unauthorized days, authorized and/or unauthorized hours, authorized and/or unauthorized minutes, authorized and/or unauthorized seconds, authorized and/or unauthorized fractions of seconds, and/or authorized and/or unauthorized seasons). In various instances, such temporal and/or time-fencing restrictions can be predetermined and/or otherwise set and/or established prior to the transaction between the first entity and the second entity. In some cases, such temporal and/or time-fencing restrictions can be required and/or inputted by a third entity that has authority over the first entity (e.g., a credit card company that extends credit to a customer can require the customer to abide by such temporal and/or time-fencing restrictions; and/or a parent that lends their credit card to their child can require the child to abide by such temporal and/or time-fencing restrictions). In various cases, such temporal and/or time fencing restrictions can be obtained and/or retrieved from any suitable database and/or data structure.

In various aspects, including/encoding such temporal and/or time-fencing restrictions in (and/or correlating/mapping such temporal and/or time-fencing restrictions to) the electronically generated QR code can help to enhance the safety, security, and/or privacy of the transaction between the first entity and the second entity, because it allows the point-of-sale device and/or the payment processing system to determine whether the temporal and/or time-fencing restrictions that are indicated by the electronically generated QR code are satisfied by the actual time and/or date of the transaction known by the point-of-sale device. For instance, consider an electronically generated QR code that includes and/or is correlated to payment information, and that includes and/or is correlated to an indication of temporal and/or time-fencing restrictions defining the times and/or dates at which the payment information is deemed valid and/or defining the times and/or dates at which the payment information is deemed invalid. Suppose that the transaction between the first entity and the second entity occurs at a time/date N. In various cases, the smart device can display to the point-of-sale device the electronically generated QR code, and the point-of-sale device can scan/read the electronically generated QR code, thereby extracting both the payment information and the indication of the temporal and/or time-fencing restrictions from the electronically generated QR code. As mentioned above, the point-of-sale device can independently track and/or know the time and/or date of the transaction. Thus, the point-of-sale device can transmit both the electronically generated QR code and the known time and/or date of the transaction to the payment processing system, and the payment processing system can compare the temporal and/or time-fencing restrictions encrypted within and/or correlated to the electronically generated QR code with the known time and/or date of the transaction. If the time and/or date of the transaction (e.g., the time/date N) satisfies the temporal and/or time-fencing restrictions that are indicated by the electronically generated QR code, the payment processing system can determine that the transaction is valid and/or that no fraud is being attempted by the first entity (e.g., can determine that the first entity is not prohibited from using the payment information contained in the QR code on the time/date N). Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity. However, if the time and/or date of the transaction (e.g., the time/date N) does not satisfy the temporal and/or time-fencing restrictions that are indicated by the electronically generated QR code, the payment processing system can determine that the transaction is invalid and/or that fraud is being attempted by the first entity (e.g., can determine that the first entity is prohibited from using the payment information contained in the QR code on the time/date N). Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, such restriction-based information can include product/service restrictions. That is, indications of products and/or services for which the first entity is authorized (and/or is not authorized, in some cases) to use the electronically generated QR code can be specified, identified, encrypted, encoded, and/or embedded into (and/or can be otherwise correlated/mapped to) the electronically generated QR code itself. In various cases, these products and/or services can be recited and/or indicated in any suitable way and/or at any suitable level of granularity (e.g., authorized and/or unauthorized types, classes, and/or categories of products/services; authorized and/or unauthorized serial numbers and/or identification numbers of products/services; authorized and/or unauthorized brands of products/services). In various instances, such product/service restrictions can be predetermined and/or otherwise set and/or established prior to the transaction between the first entity and the second entity. In some cases, such product/service restrictions can be required and/or inputted by a third entity that has authority over the first entity (e.g., a credit card company that extends credit to a customer can require the customer to abide by such product/service restrictions; and/or a parent that lends their credit card to their child can require the child to abide by such product/service restrictions). In various cases, such product/service restrictions can be obtained and/or retrieved from any suitable database and/or data structure.

In various aspects, including/encoding such product/service restrictions in (and/or correlating/mapping such product/service restrictions to) the electronically generated QR code can help to enhance the safety, security, and/or privacy of the transaction between the first entity and the second entity, because it allows the point-of-sale device and/or the payment processing system to determine whether the product/service restrictions that are indicated by the electronically generated QR code are satisfied by the actual products and/or services known by the point-of-sale device to be involved in the transaction. For instance, consider an electronically generated QR code that includes and/or is correlated to payment information, and that includes and/or is correlated to an indication of product/service restrictions defining the categories of products and/or services for which the payment information is deemed valid and/or defining the categories of products and/or services for which the payment information is deemed invalid. Suppose that the transaction between the first entity and the second entity involves a product/service O. In various cases, the smart device can display to the point-of-sale device the electronically generated QR code, and the point-of-sale device can scan/read the electronically generated QR code, thereby extracting both the payment information and the indication of the product/service restrictions from the electronically generated QR code. As mentioned above, the point-of-sale device can independently track and/or record the products and/or services involved in a transaction. Thus, the point-of-sale device can transmit both the electronically generated QR code and indications of the known products and/or service involved in the transaction to the payment processing system, and the payment processing system can compare the product/service restrictions encrypted within and/or correlated to the electronically generated QR code with the known products/services of the transaction. If the products/services that are actually involved in the transaction (e.g., the product/service O) satisfy the product/service restrictions that are indicated by the electronically generated QR code, the payment processing system can determine that the transaction is valid and/or that no fraud is being attempted by the first entity (e.g., can determine that the first entity is not prohibited from using the payment information contained in the QR code to purchase the product/service O). Accordingly, the payment processing system can send a successful verification/validation message to the point-of-sale device and/or can otherwise instruct the point-of-sale device to accept the payment information stored within and/or correlated to the electronically generated QR code and/or to provide the product/service O to the first entity. However, if the products/services that are actually involved in the transaction (e.g., the product/service O) do not satisfy the product/service restrictions that are indicated by the electronically generated QR code, the payment processing system can determine that the transaction is invalid and/or that fraud is being attempted by the first entity (e.g., can determine that the first entity is prohibited from using the payment information contained in the QR code to purchase the product/service O). Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service O to the first entity.

In some cases, such restriction-based information can include value/price restrictions. That is, indications of prices, costs, values, and/or monetary amounts for which the first entity is authorized (and/or is not authorized, in some cases) to use the electronically generated QR code can be specified, identified, encrypted, encoded, and/or embedded into (and/or can be otherwise correlated/mapped to) the electronically generated QR code. In various cases, these prices, costs, values, and/or monetary amounts can be recited and/or indicated in any suitable way and/or at any suitable level of granularity (e.g., authorized and/or unauthorized maximum monetary amounts, authorized and/or unauthorized minimum monetary amounts, authorized and/or unauthorized average monetary amounts over a given time period). In various instances, such value/price restrictions can be predetermined and/or otherwise set and/or established prior to the transaction between the first entity and the second entity. In some cases, such value/price restrictions can be required and/or inputted by a third entity that has authority over the first entity (e.g., a credit card company that extends credit to a customer can require the customer to abide by such value/price restrictions; and/or a parent that lends their credit card to their child can require the child to abide by such value/price restrictions). In various cases, such value/price restrictions can be obtained and/or retrieved from any suitable database and/or data structure.

In various aspects, including/encoding such value/price restrictions in (and/or correlating/mapping such value/price restrictions to) the electronically generated QR code can help to enhance the safety, security, and/or privacy of the transaction between the first entity and the second entity, because it allows the point-of-sale device and/or the payment processing system to determine whether the value/price restrictions that are indicated by the electronically generated QR code are satisfied by the actual values, prices, costs, and/or monetary amounts involved in the transaction known by the point-of-sale device. For instance, consider an electronically generated QR code that includes and/or is correlated to payment information, and that includes and/or is correlated to an indication of value/price restrictions defining the prices, values, costs, and/or monetary amounts for which the payment information is deemed valid and/or defining the prices, values, costs, and/or monetary amounts for which the payment information is deemed invalid. Suppose that the transaction between the first entity and the second entity involves a value/price P. In various cases, the smart device can display to the point-of-sale device the electronically generated QR code, and the point-of-sale device can scan/read the electronically generated QR code, thereby extracting both the payment information and the indication of the value/price restrictions from the electronically generated QR code. As mentioned above, the point-of-sale device can independently track and/or record the prices, values, costs, and/or monetary amounts involved in a transaction. Thus, the point-of-sale device can transmit both the electronically generated QR code and the known prices, values, costs, and/or monetary amounts of the transaction to the payment processing system, and the payment processing system can compare the value/price restrictions encrypted within and/or correlated to the electronically generated QR code with the known prices, values, costs, and/or monetary amounts of the transaction. If the prices, values, costs, and/or monetary amounts that are actually involved in the transaction (e.g., the value/price P) satisfy the value/price restrictions that are indicated by the electronically generated QR code, the payment processing system can determine that the transaction is valid and/or that no fraud is being attempted by the first entity (e.g., can determine that the first entity is not prohibited from using the payment information contained in the QR code to spend and/or charge the value/price P). Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity. However, if the prices, values, costs, and/or monetary amounts that are actually involved in the transaction (e.g., the value/price P) do not satisfy the value/price restrictions that are indicated by the electronically generated QR code, the payment processing system can determine that the transaction is invalid and/or that fraud is being attempted by the first entity (e.g., can determine that the first entity is prohibited from using the payment information contained in the QR code to spend and/or charge the value/price P). Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

In some cases, such restriction-based information can include merchant identity restrictions. That is, identification information of merchants with which the first entity is authorized (and/or is not authorized, in some cases) to use the electronically generated QR code can be specified, identified, encrypted, encoded, and/or embedded into (and/or can be otherwise correlated/mapped to) the electronically generated QR code. In various cases, such merchant identity restrictions can be recited and/or indicated in any suitable way and/or at any suitable level of granularity (e.g., authorized and/or unauthorized brands, authorized and/or unauthorized companies, authorized and/or unauthorized classes of merchants/vendors, authorized and/or unauthorized merchant identification numbers/tokens). In various instances, such merchant identity restrictions can be predetermined and/or otherwise set and/or established prior to the transaction between the first entity and the second entity. In some cases, such merchant identity restrictions can be required and/or inputted by a third entity that has authority over the first entity (e.g., a credit card company that extends credit to a customer can require the customer to abide by such merchant identity restrictions; and/or a parent that lends their credit card to their child can require the child to abide by such merchant identity restrictions). In various cases, such merchant identity restrictions can be obtained and/or retrieved from any suitable database and/or data structure.

In various aspects, including/encoding such merchant identity restrictions in (and/or correlating/mapping such merchant identity restrictions to) the electronically generated QR code can help to enhance the safety, security, and/or privacy of the transaction between the first entity and the second entity, because it allows the point-of-sale device and/or the payment processing system to determine whether the merchant identity restrictions that are indicated by the electronically generated QR code are satisfied by the actual identity of the merchant facilitating the transaction (e.g., the second entity). For instance, consider an electronically generated QR code that includes and/or is correlated to payment information, and that includes and/or is correlated to an indication of merchant identity restrictions defining the merchants for which the payment information is deemed valid and/or defining the merchants for which the payment information is deemed invalid. Suppose that the second entity has identity Q. In various cases, the smart device can display to the point-of-sale device the electronically generated QR code, and the point-of-sale device can scan/read the electronically generated QR code, thereby extracting both the payment information and the indication of the merchant identity restrictions from the electronically generated QR code. As mentioned above, the point-of-sale device can independently know the identity of the merchant facilitating the transaction. Thus, the point-of-sale device can transmit both the electronically generated QR code and the identity of the known merchant facilitating the transaction to the payment processing system, and the payment processing system can compare the merchant identity restrictions encrypted within and/or correlated to the electronically generated QR code with the known identity of the second entity. If the known identity of the second entity (e.g., the identity Q) satisfies the merchant identity restrictions that are indicated by the electronically generated QR code, the payment processing system can determine that the transaction is valid and/or that no fraud is being attempted by the first entity (e.g., can determine that the first entity is not prohibited from using the payment information contained in the QR code with the merchant having identity Q). Accordingly, the payment processing system can send a successful verification/validation message to the point-of-sale device and/or can otherwise instruct the point-of-sale device to accept the payment information stored within and/or correlated to the electronically generated QR code and/or to provide the product/service to the first entity. However, if the known identity of the second entity (e.g., the identity Q) does not satisfy the merchant identity restrictions that are indicated by the electronically generated QR code, the payment processing system can determine that the transaction is invalid and/or that fraud is being attempted by the first entity (e.g., can determine that the first entity is prohibited from using the payment information contained in the QR code with the merchant having identity Q). Accordingly, the payment processing system can transmit an unsuccessful verification/validation message to the point-of-sale device and/or can otherwise instruct the point-of-sale device to refuse to accept the payment information stored within and/or correlated to the electronically generated QR code and/or to refuse to provide the product/service to the first entity.

That is, as explained above, various embodiments of the subject innovation can enhance the safety, security, and/or privacy of a commercial transaction by encrypting into (and/or correlating with) an electronically generated QR code restriction-based information defining situations and/or conditions in which payment information is deemed valid and/or invalid (e.g., geo-fencing restrictions, temporal and/or time-fencing restrictions, product/service restrictions, value/price restrictions, and/or merchant identity restrictions). Such restriction-based information can be processed and/or evaluated by the payment processing system in order to reduce the occurrence of fraud and/or in order to reduce an amount and/or time of backend processing. Although the above discussion involves the payment processing system performing and/or facilitating such processing and/or evaluation, in various embodiments, the point-of-sale device can perform and/or facilitate such processing and/or evaluation. Conventional computerized payment processing systems and/or techniques do not include and/or leverage such restriction-based information at all (e.g., a credit card only conveys a static credit card account number to a point-of-sale device; the credit card does not convey in any way the locations, times, products/services, prices/values, and/or merchant identities for which the payment information is considered valid and/or invalid; nor does the credit card withhold and/or hide payment information if such restriction-based information is not satisfied).

The above examples illustrate how restriction-based information can be encoded into and/or correlated with the electronically generated QR code for verification by the payment processing system. In various cases, however, such restriction-based information can be used as triggering criteria by the smart device itself. In other words, various embodiments of the subject innovation can be programmed to refrain from electronically generating and/or displaying any QR code at all if any applicable restriction-based information is not satisfied by a current transaction. In other words, in some embodiments of the subject innovation, the smart device can, in some cases, electronically generate and/or display a QR code only if the smart device determines that applicable restriction-based information is satisfied by context-based information of the current transaction.

In various aspects, embodiments of the subject innovation can further enhance safety, security, and/or privacy of the transaction between the first entity and the second entity by incorporating biometric safeguards that can be leveraged by the smart device to verify the identity of the first entity. Specifically, in some cases, embodiments of the subject innovation can include biometric triggering criteria to be satisfied by the first entity as a condition precedent to the electronic generation and/or display of a QR code. In various instances, such biometric triggering criteria can include authorized fingerprint signatures, authorized facial signatures, authorized vocal signatures, and/or any other suitable biometric and/or biological information that can be used to verify the identity of the first entity (e.g., authorized DNA signatures, authorized blood signatures, authorized retina signatures). In other words, in some cases, before the smart device can electronically generate and/or display a QR code on behalf of the first entity, the smart device can require the first entity to input/provide a fingerprint signature/sample (e.g., so as to implement fingerprint recognition), a facial signature/sample (e.g., so as to implement facial recognition), a vocal signature/sample (e.g., so as to implement voice recognition), and/or so on. The smart device can then compare the inputted/provided fingerprint signature, facial signature, and/or vocal signature to stored fingerprint signatures, facial signatures, and/or vocal signatures that are known to correspond to authorized users of the smart device and/or to authorized users of QR codes. If the smart device determines that the inputted/provided biometric signatures match and/or correspond to the stored biometric signatures (e.g., if the smart device recognizes the first entity as being authorized to use QR codes and/or to use the smart device), the smart device can electronically generate and/or display a QR code at the instruction of the first entity. However, if the smart device determines that the inputted/provided biometric signatures do not match and/or correspond to the stored biometric signatures (e.g., if the smart device does not recognize the first entity as being authorized to use QR codes and/or to use the smart device), the smart device can refrain from electronically generating and/or displaying a QR code despite instructions from the first entity. In this way, biometric safeguards can be leveraged to help ensure that the smart device electronically generates and/or displays QR codes only for authorized users. In various cases, the smart device can incorporate any suitable biometric sensors for measuring biometric characteristics of the first entity (e.g., touchscreen and/or fingerprint scanner for reading fingerprints, camera for capturing facial images, microphone for capturing vocal soundbites).

That is, as explained above, various embodiments of the subject innovation can enhance the safety, security, and/or privacy of a commercial transaction by leveraging biometric triggering criteria. Such biometric triggering criteria can be processed and/or evaluated by the smart device in order to reduce the occurrence of fraud (e.g., the smart device can refrain from electronically generating and/or displaying a QR code containing payment information unless the first entity is biometrically verified). Conventional computerized payment processing systems and/or techniques do not include and/or leverage such biometric triggering criteria at all (e.g., a credit card can be presented and/or used at a point-of-sale device by any person who possesses the credit card; the credit card does not withhold and/or hide payment information until biometrically verifying that the person is authorized to use the credit card).

In some embodiments, the smart device can implement password-based and/or passcode-based triggering criteria. In other words, the smart device can, in some cases, require a password and/or passcode to be inputted/provided by the first entity as a condition precedent in order for the smart device to electronically generate and/or display a QR code.

In various aspects, embodiments of the subject innovation can further enhance safety, security, and/or privacy of the transaction between the first entity and the second entity by incorporating gesture-based and/or motion-based safeguards that can be required by the smart device prior to electronic generation and/or display of a QR code. Specifically, in some cases, embodiments of the subject innovation can include gesture-based and/or motion-based triggering criteria to be satisfied by the first entity as a condition precedent to the electronic generation and/or display of a QR code. In various instances, such gesture-based and/or motion-based triggering criteria can include authorized gestures, motions, tilts, orientations, bumps, and/or any other suitable motion-based information that can be treated as a command and/or instruction to electronically generate and/or display a QR code. In other words, in some cases, before the smart device can electronically generate and/or display a QR code on behalf of the first entity, the smart device can require the first entity to perform a particular gesture, motion, tilt, orientation, bump, and/or any other suitable physical manipulation of the smart device. The smart device can then compare the performed gesture, motion, tilt, orientation, bump, and/or physical manipulation to stored gestures, motions, tilts, orientations, bumps, and/or physical manipulations that are known to correspond to instructions and/or commands to electronically generate and/or display QR codes. If the smart device determines that the performed gestures, motions, tilts, orientations, bumps, and/or physical manipulations match and/or correspond to the stored gestures, motions, tilts, orientations, bumps, and/or physical manipulations, the smart device can electronically generate and/or display a QR code. However, if the smart device determines that the performed gestures, motions, tilts, orientations, bumps, and/or physical manipulations do not match and/or correspond to the stored gestures, motions, tilts, orientations, bumps, and/or physical manipulations, the smart device can refrain from electronically generating and/or displaying a QR code. In this way, motion-based and/or gesture-based safeguards can be leveraged to help ensure that the smart device electronically generates and/or displays QR codes only for authorized users. In various cases, the smart device can incorporate any suitable sensors for measuring the physical positions, displacements, velocities, accelerations, and/or orientations of the smart device (e.g., accelerometers, gyroscopic sensors). In some cases, the smart device can leverage such sensors to pinpoint a precise moment in time when the QR code is electronically generated and/or displayed to the point-of-sale device. As mentioned above, this precise moment in time can be encoded into and/or correlated to the QR code, and can be used by the payment processing system to validate and/or invalidate the QR code. Moreover, in various cases, different gestures, motions, tilts, orientations, bumps, and/or physical manipulations that are performed by a user of the smart device can be treated as input so that the user can select and/or identify desired QR codes to be displayed. Specifically, in various cases, different gestures, motions, tilts, orientations, bumps, and/or physical manipulations can correspond to and/or be correlated with different types of information (e.g., different financial instrument information, different restriction-based information, different privacy-based information), and different QR codes can likewise correspond to and/or be correlated with different types of information (e.g., different financial instrument information, different restriction-based information, different privacy-based information). So, when a particular gesture, motion, tilt, orientation, bump, and/or physical manipulation is detected, various embodiments of the subject innovation can determine what particular information corresponds to the detected gesture, motion, tilt, orientation, bump, and/or physical manipulation, and various embodiments of the innovation can accordingly generate, select, and/or display the particular QR code that corresponds to that particular information.

That is, as explained above, various embodiments of the subject innovation can enhance the safety, security, and/or privacy of a commercial transaction by leveraging gesture-based triggering criteria. Such gesture-based triggering criteria can be processed and/or evaluated by the smart device in order to reduce the occurrence of fraud (e.g., the smart device can refuse to electronically generate and/or display a QR code containing payment information unless the first entity performs a required physical motion with the smart device). Conventional computerized payment processing systems and/or techniques do not include and/or leverage such gesture-based triggering criteria at all (e.g., a credit card can be presented and/or used at a point-of-sale device by any person who possesses the credit card; the credit card does not withhold and/or hide payment information until a required physical motion, gesture, tilt, and/or orientation is performed by the credit card).

As explained above, in various embodiments of the subject innovation, the smart device can sense gesture-based motions and/or orientations of the smart device and can treat such gesture-based motions and/or orientations as triggering criteria for the electronic generation and/or display of a QR code (e.g., the smart device can refrain from generating and/or displaying a QR code unless an acceptable physical motion/orientation is performed with the smart device). In various other embodiments, the payment processing system (and/or the point-of-sale device) can interpret a generated and/or displayed QR code differently based on a physical motion and/or orientation that accompanies the QR code. For example, the smart device can electronically generate and display a QR code, and the interpretation of that QR code by the payment processing system can depend upon a physical motion, tilt, and/or orientation of the smart device (e.g., the QR code can have one meaning when paired with a motion/tilt/orientation R, the QR code can have a different meaning when paired with a motion/tilt/orientation S, and/or the QR code can have yet another meaning when paired with a motion/tilt/orientation T).

As mentioned above, in various embodiments, gesture-based information can be used to determine precise timestamps for electronically generated QR codes. For instance, the smart device can pinpoint a precise moment (e.g., day, hour, minute, second, and/or fraction of a second) at which the smart device's screen is presented to the point-of-sale device (and/or at which any other predetermined gesture is performed). In various cases, the smart device can pinpoint such moment by identifying the time at which a particular gesture is performed with the smart device, where the particular gesture corresponds to a motion and/or physical manipulation of the smart device that is consistent with presenting the screen of the smart device to the point-of-sale device. In other words, the smart device can determine the time at which the smart device's screen is physically presented to the point-of-sale device by capturing motion-based data that is consistent with and/or that indicates such a physical presentation. Thus, in various embodiments, the performance of a particular gesture can create a particular timestamp associated with a QR code (e.g., can mark the time/moment at which the screen of the smart device is presented to the point-of-sale device), and such particular timestamp can be embedded within and/or otherwise correlated to the QR code. In various aspects, the payment processing system can compare this particular timestamp to the known time of the transaction. If they match and/or are consistent, the transaction can be deemed appropriate. If they do not match and/or are not consistent, it can be determined that the QR code was not generated for the purpose of the current transaction.

In various instances, embodiments of the subject innovation can further enhance the safety, security, and/or privacy of the transaction between the first entity and the second entity by storing, encoding, encrypting, and/or embedding into (and/or by otherwise correlating/mapping to) the electronically generated QR code privacy information pertaining to the first entity. Specifically, in some cases, embodiments of the subject innovation can encrypt into (and/or correlating/map to) an electronically generated QR code preference information, contact information, and/or biographical information of the first entity, and the electronically generated QR code can be the communication medium by which that preference information, contact information, and/or biographical/demographic information is shared with the point-of-sale device and/or with the payment processing system. In some cases, the preference information can include product and/or service preferences of the first entity (e.g., food preferences, dietary preferences, movie preferences, art preferences, entertainment preferences, sport preferences, price preferences) and/or any other suitable preferences of the first entity. In some cases, the contact information can include any suitable contact of the first entity (e.g., cell phone number, work phone number, home phone number, personal email address, work email address, residential address, work address). In various cases, the biographical information can include birthdate of the first entity, career/occupation of the first entity, ethnicity of the first entity, political affiliation of the first entity, medical history of the first entity, allergies and/or medical afflictions of the first entity, browsing and/or purchase history of the first entity, and/or any other suitable demographic information of the first entity. In various aspects, such preferences, contact information, and/or biographical information can be encoded and/or encrypted into (and/or correlated/mapped to) a QR code via the smart device and can be interpreted and/or understood by the point-of-sale device and/or the payment processing system.

Although the herein disclosure often discusses storing, encoding, encrypting, and/or embedding privacy-based information into QR codes, this is exemplary and non-limiting. In various cases, rather than storing, encoding, encrypting, and/or embedding privacy-based information directly into QR codes, various embodiments of the subject innovation can correlate and/or map privacy-based information to QR codes (e.g., can correlate and/or map particular privacy-based information to the particular optical barcode pattern exhibited by a particular QR code). In any case, any suitable QR code generation and/or fabrication technique can be implemented so that a displayed QR code corresponds to and/or otherwise represents desired information.

In some instances, including/encoding preference information, contact information, and/or biographical/demographic information into (and/or otherwise correlating/mapping preference information, contact information, and/or biographical information to) an electronically generated QR code can help to improve transactions and/or interactions between the first entity and the second entity. For example, suppose that the first entity wishes to procure a product/service from the second entity. In various cases, the smart device can electronically generate and display a QR code in which is encoded (and/or to which is correlated) the preferences, contact information, and/or biographical information of the first entity. The point-of-sale device (and/or any other suitable QR scanner/reader) can scan/read the electronically generated QR code, thereby extracting the preference information, the contact information, and/or the biographical information of the first entity. Accordingly, the point-of-sale device can provide to the smart device an electronically filtered catalog of products and/or services that are offered by the second entity and that are consistent with the preference information, contact information, and/or biographical information encoded within the electronically generated QR code. For instance, if a customer enters a restaurant, the customer's smart phone can electronically generate and display a QR code which includes information indicating food allergies of the customer. Accordingly, the restaurant can seamlessly be made aware of the customer's food allergies scanning the QR code and can provide to the customer an electronic menu that includes only those food items sold by the restaurant that are consistent with the customer's food allergies (e.g., if the customer is allergic to peanuts, the QR code can indicate such peanut allergy, the restaurant can learn about the peanut allergy by scanning the QR code, and the restaurant can accordingly present to the customer only food options that do not include peanut-based ingredients). As another example, if a customer enters a restaurant, the customer's smart phone can electronically generate and display a QR code which includes information indicating food preferences of the customer (e.g., preference for meals not exceeding a calorie threshold, preference for meals using particular ingredients, preference for gluten-free meals, preference for organic and/or low-carbon-footprint ingredients, preference for meals under and/or above a price threshold). Accordingly, the restaurant can seamlessly be made aware of the customer's food preferences by scanning the QR code and can provide to the customer an electronic menu that emphasizes and/or includes only those food items sold by the restaurant that are consistent with the customer's food preferences (e.g., highlighting, listing first on the menu, and/or including on the menu only meals not exceeding the calorie threshold; highlighting, listing first on the menu, and/or including on the menu only meals made with the particular ingredients; highlighting, listing first on the menu, and/or including on the menu only gluten-free meals; highlighting, listing first on the menu, and/or including on the menu only meals made with organic and/or low-carbon-footprint ingredients; highlighting, listing first on the menu, and/or including on the menu only meals above and/or below the price threshold).

In various aspects, the second entity can desire to learn contact information and/or biographical information of the first entity (e.g., age, birthdate, residence/address, occupation, browsing history, purchase history, ethnicity, political affiliation, phone numbers, email address). In some cases, the point-of-sale device can offer rewards (e.g., discounts, coupons, specials) to the smart device in exchange for contact information and/or biographical information of the first entity. In various instances, the smart device can be programmed to divulge varying levels and/or amounts of the contact information and/or biographical information of the first entity (e.g., by encoding such contact information and/or biographical information into an electronically generated QR code) depending upon the extent of the reward offered by the point-of-sale device. For instance, in some cases, the smart device can encode no contact information and/or biographical information in the electronically generated QR code if no reward is offered by the point-of-sale device. In some cases, if the point-of-sale device offers a small reward/discount on a current and/or future transaction, the smart device can encode a commensurately small subset of available contact information and/or biographical information of the first entity into the electronically generated QR code (e.g., including only telephone number and/or email address of the first entity in the QR code). In some cases, if the point-of-sale device offers a large reward/discount on a current and/or future transaction, the smart device can encode a commensurately large subset of available contact information and/or biographical information of the first entity into the electronically generated QR code (e.g., including telephone number, email address, physical address/residence, occupation, and/or browsing/purchase history of the first entity). In various aspects, the smart device can receive input and/or instructions from the first entity which dictate how much contact information and/or biographical information (and/or preference information, in some cases) is permitted to be divulged in exchange for given amounts and/or ranges of rewards and/or discounts. In other words, the smart device can be programmed with various rules that instruct the smart device how much contact information and/or biographical information to encode within a QR code as a function of a reward/discount offered by the point-of-sale device. In various cases, such rules can be inputted, controlled, and/or established by the first entity. In various cases, such rules can be obtained and/or retrieved from any suitable database and/or data structure.

In various aspects, embodiments of the subject innovation can include a set of electronic personas which can be leveraged by the smart device to improve transactional safety, security, and/or privacy. In various instances, an electronic persona can be a profile that is stored on the smart device and that contains, specifies, and/or corresponds to various types of information. For example, different electronic personas can contain, specify, and/or correspond to different payment information, different restriction-based information, different biometric-based information, different gesture-based information, different preference information, different contact information, and/or different biographical/demographic information. In some cases, different users/entities can share the smart device (e.g., a family can share a single smart phone). Thus, each of those different users/ entities can have and/or be associated with a corresponding electronic persona on the smart device. For instance, consider a family having two parents and a child. In various cases, the smart device can have a first electronic persona corresponding to a first parent in the family that specifies payment information of the first parent, restriction-based information of the first parent, biometric information of the first parent, preference information of the first parent, contact information of the first parent, and/or biographical/demographic information of the first parent. In various cases, the smart device can also have a second electronic persona corresponding to a second parent in the family that specifies payment information of the second parent, restriction-based information of the second parent, biometric information of the second parent, preference information of the second parent, contact information of the second parent, and/or biographical/demographic information of the second parent. In various cases, the smart device can further include a third electronic persona corresponding to the child in the family that specifies payment information of the child, restriction-based information of the child, biometric information of the child, preference information of the child, contact information of the child, and/or biographical/demographic information of the child.

In various aspects, the smart device can identify a current user of the smart device (e.g., via biometric sensors, via passcode and/or password verification), can select and/or identify an electronic persona corresponding to the identified current user, and can electronically generate QR codes according to the information contained within and/or indicated by the selected electronic persona (e.g., different personas can correspond to different payment information, different restriction-based information, different biometric information, different preference information, different contact information, and/or different biographical information, which means that the electronically generated QR codes can themselves be different depending upon the selected and/or active persona).

In various instances, multiple personas can correspond to a single entity/user. For example, a single entity/user can, in some cases, desire to encrypt into and/or correlate to a QR code different payment information, different restriction-based information, and/or different preference/contact/biographical/demographic information depending upon the context of a current transaction. For instance, a single customer may desire to use different credit card accounts (e.g., different payment information) depending upon the geographic location of a transaction, the time/date of a transaction, the products/services involved in the transaction, the price/value of the transaction, and/or the merchant facilitating the transaction. As another example, a single customer may have different product/service preferences depending upon the geographic location of the transaction, the time/date of the transaction, the products/services involved in the transaction, the price/value of the transaction, and/or the merchant facilitating the transaction. As still another example, a single customer may desire to make available different contact information and/or different biographical/demographic information depending upon the geographic location of the transaction, the time/date of the transaction, the products/services involved in the transaction, the price/value of the transaction, and/or the merchant facilitating the transaction. In this way, a single entity/user can create multiple electronic personas on the smart device, and the smart device can automatically select and/or identify an appropriate electronic persona to use based on the context of a current transaction (e.g., based on the geographic location of the transaction, the time/date of the transaction, the products/services involved in the transaction, the value/price of the transaction, and/or the merchant facilitating the transaction). The smart device can then electronically generate and display QR codes based on the information associated with the selected electronic persona (e.g., the smart device can generate QR codes based on the payment information indicated by the selected electronic persona, based on the restriction-based information indicated by the selected electronic persona, based on the biometric information indicated by the selected electronic persona, based on the preference information indicated by the selected electronic persona, based on the contact information indicated by the selected electronic persona, and/or based on the biographical information indicated by the selected electronic persona).

In various embodiments, a single user can establish and/or set up a set of electronic personas such that each electronic persona corresponds to a different privacy level and/or to different privacy settings. As a non-limiting example, in some cases, a user can establish three different electronic personas: a first electronic persona having a high degree of privacy, a second electronic persona having a low degree of privacy, and a third electronic persona having an intermediate degree of privacy. In such cases, the first electronic persona can correspond to and/or specify very little (and/or no) available preference information, contact information, and/or biographical/demographic information of the user (e.g., the first electronic persona has a high degree of privacy and thus can be associated with a low amount of personal information of the user). Thus, when a QR code is generated using the first electronic persona, very little (and/or no) preference information, contact information, and/or biographical/demographic information of the user can be embedded within the QR code. Accordingly, when the first electronic persona is used to generate a QR code, the point-of-sale device can learn only the small amount of available personal information of the user that is embedded within and/or correlated/mapped to the QR code. In various cases, the second electronic persona, which has a low degree of privacy, can correspond to and/or specify much (and/or all) available preference information, contact information, and/or biographical/demographic information of the user (e.g., the second electronic persona has a low degree of privacy and thus can be associated with a high amount of personal information of the user). Thus, when a QR code is generated using the second electronic persona, much (and/or all) available preference information, contact information, and/or biographical/demographic information of the user can be embedded within and/or correlated/mapped to the QR code. Accordingly, when the second electronic persona is used to generate a QR code, the point-of-sale device can learn the large amount of personal information of the user that is embedded within and/or correlated/mapped to the QR code. In some cases, the third electronic persona, which has an intermediate degree of privacy, can correspond to and/or specify an intermediate amount of available preference information, contact information, and/or biographical/demographic information of the user. Thus, when a QR code is generated using the third electronic persona, the intermediate amount of available preference information, contact information, and/or biographical/demographic information of the user can be embedded within and/or correlated/mapped to the QR code. Accordingly, when the third electronic persona is used to generate a QR code, the point-of-sale device can learn the intermediate amount of personal information of the user that is embedded within and/or correlated/mapped to the QR code. Although the above example includes only three different privacy levels, this is non-limiting and exemplary. In various aspects, a user of the smart device can establish and/or set up (e.g., via any suitable interface device) any suitable and/or desired number of electronic personas having any suitable number and/or degrees of privacy levels. In this way, a user can control what personal information of the user is shared throughout QR codes during transactions.

Various embodiments of the subject innovation can be employed to use hardware and/or software to solve problems that are highly technical in nature (e.g., to facilitate electronic generation and display of enhanced, transaction-based QR codes for improved privacy and fraud detection), that are not abstract and that cannot be performed as a set of mental acts by a human. Further, some of the processes performed can be performed by a specialized computer (e.g., QR code generators, QR code scanners/readers) for carrying out defined tasks related to electronic generation and display of enhanced, transaction-based QR codes for improved privacy and fraud detection (e.g., obtaining context information associated with a transaction, encrypting such context information into a quick response code, and displaying the quick response code to a scanner/reader; obtaining transaction restrictions/conditions, encrypting such transaction restrictions/conditions into a quick response code, and displaying the quick response code to a scanner/reader; obtaining biometric information of an attempted user, determining whether the biometric information matches and/or corresponds to stored biometric information corresponding to authorized users, and displaying a quick response code only if the attempted user is determined to be an authorized user; obtaining gesture information of an attempted user, determining whether the gesture information matches and/or corresponds to stored gesture information corresponding to authorized users, and displaying a quick response code only if the attempted user is determined to be an authorized user; obtaining preference, contact, and/or biographical information of a user, encrypting the preference, contact, and/or biographical information into a quick response code, and displaying the quick response code to a scanner/reader; maintaining a set of electronic personas, identifying an applicable electronic persona based on biometric information and/or transactional context information, generating a quick response code based on the identified electronic persona, and displaying the quick response code to a scanner/reader). Such defined tasks are not conventionally performed manually by humans. Moreover, neither the human mind nor a human with pen and paper can electronically generate and/or electronically display a QR code, nor can the human mind or a human with pen and paper encrypt, encode, and/or embed specified information into (and/or otherwise correlate/map specified information to) a QR code. Instead, various embodiments of the subject innovation are inherently and inextricably tied to computer technology and cannot be implemented outside of a computing environment (e.g., only cryptographic techniques implemented by a computing device can electronically generate QR codes, only computing devices with computer screens can electronically display QR codes, only computing devices with scanning/optical sensors can scan/read QR codes).

In various instances, embodiments of the subject innovation can integrate into a practical application the disclosed teachings regarding enhanced, transaction-based QR codes for improved privacy and fraud detection. Indeed, in various embodiments, the disclosed teachings can provide a computerized system that electronically generates and/or electronically displays quick response codes depending upon context of a current transaction (e.g., geo-location of the transaction, time/date of the transaction, products/services involved in the transaction, price/value of the transaction, identity of merchant facilitating the transaction), depending upon transactional restrictions applicable to the transaction (e.g., geo-fencing restrictions, temporal restrictions, product/service restrictions, value/price restrictions, merchant identity restrictions), depending upon biometric triggering criteria (e.g., fingerprints of the user, facial images of the user, vocal signatures of the user), depending upon motion-based triggering criteria (e.g., detected motions, gestures, tilts, and/or orientations of the smart device), depending upon preference, contact, and/or biographical information (e.g., food preferences, entertainment preferences, allergies, phone numbers, email address, and so on can be encoded in quick response codes), and/or depending upon selected and/or active electronic personas (e.g., different personas can be associated with different QR code generation rules, restrictions, and/or information). As explained herein, such computerized systems produce real-world results. Specifically, real-world smart devices (e.g., smart phones/tablets) outfitted with software and/or hardware as described herein can electronically generate and electronically display real-world QR codes (e.g., matrix barcodes) on real-world computing screens/monitors that can be read by real-world barcode scanners in order to safely, securely, and/or privately transfer specified information. Such computerized systems improve the safety, security, and/or privacy of commercial transactions. Moreover, in various embodiments, by enriching electronically generated and/or displayed QR codes with various types of information (e.g., context-based information, restriction-based information, privacy-based information), an amount and/or time of backend processing of such QR codes can be reduced (e.g., since context-based information, restriction-based information, and/or privacy-based information is directly represented in and/or by the QR code itself, backend databases need not be extensively searched and/or queried to obtain such information; this can accordingly save computing resources and/or reduce computer processing times). Thus, various embodiments of the subject innovation clearly constitute a useful and practical application of computers.

It should be appreciated that the herein figures are exemplary and non-limiting.

FIG. 1 illustrates a high-level block diagram of an example, non-limiting system 100 that can facilitate enhanced, context-based QR code generation in accordance with one or more embodiments described herein. As shown, a QR code system 102 can be implemented (e.g., as software, hardware, and/or any suitable combination of software and/or hardware) on a smart device 104. In various aspects, the smart device 104 can be any suitable computing device that possesses a display 106 (e.g., an electronic display, a computer screen/monitor). For instance, in some cases, the smart device 104 can be a smart phone, a smart tablet, a smart watch, a laptop computer, a desktop computer, and/or any other suitable computing device). As shown, the smart device 104 can electronically communicate (e.g., via any suitable wired and/or wireless electronic connection) with a point-of-sale device 108 (POS device 108). In various instances, the POS device 108 can be any suitable computing device that possesses a scanner 110. In various aspects, the scanner 110 can be any suitable optical sensor and/or imaging device (e.g., barcode scanner, camera) that can sense and/or capture optical and/or visual information rendered and/or displayed on the display 106. In some cases, the POS device 108 can be an automated cash register and/or kiosk which can interact with customers before, during, and/or after commercial transactions. As shown, in various cases, the POS device 108 can communicate via any suitable wired and/or wireless electronic connection with a payment processing system 112. In various aspects, the payment processing system 112 can be any suitable set of servers and/or databases that can receive information from the POS device 108, that can process and/or evaluate such information (e.g., for verification/validation purposes), that can relay such information to transaction settlement systems (not shown in FIG. 1), and/or so on.

Although not explicitly shown in FIG. 1, the smart device 104 can comprise any suitable human-computer interface apparatus (e.g., keyboard, buttons, voice control, touchscreen) that allows a user of the smart device 104 to provide input to the smart device 104 and/or to the QR code system 102. Similarly, although not explicitly shown in FIG. 1, the POS device 108 can comprise any suitable human-computer interface apparatus (e.g., keyboard, buttons, voice control, touchscreen) that allows a user of the POS device 108 to provide input to the POS device 108. In various cases, the smart device 104 can be online and/or offline. Similarly, the POS device 108 can be online and/or offline.

In various embodiments, the QR code generation system 102 can comprise a processor 114 (e.g., computer processing unit, microprocessor) and a computer-readable memory 116 that is operably and/or operatively and/or communicatively connected/coupled to the processor 114. The memory 116 can store computer-executable instructions which, upon execution by the processor 114, can cause the processor 114 and/or other components of the QR code generation system 102 (e.g., payment component 118, transaction context component 120, code generation component 122, and/or display component 124) to perform one or more acts. In various embodiments, the memory 116 can store computer-executable components (e.g., payment component 118, transaction context component 120, code generation component 122, and/or display component 124), and the processor 114 can execute the computer-executable components.

In various instances, the QR code system 102 can comprise a payment component 118. In various aspects, the payment component 118 can store, maintain, receive, and/or retrieve financial instrument information associated with a user of the smart device 104. For example, the payment component 118 can receive and/or store input from a user of the smart device 104, which input specifies a credit card number associated with the user, a debit card number associated with the user, a bank account number associated with the user, a bank routing number associated with the user, a gift card number associated with the user, and/or any other suitable financial instrument information and/or identifier which can be used by the user as a form of payment and/or currency for a commercial transaction. As another example, the payment component 118 can retrieve such financial instrument information from any suitable database and/or data structure which the payment component 118 can electronically access (e.g., if a computer memory on the smart device 104 stores such financial instrument information, the payment component 118 can access the computer memory to obtain the financial instrument information; if a mobile application on the smart device 104 stores such financial instrument information, the payment component 118 can access the mobile application to obtain the financial instrument information; if an internet website, social media account, and/or other online account stores such financial instrument information, the payment component 118 can access the internet website, social media account, and/or other online account to obtain the financial instrument information). In various aspects, the payment component 118 can implement any suitable computing techniques to receive, retrieve, and/or store such financial instrument information. As explained herein, the QR code system 102 can, in various cases, encode and/or encrypt such financial instrument information into (and/or can otherwise correlate/map such financial instrument information to) one or more electronically generated QR codes, the smart device 104 can visually render (e.g., via the display 106) such one or more electronically generated QR codes, the POS device 108 can scan such one or more electronically generated QR codes (e.g., via the scanner 110), and the payment processing system 112 can interpret, evaluate, and/or process such one or more electronically generated QR codes to learn such financial instrument information. In this way, safe, secure, and/or private transmission and/or conveyance of such financial instrument information can be facilitated.

In various aspects, the QR code system 102 can comprise a transaction context component 120. In various cases, the transaction context component 120 can sense, detect, receive, and/or learn context-based information regarding a current transaction in which a user of the smart device 104 is engaging. As explained herein, such context-based information can include any suitable data and/or metadata that describes and/or characterizes the current transaction. For example, such context-based information can include geo-location information that describes the current transaction (e.g., indicating the geographic location and/or area in which the current transaction is occurring), time/date information that describes the current transaction (e.g., indicating the date and/or time of day at which the current transaction is occurring), product/service information that describes the current transaction (e.g., indicating the products and/or services that are being purchased, rented, and/or provided in the current transaction), price/value information that describes the current transaction (e.g., indicating the overall and/or itemized costs and/or prices that are being charged and/or paid in the current transaction), merchant identifier information that describes the current transaction (e.g., indicating identifying information that corresponds to the merchant that is facilitating the current transaction), and/or user identifier information that describes the current transaction (e.g., indicating identifying information that corresponds to the user of the smart device 104 that is engaging in the current transaction). As explained herein, the transaction context component 120 can, in some cases, detect and/or sense such context-based information by leveraging hardware and/or software included in the smart device 104 (e.g., if the smart device 104 includes GPS and/or geo-location sensors, the transaction context component 120 can learn the geo-location of the smart device 104 and thus geo-location of the current transaction; if the smart device 104 includes a clock and/or electronic calendar, the transaction context component 120 can learn the current time/date indicated by the smart device 104 and thus time/date of the current transaction; if the smart device 104 includes cameras and/or optical sensors, the transaction context component 120 can learn the product/services and/or prices/values involved in the current transaction such as by scanning price tags and/or UPC codes). As also explained herein, in some cases, the transaction context component 120 can, in some cases, learn such context-based information by receiving an electronic signal from a beacon and/or transmitter that is at or near the POS device 108 (e.g., if the POS device 108 includes a beacon and/or transmitter, the POS device 108 can identify for the transaction context component 120 the location of the current transaction, the time/date of the current transaction, which products/services are involved in the current transaction, what prices/values are involved in the current transaction, and/or which merchant is facilitating the current transaction). In some instances, the transaction context component 120 can simply receive such context-based information from input provided by a user of the smart device 104. As explained herein, the QR code system 102 can, in various cases, encode, encrypt, and/or embed such context-based information into (and/or can otherwise correlate/map such context-based information to) one or more electronically generated QR codes, the smart device 104 can visually render (e.g., via the display 106) such one or more electronically generated QR codes, the POS device 108 can scan (e.g., via the scanner 110) such one or more electronically generated QR codes to learn such context-based information, and the payment processing system 112 can cross-check such context-based information in order to help detect and/or prevent fraudulent transactions. In this way, safe, secure, and/or private transmission and/or conveyance of financial instrument information can be facilitated.

In various embodiments, the QR code system 102 can comprise a code generation component 122. In various aspects, the code generation component 122 can electronically generate, via any suitable cryptographic and/or computational techniques, one or more QR codes (e.g., optical barcodes of any suitable dimensionality, any suitable shape, and/or any suitable colors and/or combinations of colors) based on the financial instrument information received by the payment component 118 and/or based on the context-based information received by the transaction context component 120. In other words, the code generation component 122 can create a QR code which cryptographically represents and/or indicates and/or is correlated to the financial instrument information of the payment component 118 and/or the context-based information of the transaction context component 120. In various cases, the code generation component 122 can implement any suitable encoding mode for the electronic and/or computational creation of QR codes (e.g., numeric, alphanumeric, byte/binary, kanji).

In various instances, the QR code system 102 can comprise a display component 124. In various aspects, the display component 124 can generate a display command and/or a display instruction which can be transmitted to the smart device 104 and which can command and/or instruct the display 106 of the smart device 104 to visually render and/or illustrate the one or more QR codes that are electronically generated and/or created by the code generation component 122.

Overall, the QR code system 102 can facilitate the safe, secure, and/or private transmission and/or conveyance of financial instrument information from the smart device 104 to the POS device 108 and/or to the payment processing system 112. Specifically, in various cases, the payment component 118 can receive, obtain, and/or maintain financial instrument information of a user of the smart device 104, where communication of the financial instrument information from the smart device 104 to the payment processing system 112 can facilitate the transfer of payment from the user of the smart device 104 to an owner/operator of the POS device 108 for a current transaction. In various cases, the transaction context component 120 can receive, detect, and/or sense context-based information regarding the current transaction (e.g., geo-location, time/date, products/services, prices/values, merchant/user identifiers). In various instances, the code generation component 122 can electronically generate a QR code into which the financial instrument information and the context-based information are encoded, encrypted, and/or embedded (and/or to which such context-based information is correlated/mapped). In various aspects, the display component 124 can send a display command/instruction to the smart device 104, which can cause the display 106 of the smart device 104 to visually render the QR code electronically generated by the code generation component 122. In various cases, the POS device 108 can read, via the scanner 110, the QR code visually rendered by the display 106 and can extract from the QR code the financial instrument information and the context-based information, and the POS device 108 can transmit such information to the payment processing system 112. In various instances, the payment processing system 112 can cross-check the context-based information extracted from the QR code with known characteristics of the current transaction, and can accordingly accept or refuse to accept the financial instrument information contained within and/or correlated to the QR code. In this way, safety, security, and/or privacy of commercial transactions can be improved (e.g., conventional computerized payment processing systems only convey financial instrument information; they do not convey and/or cross-check context-based information).

Figure 2:
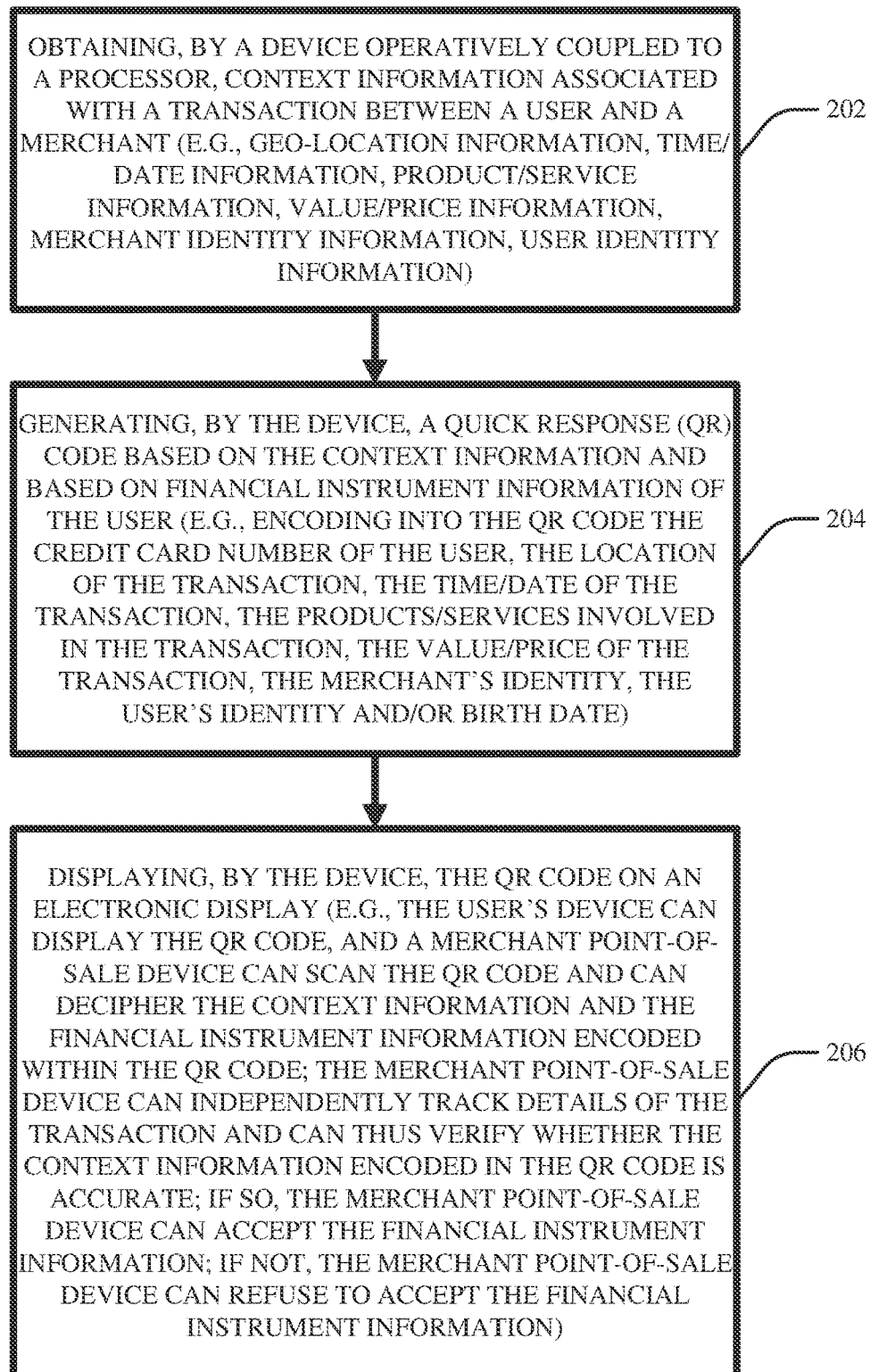
FIG. 2 illustrates a high-level flow diagram of an example, non-limiting computer-implemented method that facilitates enhanced, context-based QR code generation in accordance with one or more embodiments described herein.

FIG. 2 illustrates a high-level flow diagram of an example, non-limiting computer-implemented method 200 that can facilitate enhanced, context-based QR code generation in accordance with one or more embodiments described herein. In various cases, the computer-implemented method 200 can be facilitated by the system 100.

In various embodiments, act 202 can include obtaining, by a device operatively coupled to a processor (e.g., 118), context information associated with a transaction between a user and a merchant. For instance, such context information can include geo-location information, time/date information, product/service, value/price information, merchant identity information, and/or user identity information.

In various aspects, act 204 can include generating, by the device (e.g., 120), a quick response (QR) code based on the context information and based on financial instrument information of the user. For example, this can include encoding into the QR code the credit card number of the user, the location of the transaction, the time/date of the transaction, the products/services involved in the transaction, the value/price of the transaction, identifying information of the merchant facilitating the transaction, and/or identifying information of the user engaging in the transaction.

In various instances, act 206 can include displaying, by the device (e.g., 124 and/or 104), the QR code on an electronic display (e.g., 106). For example, the user's device (e.g., 104) can display the QR code, and a merchant point-of-sale device (e.g., 108) can scan the QR code and can decipher the context information and the financial instrument information encoded within the QR code. In various cases, the merchant point-of-sale device can independently track and/or record details characterizing the transaction (e.g., the point-of-sale device can independently track the location of the transaction, the time/date of the transaction, the products/services being sold/provided in the transaction, the overall and/or itemized prices/costs involved in the transaction, and/or the identity of the merchant facilitating the transaction). Thus, the point-of-sale device can, in some cases, verify whether the context information encoded in the QR code is accurate (e.g., can determined whether the context information in the QR code matches and/or corresponds to the context information independently known/ tracked/recorded by the point-of-sale device). If so, the point-of-sale device can accept the financial instrument information. If not, the point-of-sale device can refuse to accept the financial instrument information.

Figure 3:
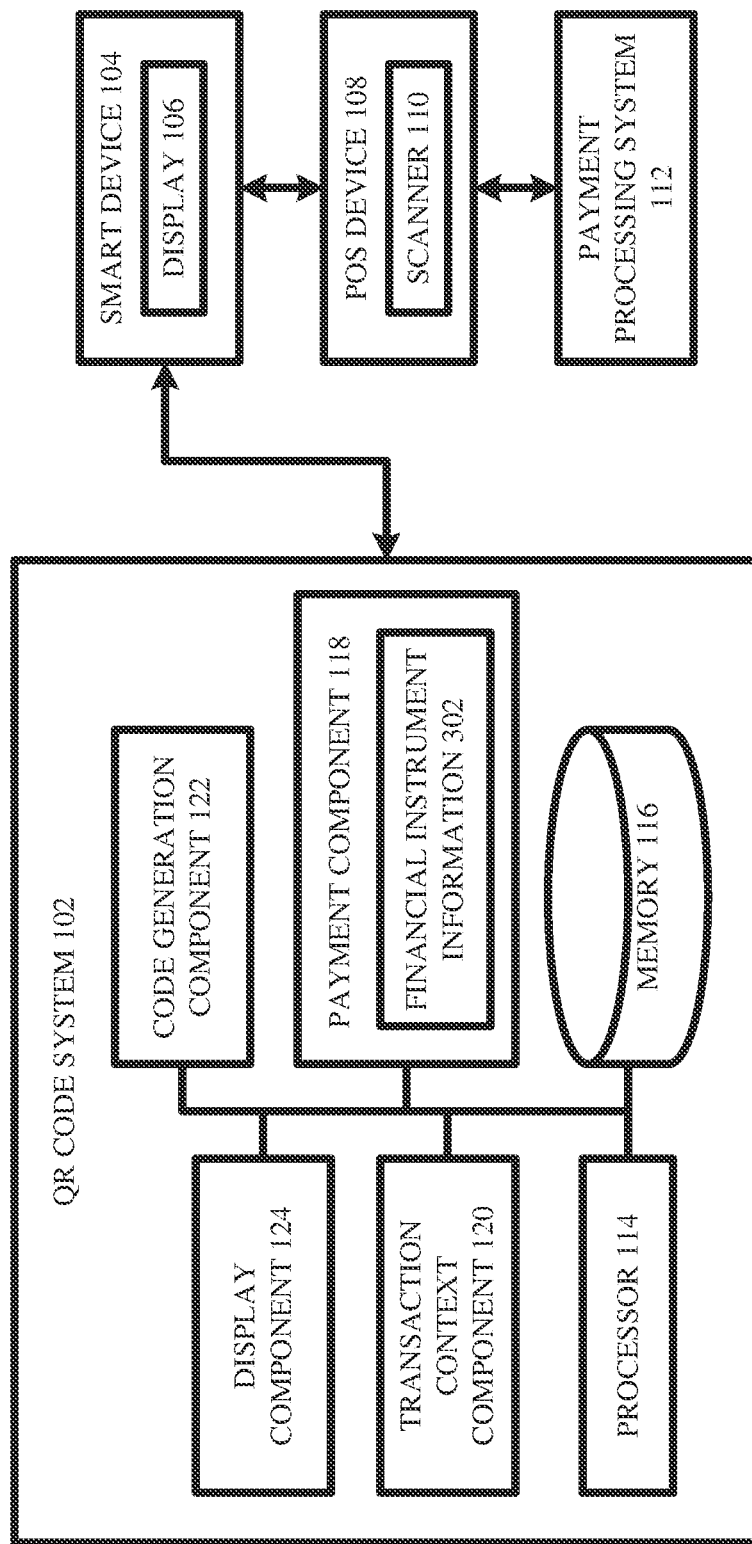
FIG. 3 illustrates a high-level block diagram of an example, non-limiting system including financial instrument information that facilitates enhanced, context-based QR code generation in accordance with one or more embodiments described herein.

FIG. 3 illustrates a high-level block diagram of an example, non-limiting system 300 including financial instrument information that can facilitate enhanced, context-based QR code generation in accordance with one or more embodiments described herein. As shown, the system 300 can, in some cases, comprise the same components as the system 100, and can further comprise financial instrument information 302.

In various embodiments, the financial instrument information 302 can be any suitable information pertaining to financial instruments and/or financial accounts associated with a user of the smart device 104. In other words, the financial instrument information 302 can be any suitable information and/or token the communication of which from a customer to a vendor can facilitate the transfer of payment from the customer to the vendor. Non-limiting examples of the financial instrument information 302 can include credit card numbers, debit card numbers, bank account numbers, bank routing numbers, gift card numbers, and/or coupon numbers. As mentioned above, the payment component 118 can, in some cases, receive the financial instrument information 302 as input from the user of the smart device 104. In other cases, the payment component 118 can automatically detect and/or retrieve the financial instrument information 302 from any suitable database and/or data structure which can be electronically accessed by the payment component 118 (e.g., a memory on the smart device 104; a mobile application on the smart device 104; a website, application, and/or social media profile/account accessible via the internet).

Figure 4:
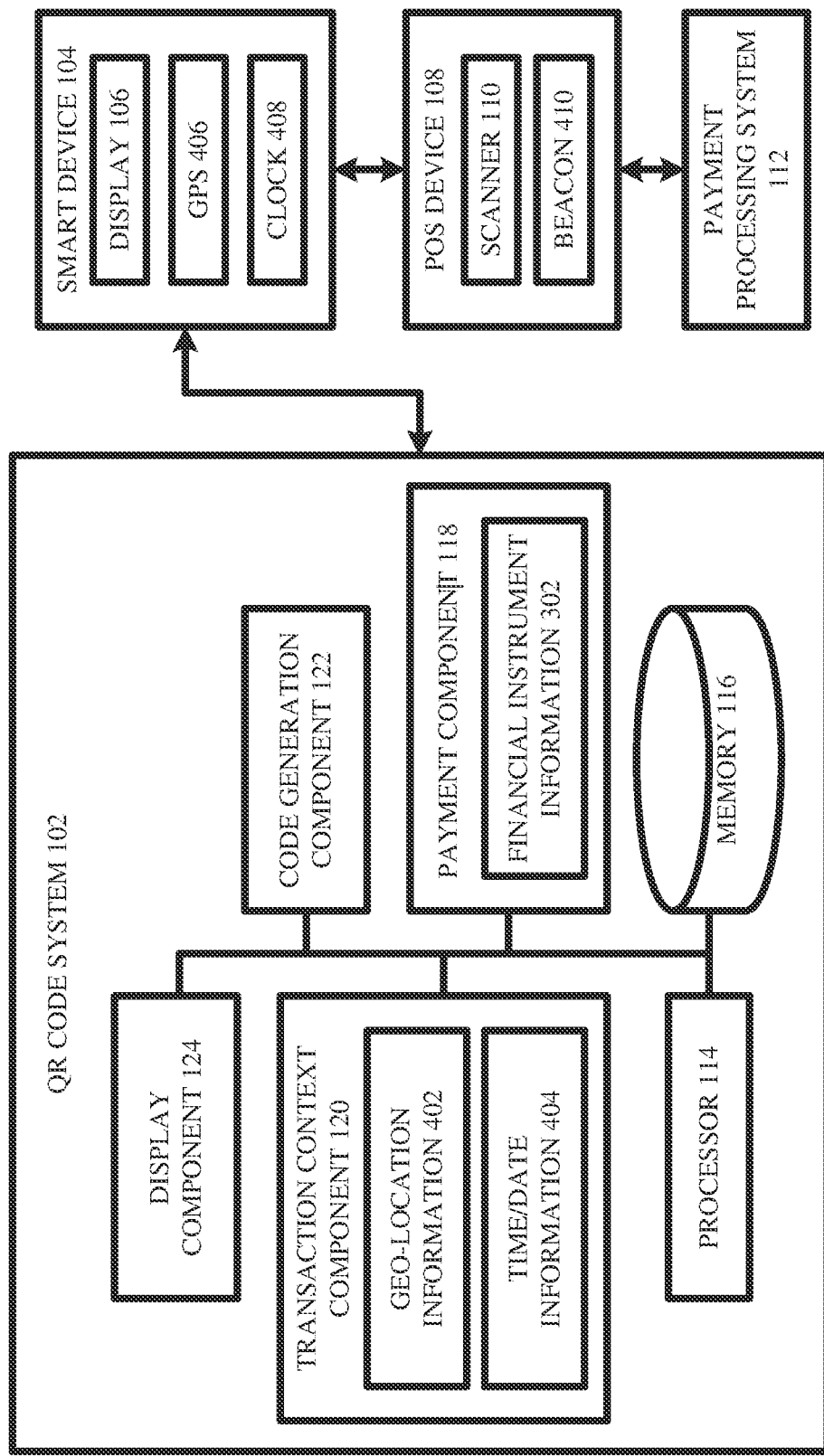
FIG. 4 illustrates a high-level block diagram of an example, non-limiting system including geo-location and time/date information that facilitates enhanced, context-based QR code generation in accordance with one or more embodiments described herein.

FIG. 4 illustrates a high-level block diagram of an example, non-limiting system 400 including geo-location and time/date information that can facilitate enhanced, context-based QR code generation in accordance with one or more embodiments described herein. As shown, the system 400 can, in some aspects, comprise the same components as the system 300, and can further comprise geo-location information 402 and/or time/date information 404.

In various instances, the geo-location information 402 can be any suitable indication of the geographic location of the smart device 104 during a current transaction (e.g., the geographic location of the smart device 104 when the code generation component 122 generates a QR code). In various cases, the geo-location information 402 can be indicated at any suitable level of granularity (e.g., continent in which the smart device 104 is located at a current time and/or when the code generation component 122 generates a particular QR code, country in which the smart device 104 is located at a current time and/or when the code generation component 122 generates a particular QR code, state/province in which the smart device 104 is located at a current time and/or when the code generation component 122 generates a particular QR code, city/town in which the smart device 104 is located at a current time and/or when the code generation component 122 generates a particular QR code, address at which the smart device 104 is located at a current time and/or when the code generation component 122 generates a particular QR code, latitude/longitude/elevation at which the smart device 104 is located at a current time and/or when the code generation component 122 generates a particular QR code, and/or any other suitable demarcated geographical region/area at which the smart device 104 is located at a current time and/or when the code generation component 122 generates a particular QR code). In various aspects, any suitable geo-fencing information, as described in more detail below, can be represented by the geo-location information 402. In various instances, the transaction context component 120 can detect and/or sense the geo-location information 402 by leveraging a GPS 406 of the smart device 104. In various cases, the GPS 406 can be any suitable geo-location sensor and/or geo-positioning sensor that can be used to determine, infer, and/or track the physical location of the smart device 104. In some cases, the geo-location information 402 can be manually inputted by the user of the smart device 104.

In various instances, the time/date information 404 can be any suitable indication of the time and/or date of a current transaction (e.g., the time and/or date at which the code generation component 122 generates a QR code). In various cases, the time/date information 404 can be indicated at any suitable level of granularity (e.g., decade and/or year during which the code generation component 122 generates a particular QR code, month during which the code generation component 122 generates a particular QR code, day during which the code generation component 122 generates a particular QR code, hour during which the code generation component 122 generates a particular QR code, minute during which the code generation component 122 generates a particular QR code, and/or second during which the code generation component 122 generates a particular QR code). In various instances, the transaction context component 120 can detect and/or sense the time/date information 404 by leveraging a clock 408 of the smart device 104. In various cases, the clock 408 can be any suitable time sensor, date sensor, and/or electronic calendar that can be used to determine, infer, and/or track time and/or date. In some cases, the time/date information 404 can be manually inputted by the user of the smart device 104.

As mentioned above, in some cases, the POS device 108 can independently track the geographic location of a transaction and/or the time/date of a transaction. Accordingly, in various embodiments, the POS device 108 can comprise a beacon 410. In various cases, the beacon 410 can be any suitable transmitter that can emit an electronic signal which can be received by the smart device 104 and/or the QR code system 102. In various aspects, the electronic signal of the beacon 410 can contain and/or indicate the geo-location information 402 and/or the time/date information 404. In various cases, the transaction context component 120 can thus be informed of the geo-location information 402 and/or the time/date information 404 by the beacon 410. Although FIG. 4 depicts the beacon 410 as being a sub-component of the POS device 108. This is illustrative and non-limiting only. In various cases, the beacon 410 can be remote and/or separate from the POS device 108.

Figure 5:
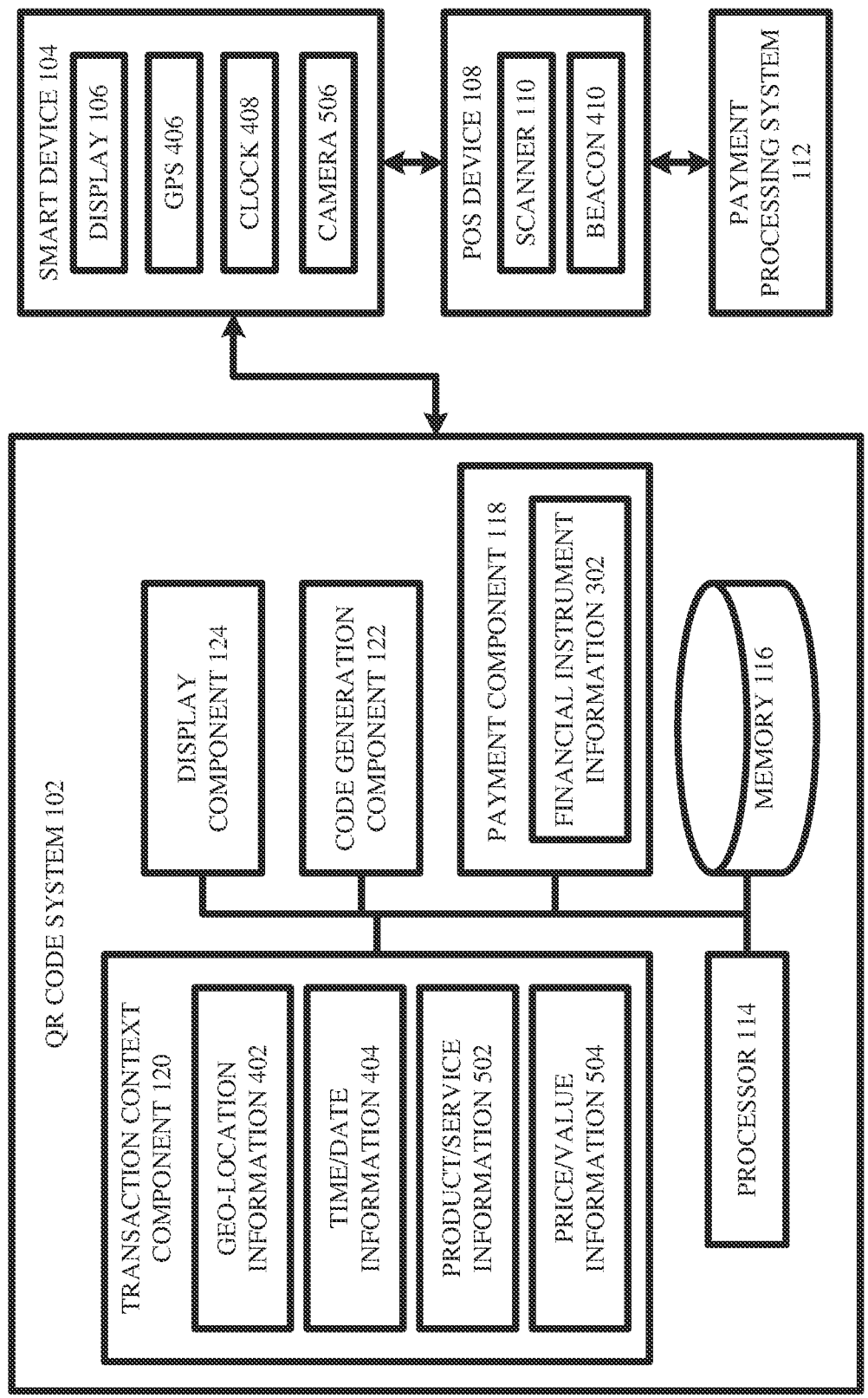
FIG. 5 illustrates a high-level block diagram of an example, non-limiting system including produce/service and price/value information that facilitates enhanced, context-based QR code generation in accordance with one or more embodiments described herein.

FIG. 5 illustrates a high-level block diagram of an example, non-limiting system 500 including produce/service and price/value information that can facilitate enhanced, context-based QR code generation in accordance with one or more embodiments described herein. As shown, the system 500 can, in some cases, comprise the same components as the system 400, and can further comprise product/service information 502 and/or price/value information 504.

In various instances, the product/service information 502 can be any suitable indication of the identities of the products and/or services that are being purchased, rented, procured, and/or provided during the current transaction (e.g., the identities of the products and/or services being procured by the user of the smart device 104 and/or being provided by the owner/operator of the POS device 108 when the code generation component 122 generates a QR code). In various cases, the product/service information 502 can be indicated at any suitable level of granularity (e.g., categories, types, and/or classes of products/services that are being procured/provided when the code generation component 122 generates a particular QR code; serial numbers and/or universal product codes of products/services that are being procured/provided when the code generation component 122 generates a particular QR code; and/or brands and/or names of products/services that are being procured/provided when the code generation component 122 generates a particular QR code). In various instances, the transaction context component 120 can detect, sense, and/or infer the product/service information 502 by leveraging a camera 506 of the smart device 104. In various cases, the camera 506 can be any suitable optical sensor and/or imaging device that can capture images and/or optical information. In various instances, the camera 506 can be used to capture images of products/services, and computer vision algorithms can analyze such captured images to infer the identities of the products/services being procured/provided. In various aspects, the camera 506 can be used to capture images of universal product codes and/or tags associated with products/services, and the identities of the relevant products/services can be inferred/determined based on the information stored within the universal product codes and/or tags. In some cases, the product/service information 502 can be manually inputted by the user of the smart device 104. In some cases, the product/service information 502 can be inferred by the transaction context component 120 based on an online shopping cart associated with the user of the smart device 104.

In various instances, the price/value information 504 can be any suitable indication of the overall and/or itemized prices, costs, and/or monetary amounts that are being charged and/or paid in the current transaction (e.g., the amount of money that the owner/operator of the POS device 108 is charging to the user of the smart device 104 for the provision of products/services). In various cases, the price/value information 504 can be indicated at any suitable level of granularity (e.g., overall/total monetary amount to be charged/paid when the code generation component 122 generates a particular QR code, itemized monetary amounts to be charged/paid when the code generation component 122 generates a particular QR code, a price threshold not exceeded by the overall/total monetary amount to be charged/paid when the code generation component 122 generates a particular QR code, a price threshold exceeded by the overall/total monetary amount to be charged/paid when the code generation component 122 generates a particular QR code, price thresholds not exceeded by the itemized monetary amounts to be charged/paid when the code generation component 122 generates a particular QR code, and/or price thresholds exceeded by the itemized monetary amounts to be charged/paid when the code generation component 122 generates a particular QR code). In various instances, the transaction context component 120 can detect, sense, and/or infer the price/value information 504 by leveraging the camera 506 of the smart device 104. The camera 506 can, in various cases, be used to capture images of price tags associated with the products/services that are being procured/provided during the current transaction, and computer vision algorithms can be used to analyze such captured images to infer the total and/or itemized prices of the products/services being procured/provided. In various other cases, the camera 506 can be used to capture images of universal product codes and/or tags associated with products/services, and the total and/or itemized prices of the relevant products/services can be inferred/determined based on the information stored within the universal product codes and/or tags. In some cases, the price/value information 504 can be manually inputted by the user of the smart device 104. In some cases, the price/value information 504 can be inferred by the transaction context component 120 based on an online shopping cart associated with the user of the smart device 104.

As mentioned above, in some cases, the POS device 108 can independently track the products/services and/or prices/values involved in a transaction (e.g., the POS device 108 can learn the products/services and/or prices/values involved in the transaction by scanning universal product codes during checkout). Accordingly, in various embodiments, the POS device 108 can, via the beacon 410, emit an electronic signal that can contain and/or indicate the product/service information 502 and/or the price/value information 504. In various cases, the transaction context component 120 can thus be informed of the product/service information 502 and/or the price/value information 504 by the beacon 410.

Figure 6:
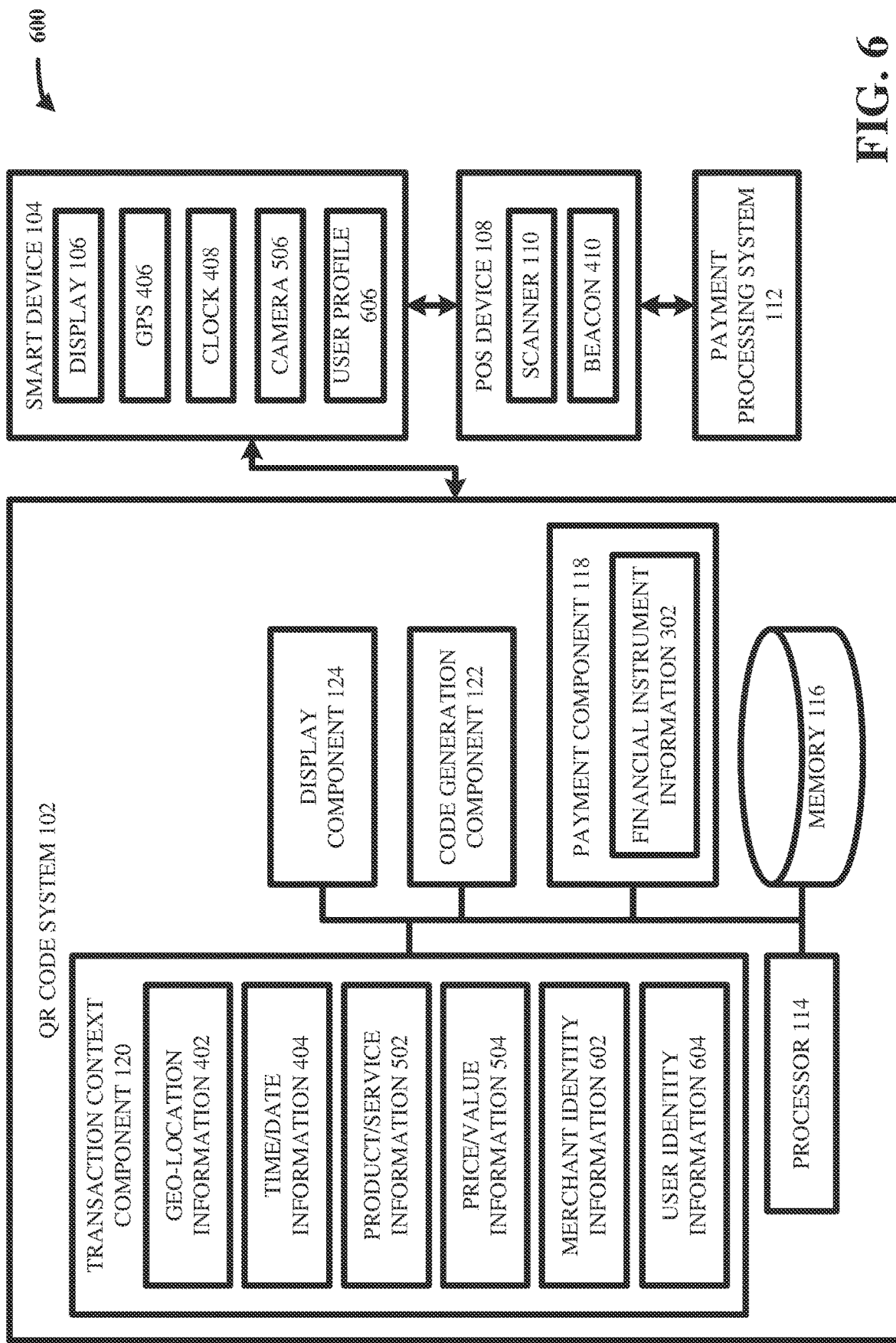
FIG. 6 illustrates a high-level block diagram of an example, non-limiting system including merchant identity and/or user identify information that facilitates enhanced, context-based QR code generation in accordance with one or more embodiments described herein.

FIG. 6 illustrates a high-level block diagram of an example, non-limiting system 600 including merchant identity and/or user identify information that can facilitate enhanced, context-based QR code generation in accordance with one or more embodiments described herein. As shown, the system 600 can, in some cases, comprise the same components as the system 500, and can further comprise merchant identity information 602 and/or user identity information 604.

In various instances, the merchant identity information 602 can be any suitable indication of the identity of the merchant that is facilitating the current transaction (e.g., the identity of the owner/operator of the POS device 108). In various cases, the merchant identity information 602 can be indicated at any suitable level of granularity (e.g., category, type, and/or class of merchant that is facilitating the transaction when the code generation component 122 generates a particular QR code; an identification number, symbol, and/or token corresponding to the merchant that is facilitating the transaction when the code generation component 122 generates a particular QR code; and/or tradename of the merchant that is facilitating the transaction when the code generation component 122 generates a particular QR code). In various instances, the transaction context component 120 can detect, sense, and/or infer the merchant identity information 602 by leveraging the camera 506 of the smart device 104. In various cases, the camera 506 can be used to capture images of logos, billboards, uniforms, name tags, and/or advertisements corresponding to the merchant that is facilitating the current transaction, and computer vision algorithms can analyze such captured images to infer the identity of the merchant. In various other aspects, the beacon 410 can emit an electronic signal which indicates the merchant identity information 602 (e.g., which includes an identifier and/or token corresponding to the merchant). In such case, the transaction context component 120 can learn the merchant identity information 602 from the beacon 410. In some cases, the merchant identity information 602 can be manually inputted by the user of the smart device 104.

In various instances, the user identity information 604 can be any suitable indication of the identity of the user of the smart device 104. In various cases, the user identity information 604 can be indicated at any suitable level of granularity (e.g., full and/or partial name of the user of the smart device 104, birthdate of the user of the smart device 104, occupation of the user of the smart device 104, social security number of the user of the smart device 104, address/residence of the user of the smart device 104, passcode and/or password established by the user of the smart device 104, security questions and/or answers established by the user of the smart device 104, and/or any other identifier that can be associated with the user of the smart device 104). In various instances, the transaction context component 120 can detect, sense, and/or infer the user identity information 604 by leveraging a user profile 606 of the smart device 104. The user profile 606 can, in various cases, be any suitable electronic profile and/or electronic account that is associated with the user of the smart device 104 and/or which contains information associated with the user of the smart device 104 (e.g., a social media account, a mobile application account, an online account). In various aspects, the transaction context component 120 can electronically access the user profile 606 in order to extract and/or retrieve the user identity information 604. In some cases, the user identity information 604 can be manually inputted by the user of the smart device 104.

Figure 7:
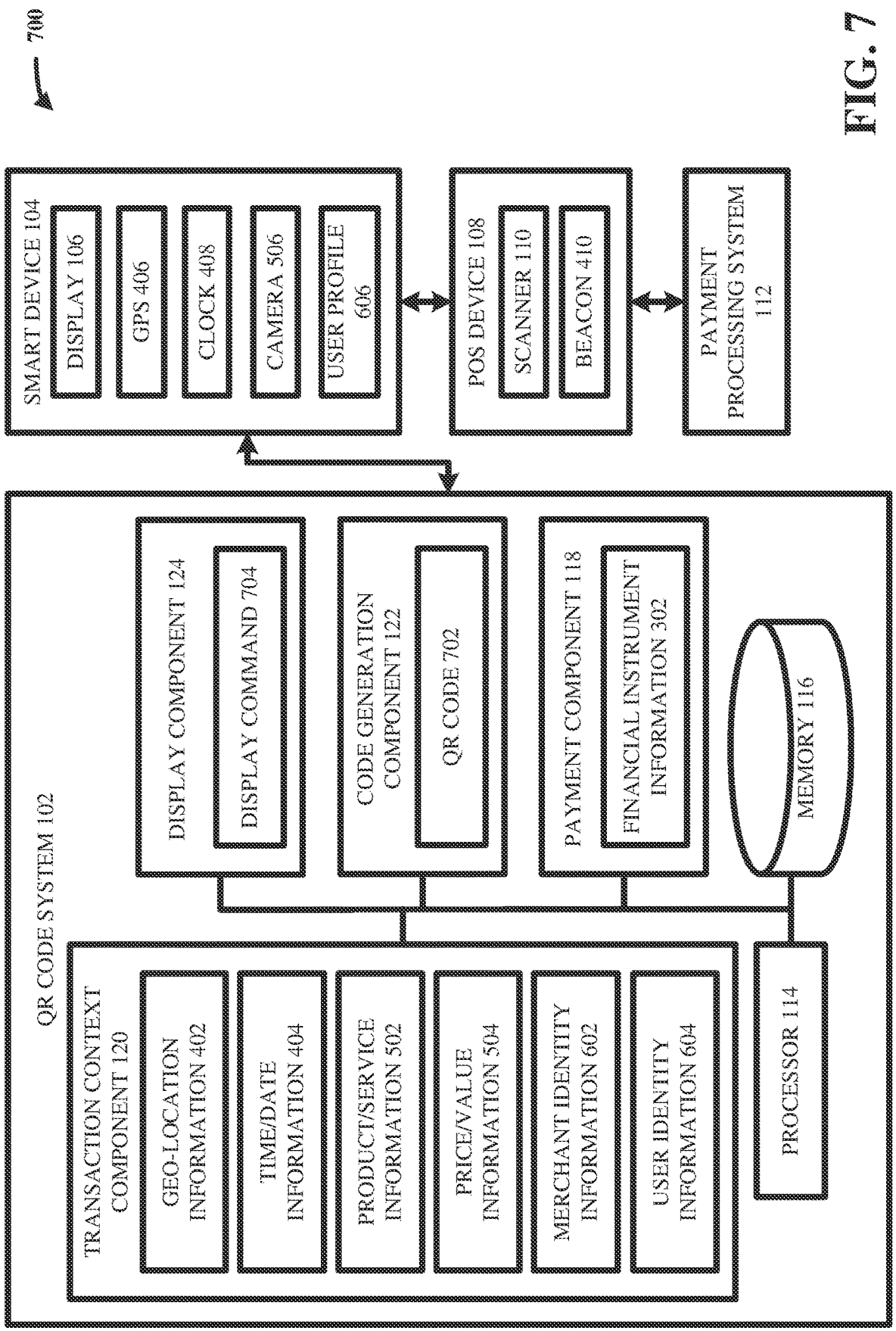
FIG. 7 illustrates a high-level block diagram of an example, non-limiting system including a QR code and a display command that facilitates enhanced, context-based QR code generation in accordance with one or more embodiments described herein.

FIG. 7 illustrates a high-level block diagram of an example, non-limiting system 700 including a QR code and a display command that can facilitate enhanced, context-based QR code generation in accordance with one or more embodiments described herein. As shown, the system 700 can, in some cases, comprise the same components as the system 600, and can further comprise a QR code 702 and/or a display command 704.

In various aspects, the code generation component 122 can electronically generate, via any suitable cryptographic and/or computational technique, the QR code 702 based on the information possessed by the payment component 118 and/or the transaction context component 120. In other words, the code generation component 122 can create the QR code 702 such that the QR code 702 represents, indicates, symbolizes, and/or is correlated to the financial instrument information 302, the geo-location information 402, the time/date information 404, the product/service information 502, the price/value information 504, the merchant identity information 602, and/or the user identity information 604.

In various aspects, the display component 124 can create the display command 704, which can be any suitable electronic command and/or instruction which can cause the smart device 104 to visually render and/or illustrate the QR code 702 on the display 106.

In various aspects, the POS device 108 can scan, via the scanner 110, the QR code 702 that is visually rendered on the display 106, and the POS device 108 can accordingly interpret and/or process the QR code 702 so as to extract the information contained within and/or represented/symbolized by the QR code 702. That is, in various cases, the POS device 108 can scan the QR code 702 that is displayed on the display 106, and thereby can learn the financial instrument information 302 and the context-based information (e.g., the geo-location information 402, the time/date information 404, the product/service information 502, the price/value information 504, the merchant identity information 602, and/or the user identity information 604) that are encoded within the QR code 702. In various aspects, the POS device 108 can then transmit such information to the payment processing system 112 for processing/verification.

In various aspects, encoding and/or embedding context-based information (e.g., 402, 404, 502, 504, 602, and/or 604) into (and/or otherwise correlating/mapping such information to) the QR code 702 can improve privacy and/or fraud detection. Specifically, the POS device 108 can, in some cases, independently track the context of a current transaction. Moreover, the POS device 108 can read, via the scanner 110, context-based information that is encoded and/or embedded within (and/or correlated/mapped to) the QR code 702. In various instances, the POS device 108 can transmit the QR code 702 and the known context of the current transaction to the payment processing system 112, and the payment processing system 112 can compare the known context of the current transaction with the context-based information encoded in and/or correlated to the QR code 702 to determine whether the user of the smart device 104 is attempting fraud.

For example, suppose that a current transaction is taking place in the city of Los Angeles (e.g., the POS device 108 is located within Los Angeles, and the user of the smart device 104 physically approaches the POS device 108 to purchase/procure a product/service). In various cases, the smart device 104 can visually render, via the display 106, the QR code 702, and the POS device 108 can scan, via the scanner 110, the QR code 702. The POS device 108 can then transmit the QR code 702 and an indication that the transaction is known to be occurring in Los Angeles to the payment processing system 112. Accordingly, the payment processing system 112 can process and/or analyze the QR code 702. Suppose that, based on such processing and/or analysis, the payment processing system 112 determines that the QR code 702 indicates the financial instrument information 302 and also indicates that it (the QR code 702) was generated in the city of Los Angeles. In such case, the payment processing system 112 can determine that the geo-location information stored within and/or correlated to the QR code 702 matches and/or corresponds to the known geo-location information of the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates the financial instrument information 302 and also indicates that it (the QR code 702) was generated in the city of Cleveland. In such case, the payment processing system 112 can determine that the geo-location information stored within and/or correlated to the QR code 702 does not match and/or correspond to the known geo-location information of the current transaction. Accordingly, the payment processing system 112 can conclude that the user of the smart device 104 is attempting fraud (e.g., the user of the smart device 104 can have impermissibly captured an image of the QR code 702 from its true owner, who can have been engaging in a transaction in Cleveland and not in Los Angeles, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the geo-location information 402 inputted into and/or correlated to the QR code 702 can be considered as a location stamp that marks the location at which the QR code 702 was generated by the smart device 104. If the location stamp of a given QR code does not match and/or correspond to the known location of a current transaction, it can, in some cases, be determined/inferred that the QR code was not generated for the purpose of the current transaction. Accordingly, financial instrument information in the QR code can be refused.

As another example, suppose that a current transaction is taking place on Jul. 15 of 2020. In various cases, the smart device 104 can visually render, via the display 106, the QR code 702, and the POS device 108 can scan, via the scanner 110, the QR code 702. The POS device 108 can then transmit the QR code 702 and an indication that the transaction is known to be occurring on Jul. 15 of 2020 to the payment processing system 112. Accordingly, the payment processing system 112 can process and/or analyze the QR code 702. Suppose that, based on such processing and/or analysis, the payment processing system 112 determines that the QR code 702 indicates the financial instrument information 302 and also indicates that it (the QR code 702) was generated on Jul. 15 of 2020. In such case, the payment processing system 112 can determine that the time/date information stored within and/or correlated to the QR code 702 matches and/or corresponds to the known time/date information of the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates the financial instrument information 302 and also indicates that it (the QR code 702) was generated on Feb. 21 of 2020. In such case, the payment processing system 112 can determine that the time/date information stored within and/or correlated to the QR code 702 does not match and/or correspond to the known time/date information of the current transaction. Accordingly, the payment processing system 112 can conclude that the user of the smart device 104 is attempting fraud (e.g., the user of the smart device 104 can have impermissibly captured an image of the QR code 702 from its true owner, who can have been engaging in a transaction on Feb. 12 of 2020 and not on Jul. 15 of 2020, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the time/date information 404 inputted into and/or correlated to the QR code 702 can be considered as a time stamp that marks the time/date at which the QR code 702 was generated by the smart device 104. If the time stamp of a given QR code does not match and/or correspond to the known time/date of a current transaction, it can, in some cases, be determined/inferred that the QR code was not generated for the purpose of the current transaction. Accordingly, financial instrument information in the QR code can be refused.

As yet another example, suppose that a current transaction is for the procurement/provision of a lawnmower. In various cases, the smart device 104 can visually render, via the display 106, the QR code 702, and the POS device 108 can scan, via the scanner 110, the QR code 702. The POS device 108 can then transmit the QR code 702 and an indication that the transaction is known to be for the procurement/provision of a lawnmower to the payment processing system 112. Accordingly, the payment processing system 112 can process and/or analyze the QR code 702. Suppose that, based on such processing and/or analysis, the payment processing system 112 determines that the QR code 702 indicates the financial instrument information 302 and also indicates that it (the QR code 702) is for the purpose of procuring a lawnmower. In such case, the payment processing system 112 can determine that the product/service information stored within and/or correlated to the QR code 702 matches and/or corresponds to the known product/service information of the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates the financial instrument information 302 and also indicates that it (the QR code 702) was generated for the purpose of procuring a haircut. In such case, the payment processing system 112 can determine that the product/service information stored within and/or correlated to the QR code 702 does not match and/or correspond to the known product/service information of the current transaction. Accordingly, the payment processing system 112 can conclude that the user of the smart device 104 is attempting fraud (e.g., the user of the smart device 104 can have impermissibly captured an image of the QR code 702 from its true owner, who can have been engaging in a transaction for a haircut and not for a lawnmower, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the product/service information 502 inputted into and/or correlated to the QR code 702 can be considered as a product/service stamp that identifies the products and/or services for which the QR code 702 was generated by the smart device 104. If the product/service stamp of a given QR code does not match and/or correspond to the known products/services involved in a current transaction, it can, in some cases, be determined/inferred that the QR code was not generated for the purpose of the current transaction. Accordingly, financial instrument information in the QR code can be refused.

As still another example, suppose that a current transaction has a total cost of $75.00. In various cases, the smart device 104 can visually render, via the display 106, the QR code 702, and the POS device 108 can scan, via the scanner 110, the QR code 702. The POS device 108 can then transmit the QR code 702 and an indication that the transaction is known to have a total cost of $75.00 to the payment processing system 112. Accordingly, the payment processing system 112 can process and/or analyze the QR code 702. Suppose that, based on such processing and/or analysis, the payment processing system 112 determines that the QR code 702 indicates the financial instrument information 302 and also indicates that it (the QR code 702) is generated for a transaction total of $75.00. In such case, the payment processing system 112 can determine that the price/value information stored within and/or correlated to the QR code 702 matches and/or corresponds to the known price/value information of the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates the financial instrument information 302 and also indicates that it (the QR code 702) is generated for a transaction total of $25.00. In such case, the payment processing system 112 can determine that the price/value information stored within and/or correlated to the QR code 702 does not match and/or correspond to the known price/value information of the current transaction. Accordingly, the payment processing system 112 can conclude that the user of the smart device 104 is attempting fraud (e.g., the user of the smart device 104 can have impermissibly captured an image of the QR code 702 from its true owner, who can have been engaging in a transaction for $25.00 and not for $75.00, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the price/value information 504 inputted into and/or correlated to the QR code 702 can be considered as a price stamp that identifies the overall and/or itemized monetary amounts for which the QR code 702 was generated by the smart device 104. If the price stamp of a given QR code does not match and/or correspond to the known prices/costs involved in a current transaction, it can, in some cases, be determined/inferred that the QR code was not generated for the purpose of the current transaction. Accordingly, financial instrument information in the QR code can be refused.

As an additional example, suppose that a current transaction is facilitated by merchant ABC. In various cases, the smart device 104 can visually render, via the display 106, the QR code 702, and the POS device 108 can scan, via the scanner 110, the QR code 702. The POS device 108 can then transmit the QR code 702 and an indication that the transaction is known to be facilitated by the merchant ABC to the payment processing system 112. Accordingly, the payment processing system 112 can process and/or analyze the QR code 702. Suppose that, based on such processing and/or analysis, the payment processing system 112 determines that the QR code 702 indicates the financial instrument information 302 and also indicates that it (the QR code 702) is generated for a transaction facilitated by merchant ABC. In such case, the payment processing system 112 can determine that the merchant identity information stored within and/or correlated to the QR code 702 matches and/or corresponds to the known merchant identity information of the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates the financial instrument information 302 and also indicates that it (the QR code 702) is generated for a transaction facilitated by merchant XYZ. In such case, the payment processing system 112 can determine that the merchant identity information stored within and/or correlated to the QR code 702 does not match and/or correspond to the known merchant identity information of the current transaction. Accordingly, the payment processing system 112 can conclude that the user of the smart device 104 is attempting fraud (e.g., the user of the smart device 104 can have impermissibly captured an image of the QR code 702 from its true owner, who can have been engaging in a transaction with merchant XYZ and not merchant ABC, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the merchant identity information 602 inputted into and/or correlated to the QR code 702 can be considered as a merchant stamp that identifies and/or corresponds to the merchant for which the QR code 702 was generated by the smart device 104. If the merchant stamp of a given QR code does not match and/or correspond to the known merchant involved in a current transaction, it can, in some cases, be determined/inferred that the QR code was not generated for the purpose of the current transaction. Accordingly, financial instrument information in the QR code can be refused.

As another example, suppose that a current transaction involves a QR code which stores and/or represents user identifier information (e.g., birthdate of a user, address of a user, occupation of a user, password/passcode established by a user, security questions/answers established by a user). In various cases, the smart device 104 can visually render, via the display 106, the QR code 702, and the POS device 108 can scan, via the scanner 110, the QR code 702. The POS device 108 can then transmit the QR code 702 to the payment processing system 112, and the payment processing system 112 can process and/or analyze the QR code 702. Suppose that, based on such processing and/or analysis, the payment processing system 112 determines that the QR code 702 indicates the financial instrument information 302 and also indicates a birthdate of Jan. 19 of 1992. In various cases, the payment processing system 112 can instruct the POS device 108 to query the smart device 104 (e.g., to query the user of the smart device 104) to verify the user's birthdate. If the user of the smart device 104 indicates a birthdate of Jan. 19 of 1992, the payment processing system 112 can determine that the user identity information stored within and/or correlated to the QR code 702 matches and/or corresponds to the user identity information inputted during the current transaction. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that the user of the smart device 104 indicates a birthdate of Dec. 17 of 1985. In such case, the payment processing system 112 can determine that the user identity information stored within and/or correlated to the QR code 702 does not match and/or correspond to the user identity information inputted during the current transaction. Accordingly, the payment processing system 112 can conclude that the user of the smart device 104 is attempting fraud (e.g., the user of the smart device 104 can have impermissibly captured an image of the QR code 702 from its true owner, who can have a birthdate of Jan. 19 of 1992 and not Dec. 17 of 1985, in an attempt to the steal the financial instrument information of the true owner). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

In this way, the user identity information 604 inputted into and/or correlated to the QR code 702 can be considered as a user stamp that identifies and/or corresponds to the user for which the QR code 702 was generated by the smart device 104. If the user stamp of a given QR code does not match and/or correspond to the inputted user information queried during a current transaction, it can, in some cases, be determined/inferred that the QR code was not generated for the purpose of the current transaction. Accordingly, financial instrument information in the QR code can be refused.

Overall, the QR code system 102 can, in some cases, encode, encrypt, and/or embed context-based information into (and/or can otherwise correlate/map such context-based information to) the QR code 702, which can be cross-checked by the payment processing system 112 to heighten transactional safety, security, and/or privacy.

Figure 8:
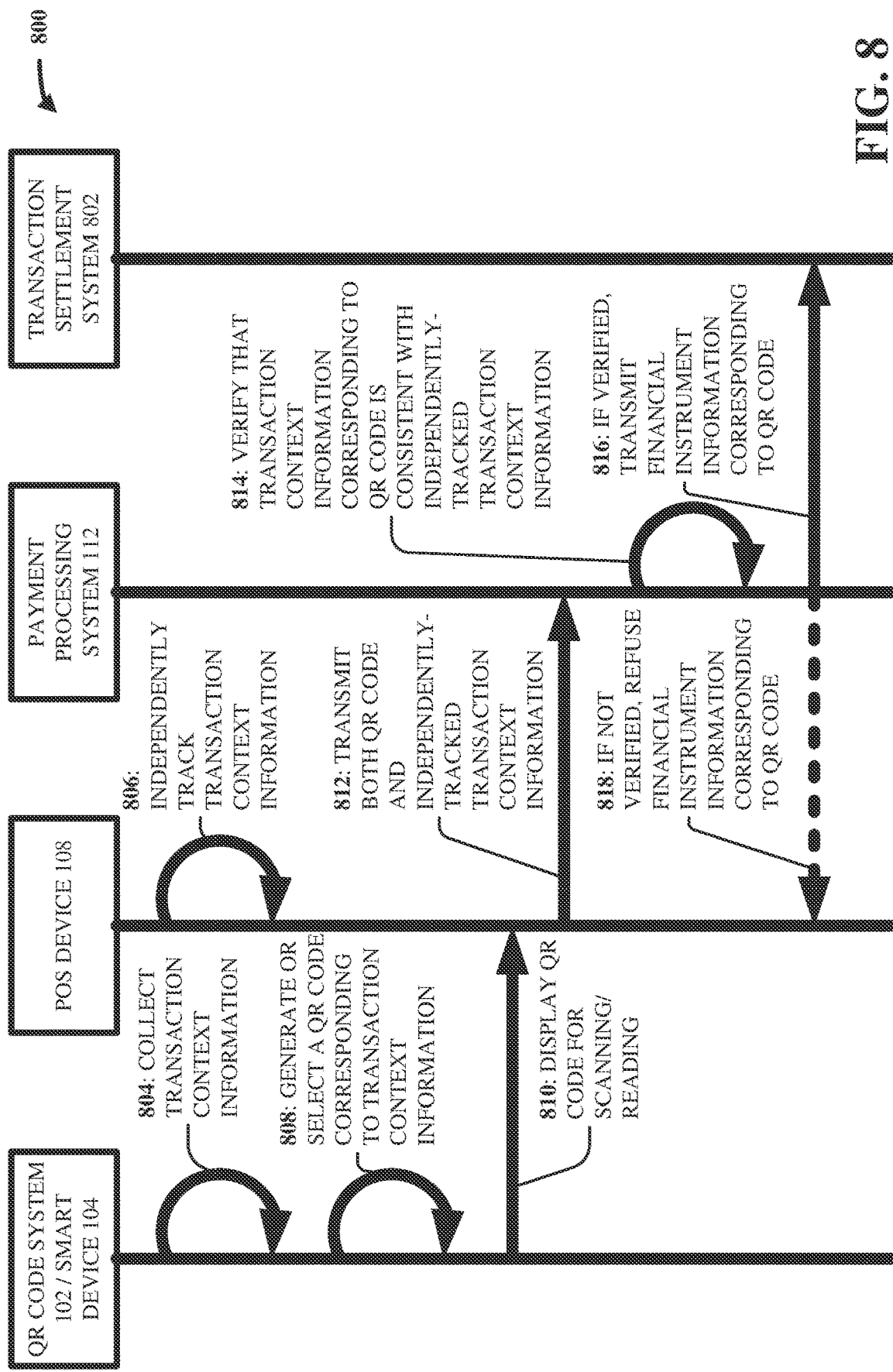
FIG. 8 illustrates a high-level communication diagram of an example, non-limiting workflow that facilitates enhanced, context-based QR code generation in accordance with one or more embodiments described herein.

FIG. 8 illustrates a high-level communication diagram of an example, non-limiting workflow 800 that can facilitate enhanced, context-based QR code generation in accordance with one or more embodiments described herein.

As shown, the QR code system 102 and/or the smart device 104 can, in various embodiments, collect transaction context information at act 804 (e.g., collect the geo-location information 402 via the GPS 406, collect the time/date information 404 via the clock 408, collect the product/service information 502 via the camera 506, collect the price/value information 504 via the camera 506, and/or collect the merchant identity information 602 via the camera 506).

In various cases, the POS device 108 can independently track transaction context information at act 806 (e.g., the POS device 108 can already know the geographic location of the transaction, the time/date of the transaction, the products/services involved in the transaction, the prices/values involved in the transaction, the merchant facilitating the transaction).

In various instances, the QR code system 102 and/or the smart device 104 can, at act 808, generate and/or select a QR code (e.g., the QR code 702) that corresponds to the transaction context information collected at act 804 (e.g., by encoding/embedding such transaction context information into the QR code).

In various embodiments, the QR code system 102 and/or smart device 104 can display and/or visually render the QR code at act 810 for scanning and/or reading by the POS device 108 (e.g., the POS device 108 can extract the transaction context information encoded within the QR code).

In various cases, the POS device 108 can transmit both the QR code and the independently-tracked transaction context information to the payment processing system 112, at act 812.

In various aspects, the payment processing system 112 can verify that the transaction context information corresponding to the QR code is consistent with the independently-tracked transaction context information, at act 814 (e.g., can determine whether the transaction context information encoded within the QR code matches and/or corresponds to and/or is consistent with the known context information tracked/recorded by the POS device 108).

In various instances, if the transaction context information is verified, the payment processing system 112 can transmit to a transaction settlement system 802 financial instrument information (e.g., 302) that is encoded within and/or correlated to the QR code, at act 816. In various cases, the transaction settlement system 802 can be any suitable collection and/or network of computer servers and/or databases that can facilitate the transfer of funds from one financial account to another based upon the financial instrument information stored within and/or correlated to the QR code.

In various aspects, if the transaction context information is not verified, the payment processing system 112 can refuse the financial instrument information encoded within and/or correlated to the QR code, and/or can transmit an electronic message to that effect back to the POS device 108, at act 818.

Figure 9:
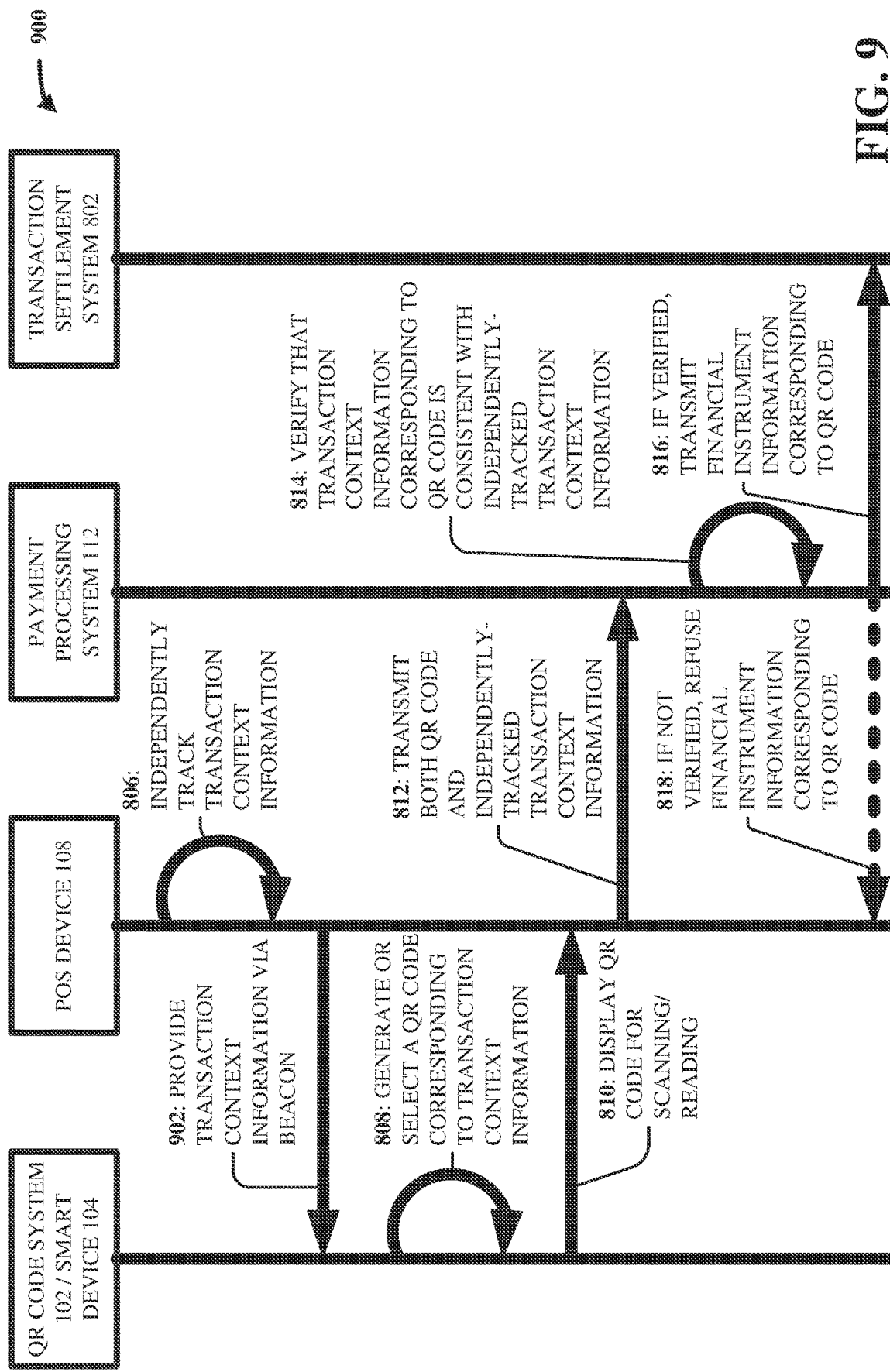
FIG. 9 illustrates a high-level communication diagram of an example, non-limiting workflow that facilitates enhanced, context-based QR code generation in accordance with one or more embodiments described herein.

FIG. 9 illustrates a high-level communication diagram of an example, non-limiting workflow 900 that can facilitate enhanced, context-based QR code generation in accordance with one or more embodiments described herein.

In various embodiments, as shown, the POS device 108 can provide to the QR code system 102 and/or the smart device 104 transaction context information via an electronic beacon (e.g., 410) at act 902. That is, the POS device 108 can inform the QR code system 102 and/or the smart device 104 of the geo-location information 402, the time/date information 404, the product/service information 502, the price/value information 504, and/or the merchant identity information 602. As explained above with respect to FIG. 8, acts 806-818 can be performed in addition to act 902 (e.g., encoding the provided transaction context information into a QR code, displaying the QR code, verifying the transaction context information encoded in the QR code).

Figure 10:
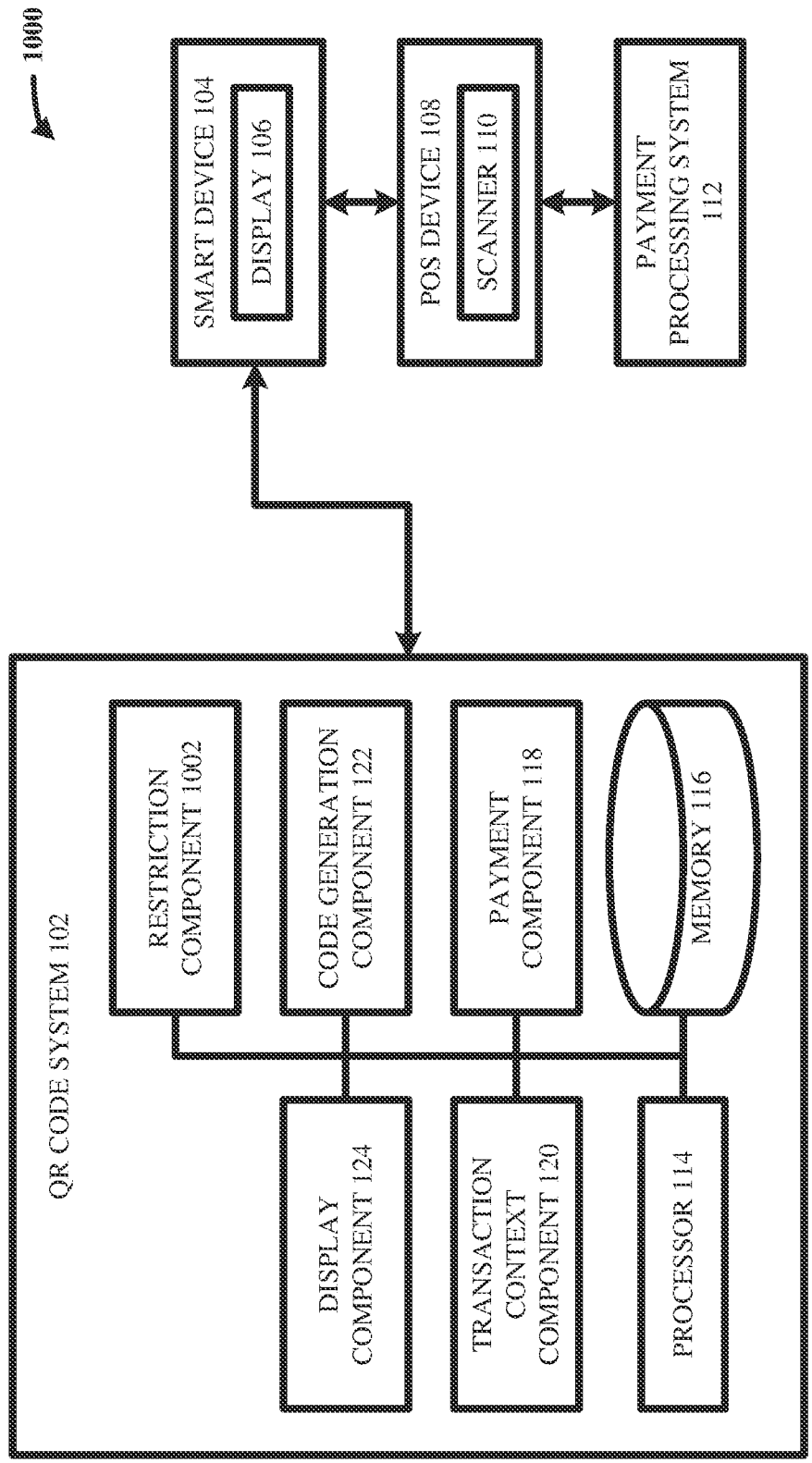
FIG. 10 illustrates a high-level block diagram of an example, non-limiting system that facilitates enhanced, restriction-based QR code generation in accordance with one or more embodiments described herein.

FIG. 10 illustrates a high-level block diagram of an example, non-limiting system 1000 that can facilitate enhanced, restriction-based QR code generation in accordance with one or more embodiments described herein. As shown, the system 1000 can, in some cases, comprise the same components as the system 700, and can further comprise a restriction component 1002.

In various aspects, the restriction component 1002 can receive, retrieve, obtain, store, and/or maintain restriction-based information regarding the user of the smart device 104 and/or regarding the financial instrument information 302 (not shown in FIG. 10 for sake of space). As explained herein, such restriction-based information can include any suitable conditions (e.g., which can be expressed in terms of Boolean operators) that limit and/or define the validity of the financial instrument information 302. In other words, such restriction-based information can define the transactional situations in which the financial instrument information 302 is deemed valid and/or invalid (e.g., can define the circumstances under which the user of the smart device 104 is authorized and/or permitted to use the financial instrument information 302, and/or can define the circumstances under which the user of the smart device 104 is not authorized and/or not permitted to use the financial instrument information 302). For example, such restriction-based information can include geo-fencing restrictions that define the geographic locations in which the financial instrument information 302 is considered valid and/or the geographic locations in which the financial instrument information 302 is considered invalid, temporal and/or time-fencing restrictions that define the times and/or dates on which the financial instrument information 302 is considered valid and/or the times and/or dates on which the financial instrument information 302 is considered invalid, product/service restrictions that define the products and/or services for which the financial instrument information 302 is considered valid and/or the products and/or services for which the financial instrument information 302 is considered invalid, value/price restrictions that define the monetary amounts for which the financial instrument information 302 is considered valid and/or the monetary amounts for which the financial instrument information 302 is considered invalid, and/or merchant identity restrictions that define the merchants for which the financial instrument information 302 is considered valid and/or the merchants for which the financial instrument information 302 is considered invalid. As explained herein, the restriction component 1002 can, in some cases, retrieve and/or obtain such restriction-based information from any suitable database and/or data structure which can be electronically accessed (e.g., wired and/or wirelessly) by the restriction component 1002. In some instances, the restriction component 1002 can simply receive such restriction-based information from input provided by a user of the smart device 104. In some cases, such restriction-based information can be established, required, and/or inputted by an entity that has authority over the user of the smart device 104 and/or authority over the financial instrument information 302 (e.g., a credit card company that extends credit to a customer can do so on condition that the customer abide by such restriction-based information; a parent can lend a credit card to a child on condition that the child abide by such restriction-based information). In such cases, the restriction component 1002 can receive such restriction-based information from a computerized system of the entity having authority over the user of the smart device 104 (e.g., the restriction component 1002 can receive restriction-based information from a credit card company's computing network). As explained herein, the QR code system 102 can, in various cases, encode, encrypt, and/or embed such restriction-based information into (and/or can otherwise correlate/map such restriction-based information to) one or more electronically generated QR codes, the smart device 104 can visually render (e.g., via the display 106) such one or more electronically generated QR codes, the POS device 108 can process and/or interpret (e.g., via the scanner 110) such one or more electronically generated QR codes to learn such restriction-based information, and the payment processing system 112 can verify whether such restriction-based information is satisfied in order to help detect and/or prevent fraudulent transactions. In this way, safe, secure, and/or private transmission and/or conveyance of financial instrument information can be facilitated.

Figure 11:
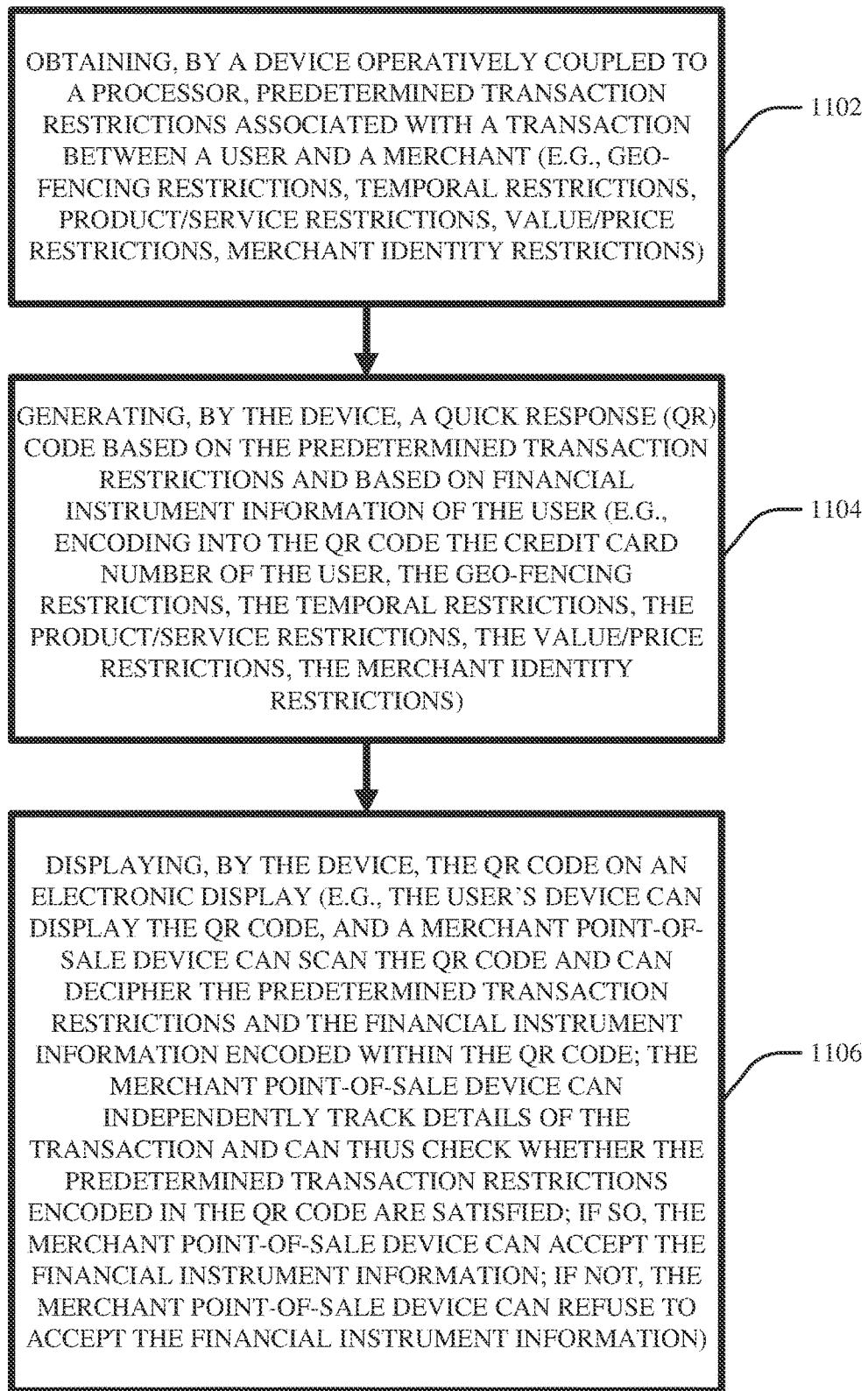
FIG. 11 illustrates a high-level flow diagram of an example, non-limiting computer-implemented method that facilitates enhanced, restriction-based QR code generation in accordance with one or more embodiments described herein.

FIG. 11 illustrates a high-level flow diagram of an example, non-limiting computer-implemented method 1100 that can facilitate enhanced, restriction-based QR code generation in accordance with one or more embodiments described herein. In various aspects, the computer-implemented method 1100 can be facilitated by the system 1000.

In various embodiments, act 1102 can include obtaining, by a device operatively coupled to a processor (e.g., 1002), predetermined transaction restrictions associated with a transaction between a user and a merchant. For example, such predetermined transaction restrictions can include geo-fencing restrictions, temporal restrictions, product/service restrictions, value/price restrictions, merchant identity restrictions, and/or any other suitable restrictions that define the circumstances under which financial instrument information is considered valid and/or invalid.

In various instances, act 1104 can include generating, by the device (e.g., 120), a quick response (QR) code based on the predetermined transaction restrictions and based on financial instrument information of the user (e.g., 302). For example, this can include encoding, encrypting, and/or embedding into the QR code the credit card number of the user, the geo-fencing restrictions, the temporal restrictions, the product/service restrictions, the value/price restrictions, and/or the merchant identity restrictions.

In various aspects, act 1106 can include displaying, by the device (e.g., 104 and/or 122), the QR code on an electronic display (e.g., 106). For instance, the user's device can display the QR code, and a merchant point-of-sale device (e.g., 108) can scan the QR code and can decipher the predetermined transaction restrictions and the financial instrument information that are encoded into and/or represented by the QR code. In various cases, as mentioned above, the point-of-sale device can independently track details and/or context-based information of the transaction, and can thus check whether the predetermined transaction restrictions encoded in the QR code are satisfied by the current transaction. If so, the point-of-sale device can accept the financial instrument information that is also encoded within the QR code (e.g., if the restrictions that are represented in the QR code are collectively satisfied, it can be inferred that the financial instrument information is valid for the current transaction). If not, on the other hand, the point-of-sale device can refuse to accept the financial instrument information (e.g., if the restrictions that are represented in the QR code are not collectively satisfied, it can be inferred that the financial instrument information is invalid for the current transaction).

Figure 12:
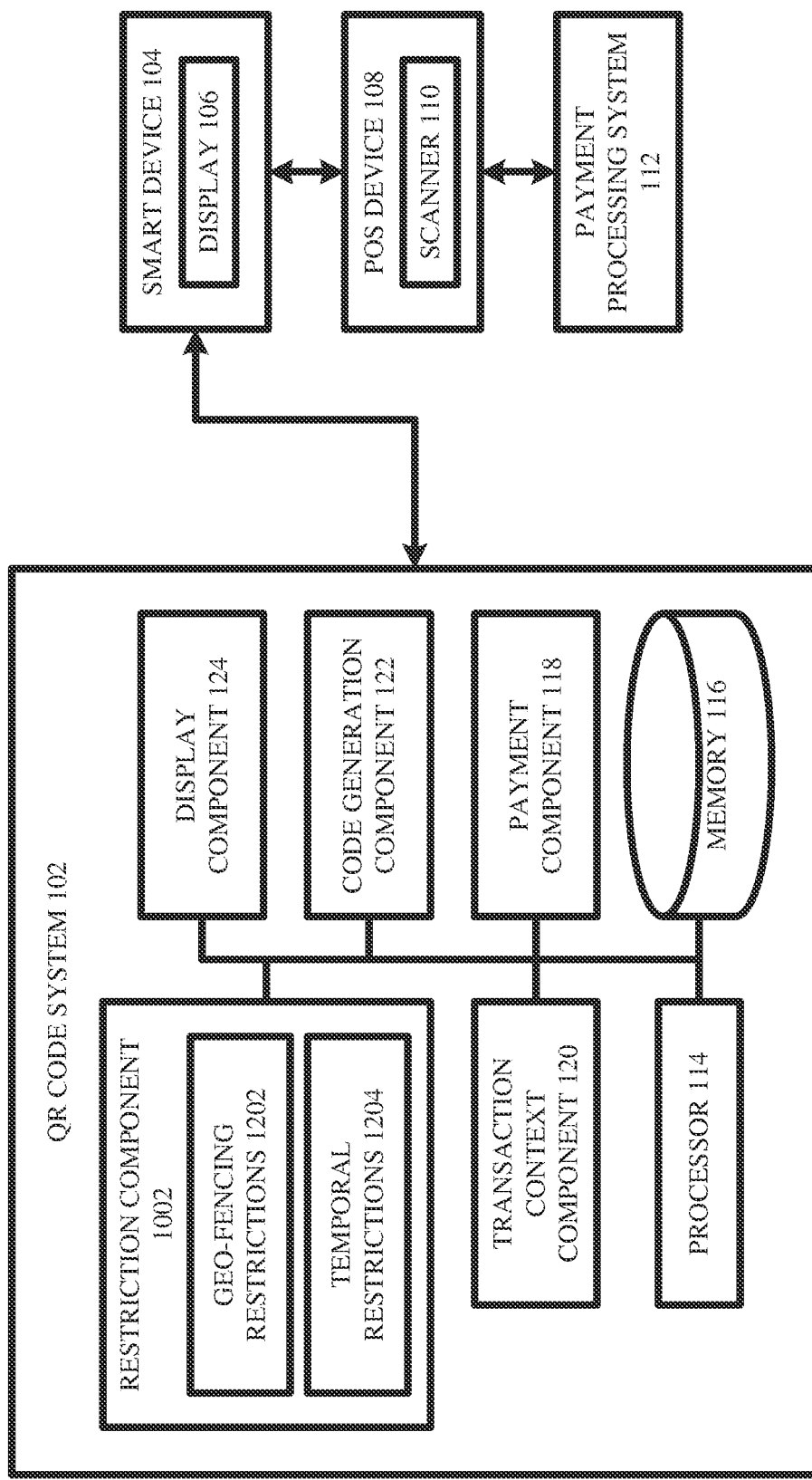
FIG. 12 illustrates a high-level block diagram of an example, non-limiting system including geo-fencing and temporal restrictions that facilitates enhanced, restriction-based QR code generation in accordance with one or more embodiments described herein.

FIG. 12 illustrates a high-level block diagram of an example, non-limiting system 1200 including geo-fencing and temporal restrictions that can facilitate enhanced, restriction-based QR code generation in accordance with one or more embodiments described herein. As shown, the system 1200 can, in some cases, comprise the same components as the system 1000, and can further comprise geo-fencing restrictions 1202 and/or temporal restrictions 1204.

In various instances, the geo-fencing restrictions 1202 can be any suitable conditions and/or Boolean expressions that define the geographic circumstances under which the financial instrument information 302 is considered/deemed valid and/or that define the geographic circumstances under which the financial instrument information 302 is considered/deemed invalid. In various cases, the geo-fencing restrictions 1202 can be indicated at any suitable level of granularity (e.g., continents on which the financial instrument information 302 is permitted/authorized to be used/charged, continents on which the financial instrument information 302 is not permitted/authorized to be used/charged, countries in which the financial instrument information 302 is permitted/authorized to be used/charged, countries in which the financial instrument information 302 is not permitted/authorized to be used/charged, states/provinces in which the financial instrument information 302 is permitted/authorized to be used/charged, states/provinces in which the financial instrument information 302 is not permitted/authorized to be used/charged, cites/towns in which the financial instrument information 302 is permitted/authorized to be used/charged, cities/towns in which the financial instrument information 302 is not permitted/authorized to be used/charged, addresses at which the financial instrument information 302 is permitted/authorized to be used/charged, addresses at which the financial instrument information 302 is not permitted/authorized to be used/charged, latitudes/longitudes/elevations at which the financial instrument information 302 is permitted/authorized to be used/charged, latitudes/longitudes/elevations at which the financial instrument information 302 is not permitted/authorized to be used/charged, any other suitable demarcated geographical regions/areas at which the financial instrument information 302 is permitted/authorized to be used/charged, and/or any other suitable demarcated geographical regions/areas at which the financial instrument information 302 is not permitted/authorized to be used/charged). In various instances, the restriction component 1002 can receive and/or retrieve the geo-fencing restrictions 1202 from any suitable database and/or data structure (e.g., from a credit card company's computing network). In some cases, the geo-fencing restrictions 1202 can be manually inputted by the user of the smart device 104 and/or by an entity having authority over the user of the smart device 104 and/or authority over the financial instrument information 302 (e.g., a parent can establish and/or specify the geo-fencing restrictions 1202 for their child when the parent lends their financial instrument information to the child).

In various instances, the temporal restrictions 1204 can be any suitable conditions and/or Boolean expressions that define the temporal (e.g., time and/or date) circumstances under which the financial instrument information 302 is considered/deemed valid and/or that define the temporal circumstances under which the financial instrument information 302 is considered/deemed invalid. In various cases, the temporal restrictions 1204 can be indicated at any suitable level of granularity (e.g., decades/years during which the financial instrument information 302 is permitted/authorized to be used/charged, decades/years during which the financial instrument information 302 is not permitted/authorized to be used/charged, months during which the financial instrument information 302 is permitted/authorized to be used/charged, months during which the financial instrument information 302 is not permitted/authorized to be used/charged, days during which the financial instrument information 302 is permitted/authorized to be used/charged, days during which the financial instrument information 302 is not permitted/authorized to be used/charged, hours during which the financial instrument information 302 is permitted/authorized to be used/charged, hours during which the financial instrument information 302 is not permitted/authorized to be used/charged, minutes during which the financial instrument information 302 is permitted/authorized to be used/charged, minutes during which the financial instrument information 302 is not permitted/authorized to be used/charged, seconds during which the financial instrument information 302 is permitted/authorized to be used/charged, and/or seconds which the financial instrument information 302 is not permitted/authorized to be used/charged). In various instances, the restriction component 1002 can receive and/or retrieve the temporal restrictions 1204 from any suitable database and/or data structure (e.g., from a credit card company's computing network). In some cases, the temporal restrictions 1204 can be manually inputted by the user of the smart device 104 and/or by an entity having authority over the user of the smart device 104 (e.g., a parent can establish and/or specify the temporal restrictions 1204 for their child when the parent lends their financial instrument information to the child).

Figure 13:
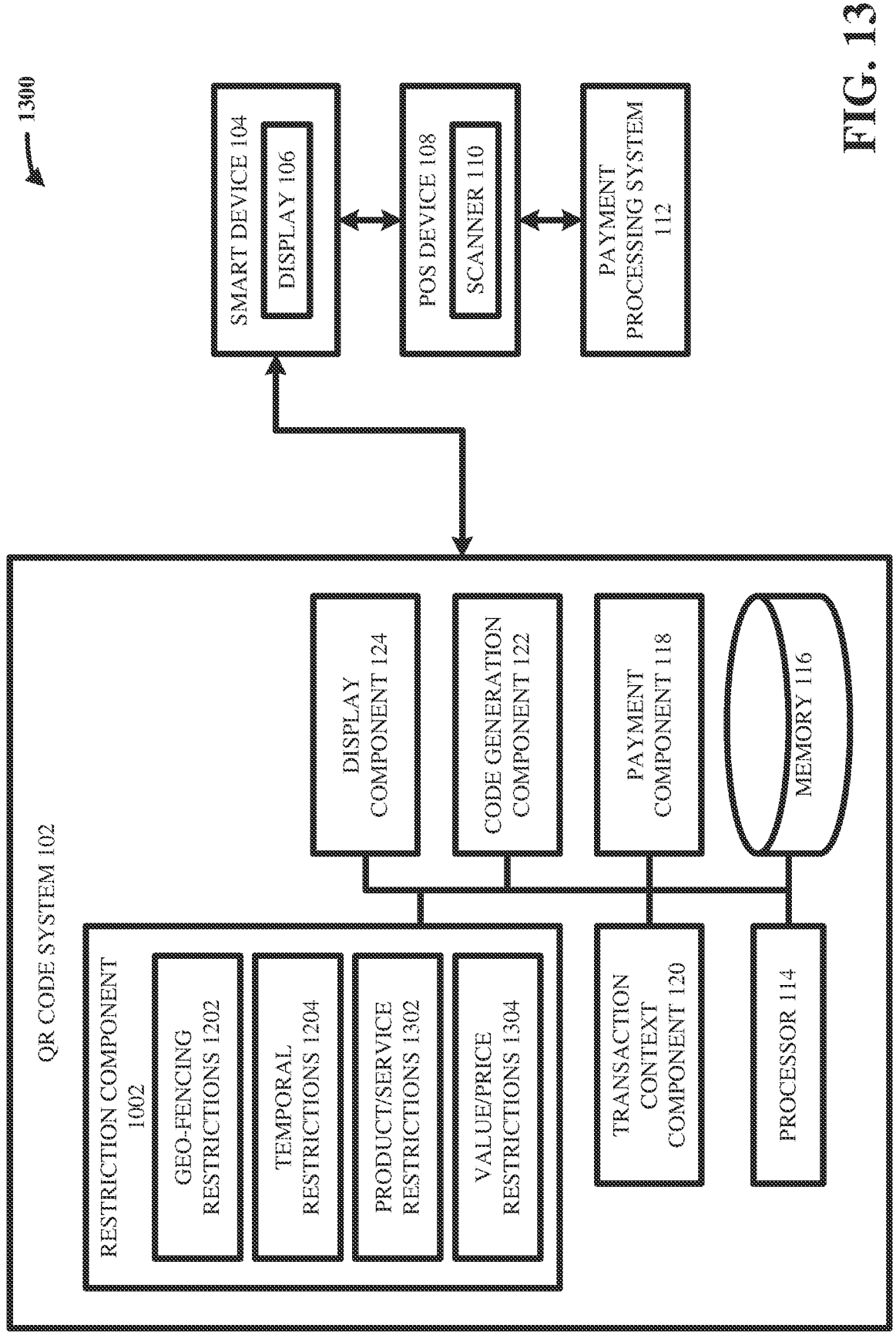
FIG. 13 illustrates a high-level block diagram of an example, non-limiting system including product/service and value/price restrictions that facilitates enhanced, restriction-based QR code generation in accordance with one or more embodiments described herein.

FIG. 13 illustrates a high-level block diagram of an example, non-limiting system 1300 including product/service and value/price restrictions that can facilitate enhanced, restriction-based QR code generation in accordance with one or more embodiments described herein. As shown, the system 1300 can, in some aspects, comprise the same components as the system 1200, and can further comprise product/service restrictions 1302 and/or value/price restrictions 1304.

In various instances, the product/service restrictions 1302 can be any suitable conditions and/or Boolean expressions that define the products and/or services for which the financial instrument information 302 is considered/deemed valid and/or that define the products and/or services for which the financial instrument information 302 is considered/deemed invalid. In various cases, the product/service restrictions 1302 can be indicated at any suitable level of granularity (e.g., classes, categories, and/or types of products/services for which the financial instrument information 302 is permitted/authorized to be used/charged; classes, categories, and/or types of products/services for which the financial instrument information 302 is not permitted/authorized to be used/charged; serial numbers, tokens, and/or identifiers of products/services for which the financial instrument information 302 is permitted/authorized to be used/charged; serial numbers, tokens, and/or identifiers of products/services for which the financial instrument information 302 is not permitted/authorized to be used/charged; brand names of products/services for which the financial instrument information 302 is permitted/authorized to be used/charged; and/or brand names of products/services for which the financial instrument information 302 is not permitted/authorized to be used/charged). In various instances, the restriction component 1002 can receive and/or retrieve the product/service restrictions 1302 from any suitable database and/or data structure (e.g., from a credit card company's computing network). In some cases, the product/service restrictions 1302 can be manually inputted by the user of the smart device 104 and/or by an entity having authority over the user of the smart device 104 and/or authority over the financial instrument information 302 (e.g., a parent can establish and/or specify the product/service restrictions 1302 for their child when the parent lends their financial instrument information to the child).

In various instances, the value/price restrictions 1304 can be any suitable conditions and/or Boolean expressions that define the overall and/or itemized monetary amounts for which the financial instrument information 302 is considered/deemed valid and/or that define the overall and/or itemized monetary amounts for which the financial instrument information 302 is considered/deemed invalid. In various cases, the value/price restrictions 1304 can be indicated at any suitable level of granularity (e.g., monetary amounts for which the financial instrument information 302 is permitted/authorized to be used/charged, monetary amounts for which the financial instrument information 302 is not permitted/authorized to be used/charged, maximum monetary amount for which the financial instrument information 302 is permitted/authorized to be used/charged, minimum monetary amount for which the financial instrument information 302 is permitted/authorized to be used/charged, and/or average monetary amounts for which the financial instrument information 302 is permitted/authorized to be used/charged). In various instances, the restriction component 1002 can receive and/or retrieve the value/price restrictions 1304 from any suitable database and/or data structure (e.g., from a credit card company's computing network). In some cases, the value/price restrictions 1304 can be manually inputted by the user of the smart device 104 and/or by an entity having authority over the user of the smart device 104 and/or authority over the financial instrument information 302 (e.g., a parent can establish and/or specify the value/price restrictions 1304 for their child when the parent lends their financial instrument information to the child).

Figure 14:
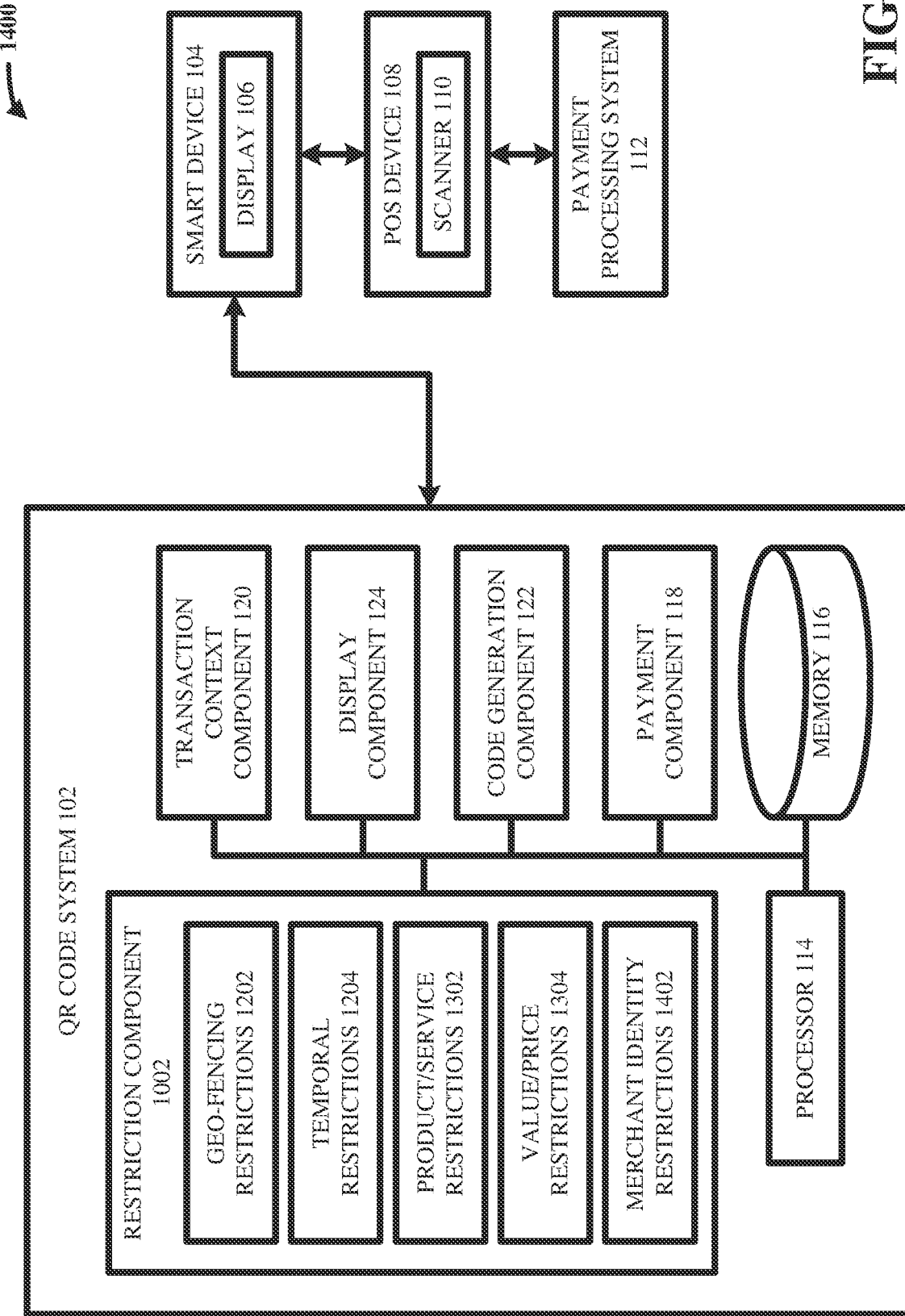
FIG. 14 illustrates a high-level block diagram of an example, non-limiting system including merchant identity restrictions that facilitates enhanced, restriction-based QR code generation in accordance with one or more embodiments described herein.

FIG. 14 illustrates a high-level block diagram of an example, non-limiting system 1400 including merchant identity restrictions that can facilitate enhanced, restriction-based QR code generation in accordance with one or more embodiments described herein. As shown, the system 1400 can, in some cases, comprise the same components as the system 1300, and can further comprise merchant identity restrictions 1402.

In various instances, the merchant identity restrictions 1402 can be any suitable conditions and/or Boolean expressions that define the merchants, vendors, sellers, and/or product/service providers for which the financial instrument information 302 is considered/deemed valid and/or that define the merchants, vendors, sellers, and/or product/service providers for which the financial instrument information 302 is considered/deemed invalid. In various cases, the merchant identity restrictions 1402 can be indicated at any suitable level of granularity (e.g., classes, categories, and/or types of merchants, vendors, sellers, and/or product/service providers to which the financial instrument information 302 is permitted/authorized to be transferred; classes, categories, and/or types of merchants, vendors, sellers, and/or product/service providers to which the financial instrument information 302 is not permitted/authorized to be transferred; serial numbers, tokens, and/or identifiers of merchants, vendors, sellers, and/or product/service providers to which the financial instrument information 302 is permitted/authorized to be transferred; serial numbers, tokens, and/or identifiers of merchants, vendors, sellers, and/or product/service providers to which the financial instrument information 302 is not permitted/authorized to be transferred; tradenames of merchants, vendors, sellers, and/or product/service providers to which the financial instrument information 302 is permitted/ authorized to be transferred; and/or tradenames of merchants, vendors, sellers, and/or product/service providers to which the financial instrument information 302 is not permitted/authorized to be transferred). In various instances, the restriction component 1002 can receive and/or retrieve the merchant identity restrictions 1402 from any suitable database and/or data structure (e.g., from a credit card company's computing network). In some cases, the merchant identity restrictions 1402 can be manually inputted by the user of the smart device 104 and/or by an entity having authority over the user of the smart device 104 (e.g., a parent can establish and/or specify the merchant identity restrictions 1402 for their child when the parent lends their financial instrument information to the child).

As mentioned above, the code generation component 122 can electronically generate, via any suitable cryptographic and/or computational technique, the QR code 702 (not shown in FIG. 14 for sake of space) based on the restriction-based information obtained by the restriction component 1002. In other words, the code generation component 122 can create the QR code 702 such that the QR code 702 represents, indicates, symbolizes, and/or is correlated to the financial instrument information 302, the geo-fencing restrictions 1202, the temporal restrictions 1204, the product/service restrictions 1302, the value/price restrictions 1304, and/or the merchant identity restrictions 1402. In this way, the QR code 702 can, in some cases, be considered as bound to permitted geo-locations, bound to permitted times/dates, bound to permitted products/services, bound to permitted values/prices, and/or bound to permitted merchants.

As also mentioned above, the display component 124 can create the display command 704 (not shown in FIG. 14 for sake of space), to cause the smart device 104 to visually render and/or illustrate the QR code 702 on the display 106.

In various embodiments, the POS device 108 can scan, via the scanner 110, the QR code 702 that is visually rendered on the display 106, and the POS device 108 can accordingly interpret and/or process the QR code 702 so as to extract the information contained within and/or represented/symbolized by the QR code 702. That is, in various cases, the POS device 108 can scan the QR code 702 that is displayed on the display 106, and thereby can learn the financial instrument information 302 and the restriction-based information (e.g., the geo-fencing restrictions 1202, the temporal restrictions 1204, the product/service restrictions 1302, the value/price restrictions 1304, and/or the merchant identity restrictions 1402) that are encoded within the QR code 702.

In various aspects, encoding restriction-based information (e.g., 1202, 1204, 1302, 1304, and/or 1402) into the QR code 702 can improve privacy and/or fraud detection. Specifically, the POS device 108 can, in some cases, independently track the context of a current transaction, and can transmit both the QR code 702 and the independently-tracked context of the current transaction to the payment processing system 112. In various instances, the payment processing system 112 can compare the known context of the current transaction with the restriction-based information encoded in and/or correlated to the QR code 702 to determine whether the user of the smart device 104 is attempting fraud.

For example, suppose that a current transaction is taking place in the country of Canada (e.g., the POS device 108 is located within Canada, and the user of the smart device 104 physically approaches the POS device 108 to purchase/procure a product/service). In various cases, the smart device 104 can visually render, via the display 106, the QR code 702, and the POS device 108 can scan, via the scanner 110, the QR code 702. The POS device 108 can then transmit the QR code 702 and the known geo-location of the transaction (e.g., Canada) to the payment processing system 112. Accordingly, the payment processing system 112 can process and/or analyze the QR code 702. Suppose that, based on such processing and/or analysis, the payment processing system 112 determines that the QR code 702 indicates and/or is correlated to the financial instrument information 302 and also indicates that the financial instrument information 302 is valid in all of North America. In such case, the payment processing system 112 can determine that the known geo-location of the current transaction satisfies the geo-fencing restrictions encoded and/or encrypted in (and/or correlated to) the QR code 702 (e.g., Canada is in North America). Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates and/or is correlated to the financial instrument information 302 and also indicates that the financial instrument information 302 is valid only in the United States. In such case, the payment processing system 112 can determine that the known geo-location of the current transaction does not satisfy the geo-fencing restrictions encoded and/or encrypted in (and/or correlated to) the QR code 702 (e.g., Canada is not in the United States). Accordingly, the payment processing system 112 can conclude that the user of the smart device 104 is attempting fraud (e.g., the user of the smart device 104 can be impermissibly attempting to use the financial instrument information 302 in a geographic location that is forbidden by an entity with authority over the financial instrument information 302). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

As another example, suppose that a current transaction is taking place in September. In various cases, the smart device 104 can visually render, via the display 106, the QR code 702, and the POS device 108 can scan, via the scanner 110, the QR code 702. The POS device 108 can then transit the QR code 702 and the known time/date of the transaction (e.g., September) to the payment processing system 112. Accordingly, the payment processing system 112 can process and/or analyze the QR code 702. Suppose that, based on such processing and/or analysis, the payment processing system 112 determines that the QR code 702 indicates and/or is correlated to the financial instrument information 302 and also indicates that the financial instrument information 302 is valid from August 1 to October 31. In such case, the payment processing system 112 can determine that the known time/date of the current transaction satisfies the temporal restrictions encoded and/or encrypted in (and/or correlated to) the QR code 702 (e.g., September falls between August 1 and October 31). Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates and/or is correlated to the financial instrument information 302 and also indicates that the financial instrument information 302 is valid only from June 1 to July 31. In such case, the payment processing system 112 can determine that the known time/date of the current transaction does not satisfy the temporal restrictions encoded and/or encrypted in (and/or correlated to) the QR code 702 (e.g., September does not fall between June 1 to July 31). Accordingly, the payment processing system 112 can conclude that the user of the smart device 104 is attempting fraud (e.g., the user of the smart device 104 can be impermissibly attempting to use the financial instrument information 302 at a time/date that is forbidden by an entity with authority over the financial instrument information 302). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

As still another example, suppose that a current transaction is for the procurement/provision of cinema tickets. In various cases, the smart device 104 can visually render, via the display 106, the QR code 702, and the POS device 108 can scan, via the scanner 110, the QR code 702. The POS device 108 can then transmit the QR code 702 and an indication of the known products/services involved in the transaction (e.g., cinema tickets) to the payment processing system 112. Accordingly, the payment processing system 112 can process and/or analyze the QR code 702. Suppose that, based on such processing and/or analysis, the payment processing system 112 determines that the QR code 702 indicates and/or is correlated to the financial instrument information 302 and also indicates that the financial instrument information 302 is valid for groceries, gasoline, and cinema tickets. In such case, the payment processing system 112 can determine that the known products/services involved in the current transaction satisfy the product/service restrictions encoded and/or encrypted in (and/or correlated to) the QR code 702. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates and/or is correlated to the financial instrument information 302 and also indicates that the financial instrument information 302 is valid only for groceries and gasoline. In such case, the payment processing system 112 can determine that the known products/services involved in the current transaction do not satisfy the product/service restrictions encoded and/or encrypted in (and/or correlated to) the QR code 702. Accordingly, the payment processing system 112 can conclude that the user of the smart device 104 is attempting fraud (e.g., the user of the smart device 104 can be impermissibly attempting to use the financial instrument information 302 to purchase products/services that are forbidden by an entity with authority over the financial instrument information 302). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

As still another example, suppose that a current transaction has a total cost of $100.00. In various cases, the smart device 104 can visually render, via the display 106, the QR code 702, and the POS device 108 can scan, via the scanner 110, the QR code 702. The POS device 108 can then transmit the QR code 702 and the known prices/values involved in the transaction (e.g., $100.00) to the payment processing system 112. Accordingly, the payment processing system 112 can process and/or analyze the QR code 702. Suppose that, based on such processing and/or analysis, the payment processing system 112 determines that the QR code 702 indicates and/or is correlated to the financial instrument information 302 and also indicates that the financial instrument information 302 is valid for expenditures up to $300.00. In such case, the payment processing system 112 can determine that the known values/prices involved in the current transaction satisfy the value/price restrictions encoded and/or encrypted in (and/or correlated to) the QR code 702 (e.g., $100.00 does not exceed $300.00). Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates and/or is correlated to the financial instrument information 302 and also indicates that the financial instrument information 302 is valid only for expenditures up to $50.00. In such case, the payment processing system 112 can determine that the known values/prices involved in the current transaction do not satisfy the value/price restrictions encoded and/or encrypted in (and/or correlated to) the QR code 702 (e.g., $100.00 exceeds $50.00). Accordingly, the payment processing system 112 can conclude that the user of the smart device 104 is attempting fraud (e.g., the user of the smart device 104 can be impermissibly attempting to use the financial instrument information 302 to spend an amount of money that is forbidden by an entity with authority over the financial instrument information 302). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

As an additional example, suppose that a current transaction is facilitated by a manicurist. In various cases, the smart device 104 can visually render, via the display 106, the QR code 702, and the POS device 108 can scan, via the scanner 110, the QR code 702. The POS device 108 can then transmit the QR code 702 and an indication of the identity of the merchant known to be facilitating the transaction (e.g., manicurist) to the payment processing system 112. Accordingly, the payment processing system 112 can process and/or analyze the QR code 702. Suppose that, based on such processing and/or analysis, the payment processing system 112 determines that the QR code 702 indicates and/or is correlated to the financial instrument information 302 and also indicates that the financial instrument information 302 is valid for manicurists, grocery stores, and restaurants. In such case, the payment processing system 112 can determine that the known merchant involved in the current transaction satisfies the merchant identity restrictions encoded and/or encrypted in (and/or correlated to) the QR code 702. Accordingly, the payment processing system 112 can conclude that the user of the smart device 104 is not attempting fraud (e.g., and/or can fail to conclude that the user of the smart device 104 is attempting fraud), and the payment processing system 112 can transmit a successful verification/validation message to the POS device 108 and/or can otherwise instruct the POS device 108 to accept the financial instrument information 302 that is contained within and/or correlated to the QR code 702. On the other hand, suppose that, based on the processing and/or analysis, the payment processing system 112 determines that the QR code 702 indicates and/or is correlated to the financial instrument information 302 and also indicates that the financial instrument information 302 is valid only for grocery stores and restaurants. In such case, the payment processing system 112 can determine that the known merchant involved in the current transaction does not satisfy the merchant identity restrictions encoded and/or encrypted in (and/or correlated to) the QR code 702 (e.g., a manicurist is not a grocery store or a restaurant). Accordingly, the payment processing system 112 can conclude that the user of the smart device 104 is attempting fraud (e.g., the user of the smart device 104 can be impermissibly attempting to use the financial instrument information 302 with a merchant that is forbidden by an entity with authority over the financial instrument information 302). The payment processing system 112 can then transmit an unsuccessful verification/validation message to the POS device 108 and/or can otherwise instruct the POS device 108 to refuse to accept the financial instrument information 302 that is contained within and/or correlated to the QR code 702.

Overall, the QR code system 102 can, in some cases, encode restriction-based information into (and/or otherwise correlate/map such restriction-based information to) the QR code 702, which can be evaluated by the payment processing system 112 (and/or by the POS device 108) to heighten transactional safety, security, and/or privacy. In other words, QR codes can, in some cases, be bound to specific circumstances (e.g., usable and/or unusable in specific geo-locations, usable and/or unusable at specific times/dates, usable and/or unusable for specific products/services, usable and/or unusable for specific monetary amounts, and/or usable and/or unusable with specific merchants).

Figure 15:
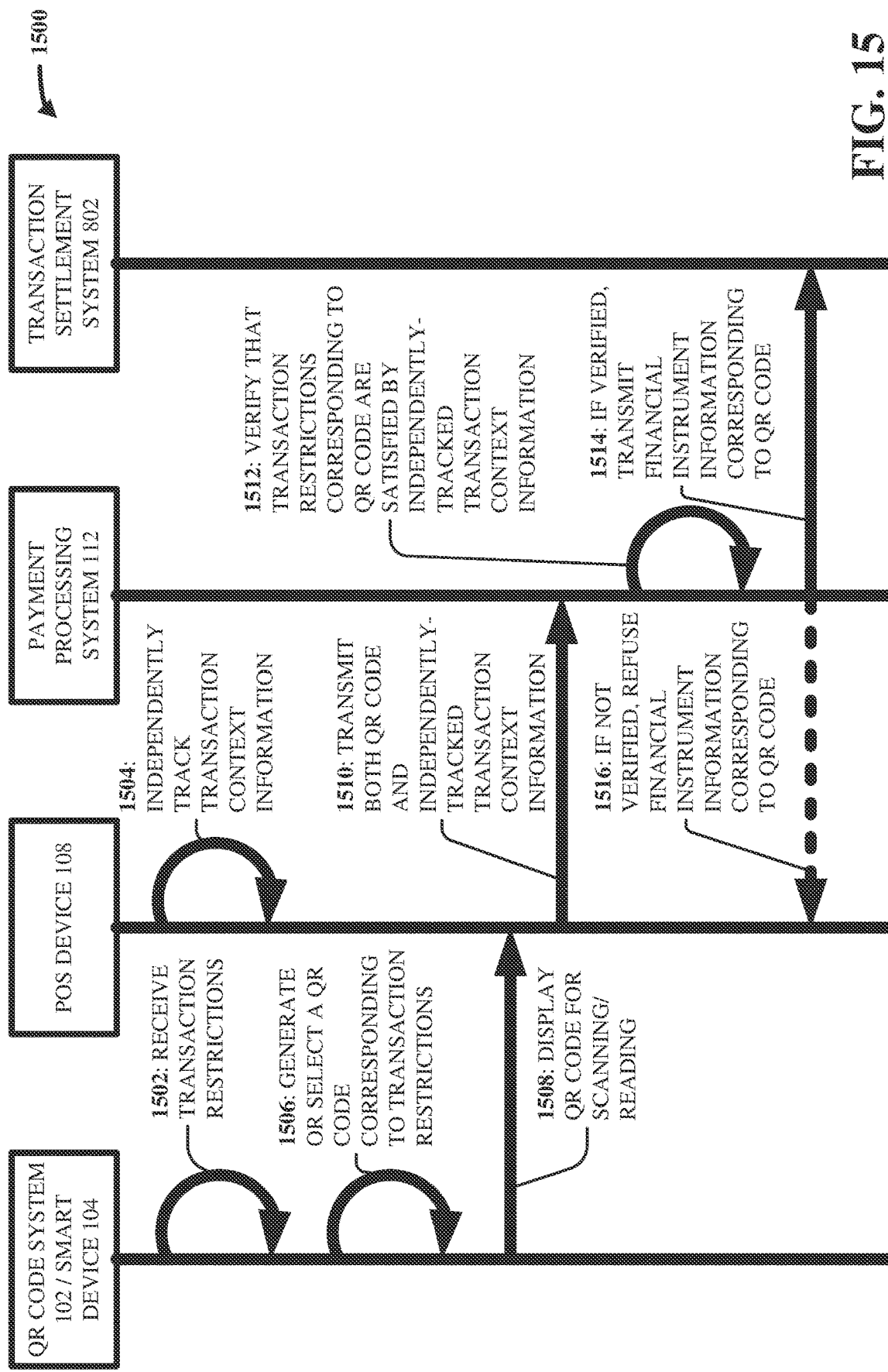
FIG. 15 illustrates a high-level communication diagram of an example, non-limiting workflow that facilitates enhanced, restriction-based QR code generation in accordance with one or more embodiments described herein.

FIG. 15 illustrates a high-level communication diagram of an example, non-limiting workflow 1500 that can facilitate enhanced, restriction-based QR code generation in accordance with one or more embodiments described herein.

In various embodiments, the QR code system 102 and/or the smart device 104 can receive transaction restrictions at act 1502 (e.g., can obtain and/or receive as input the geo-fencing restrictions 1202, the temporal restrictions 1204, the product/service restrictions 1302, the value/price restrictions 1304, and/or the merchant identity restrictions 1402).

In various cases, the POS device 108 can independently track transaction context information, at act 1504 (e.g., the POS device 108 can already know the geographic location of the transaction, the time/date of the transaction, the products/services involved in the transaction, the prices/values involved in the transaction, the merchant facilitating the transaction).

In various instances, the QR code system 102 and/or the smart device 104 can, at act 1506, generate and/or select a QR code (e.g., the QR code 702) that corresponds to the transaction restrictions collected at act 1502 (e.g., by encoding/embedding such transaction restrictions into the QR code).

In various embodiments, the QR code system 102 and/or the smart device 104 can display and/or visually render the QR code at act 1508 for scanning and/or reading by the POS device 108 (e.g., the POS device 108 can extract the transaction restrictions encoded within the QR code).

In various cases, the POS device 108 can transmit both the QR code and the independently-tracked transaction context information to the payment processing system 112, at act 1510.

In various aspects, the payment processing system 112 can verify that the transaction restrictions corresponding to the QR code are collectively satisfied by the independently-tracked transaction context information, at act 1512 (e.g., can determine whether the transaction restrictions encoded within the QR code are violated by the known context information tracked/recorded by the POS device 108).

In various instances, if the transaction restrictions are satisfied, the payment processing system 112 can transmit to the transaction settlement system 802 financial instrument information (e.g., 302) that is encoded within (and/or correlated to) the QR code, at act 1514.

In various aspects, if the transaction restrictions are not satisfied, the payment processing system 112 can refuse the financial instrument information encoded within (and/or correlated to) the QR code, and/or can transmit an electronic message to that effect back to the POS device 108, at act 1516.

Figure 16:
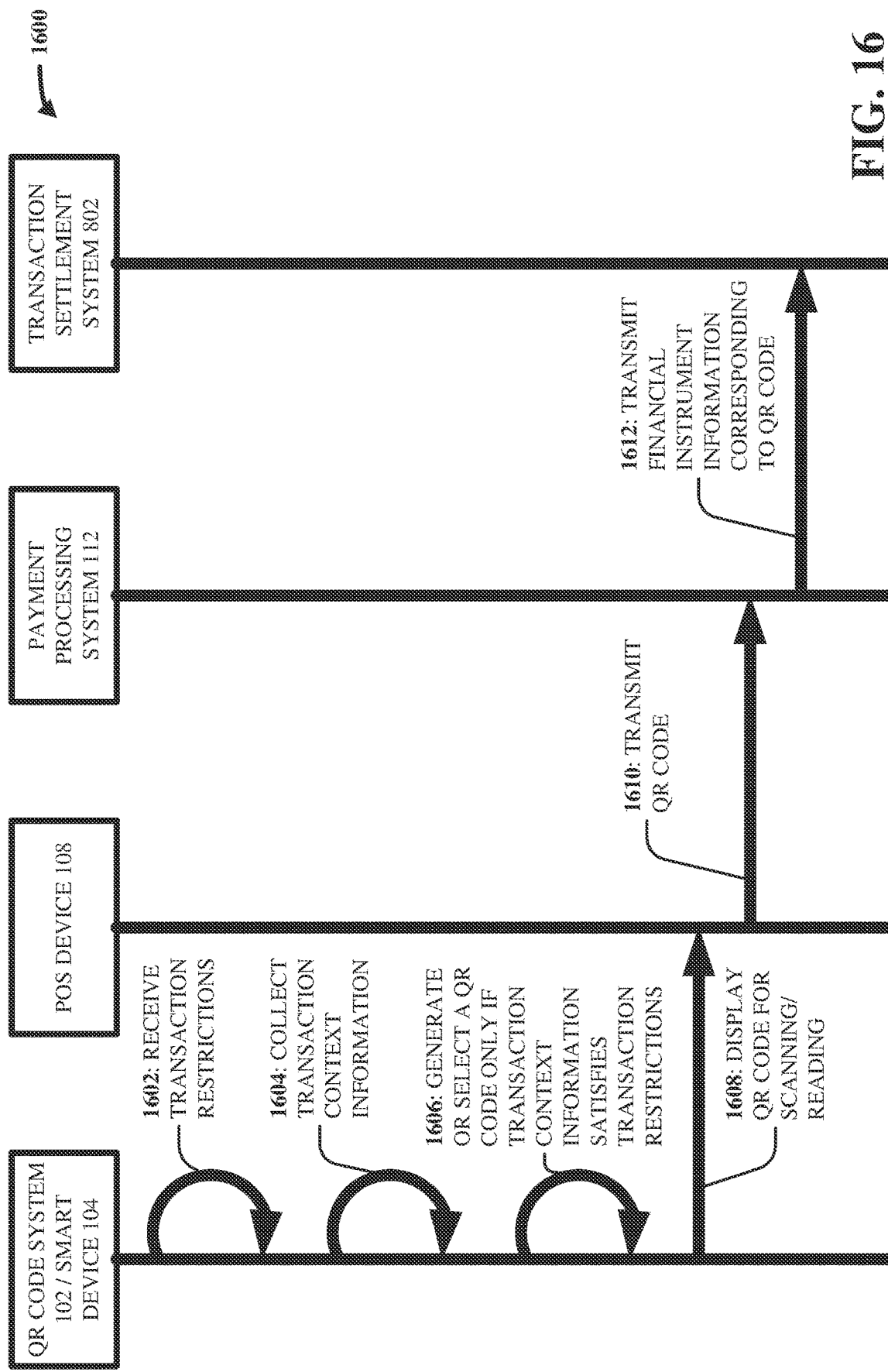
FIG. 16 illustrates a high-level communication diagram of an example, non-limiting workflow that facilitates enhanced, restriction-based QR code generation in accordance with one or more embodiments described herein.

FIG. 16 illustrates a high-level communication diagram of an example, non-limiting workflow that facilitates enhanced, restriction-based QR code generation in accordance with one or more embodiments described herein.

The above discussion illustrates how the payment processing system 112 can evaluate restriction-based information that is encoded and/or embedded within (and/or otherwise correlated to) a QR code. However, in various embodiments, the QR code system 102 and/or the smart device 104 can evaluate such restriction-based information to determine whether or not to electronically generate and/or display a QR code at all. That is, in place of and/or possibly in addition to embedding the restriction-based information into the QR code (as described above), the QR code system 102 and/or the smart device 104 can, in some embodiments, treat the restriction-based information as triggering criteria that must be collectively satisfied before a QR code can be electronically generated and/or displayed (e.g., such that a QR code can only be electronically generated and/or displayed in particular geo-locations, at particular times, for purposes of procuring particular products/services, for purposes of paying particular prices, and/or for purposes of transacting with particular merchants).

As shown, in various embodiments, the QR code system 102 and/or the smart device 104 can receive transaction restrictions (e.g., 1202, 1204, 1302, 1304, and/or 1402) at act 1602.

As also shown, in various embodiments, the QR code system 102 and/or the smart device 104 can collect transaction context information at act 1604 (e.g., can determine the geo-location, time/date, products/services, prices/values, and/or merchants that are involved in a current transaction, as described above).

In various aspects, the QR code system 102 and/or the smart device 104 can generate and/or select a QR code (e.g., 702) only if the QR code system 102 determines that the transaction context information satisfies and/or is consistent with the transaction restrictions, at act 1606.

In various instances, the QR code system 102 and/or the smart device 104 can display the QR code at act 1608 for scanning and/or reading by the POS device 108, the POS device 108 can transmit to the payment processing system 112 the QR code at act 1610, and the payment processing system 112 can transmit to the transaction settlement system 802 the financial instrument information that is encoded in and/or correlated to the QR code at act 1612.

Figure 17:
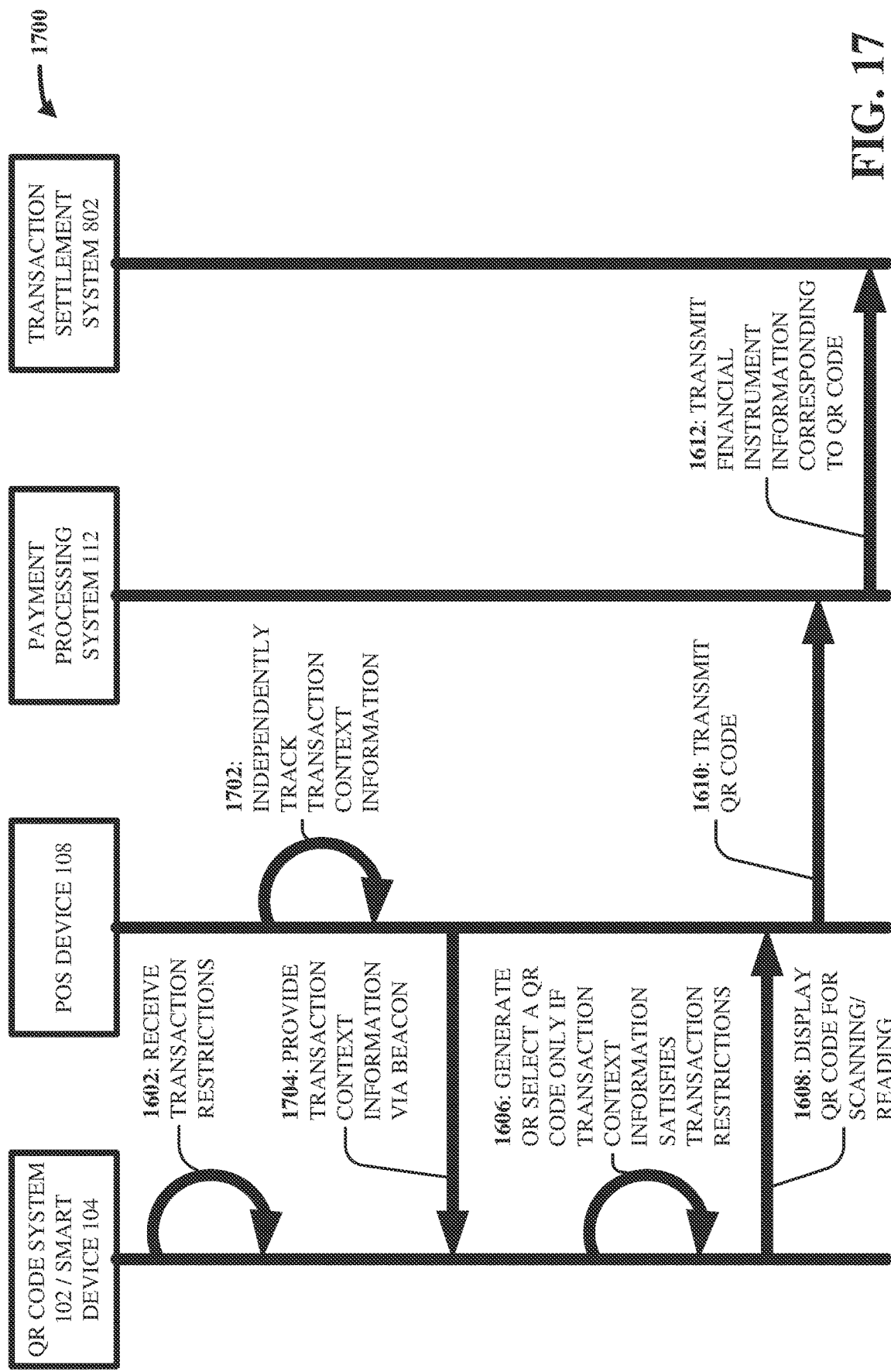
FIG. 17 illustrates a high-level communication diagram of an example, non-limiting workflow that facilitates enhanced, restriction-based QR code generation in accordance with one or more embodiments described herein.

FIG. 17 illustrates a high-level communication diagram of an example, non-limiting workflow 1700 that can facilitate enhanced, restriction-based QR code generation in accordance with one or more embodiments described herein.

In various aspects, the POS device 108 can independently track transaction context information at act 1702, and can provide to the QR code system 102 and/or the smart device 104 the transaction context information (e.g., such as via an electronic beacon that is at or near the POS device 108) at act 1704. In various aspects, as shown, the acts 1602 and 1606-1612 can be as described above.

To help clarify this discussion, consider the following non-limiting example. Suppose that a parent authorizes a child to use a credit card number (e.g., financial instrument information 302) only if the child does not spend/charge over $20.00 in any single transaction. As explained above with respect to FIG. 16, the QR code system 102 can, in some cases, embed, encode, and/or encrypt the credit card number and the $20.00 price restriction into a QR code (and/or can otherwise correlate such information to the QR code). Thus, when the POS device 108 scans the QR code, the POS device can be made aware of both the credit card number and the $20.00 price restriction. Accordingly, the payment processing system 112 can instruct the POS device 108 to accept the credit card number if the actual amount of money to be charged in the transaction does not exceed $20.00. If, on the other hand, the actual amount of money to be charged in the transaction does exceed $20.00, the payment processing system 112 can instruct the POS device 108 to refuse to accept/charge the credit card number.

However, in some cases such as those consistent with FIGS. 16 and 17, the QR code system 102 can determine whether the potential and/or current transaction would violate the $20.00 price restriction before the QR code system 102 generates and/or displays the QR code. In such case, the QR code system 102 can sense, detect, and/or receive the monetary amount to be charged in the transaction (e.g., such as by an electronic beacon at or near the POS device 108). If the monetary amount to be charged in the transaction does not violate the $20.00 price restriction, the QR code system 102 can electronically generate a QR code containing the credit card number. That QR code can then be displayed on the smart device 104 to the POS device 108 for scanning. If, on the other hand, the monetary amount to be charged in the transaction does violate the $20.00 price restriction, the QR code system 102 can refrain from electronically generating and/or displaying a QR code at all. In any case, the safety, security, and/or privacy of the transaction can be heightened by the QR code system 102.

Figure 18:
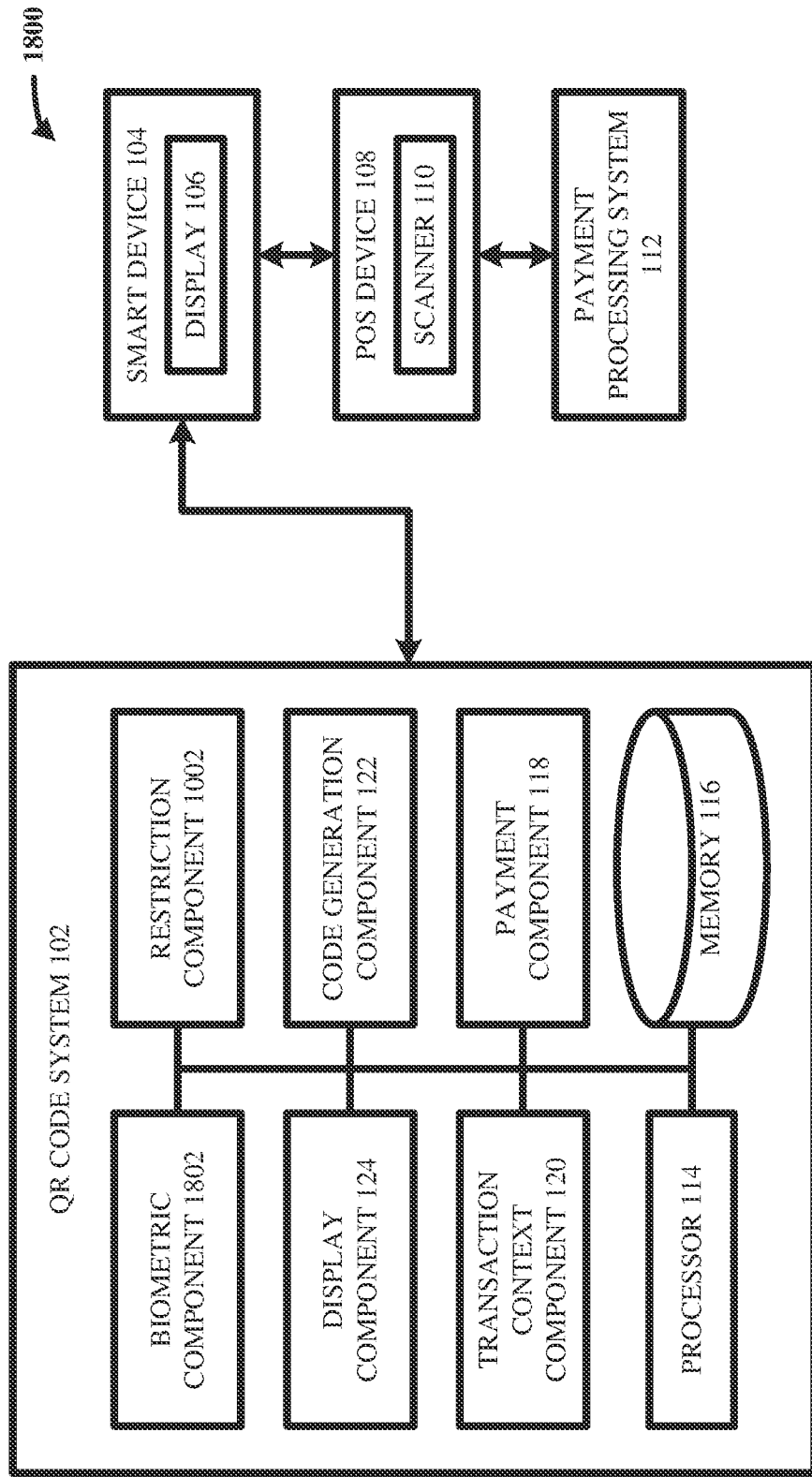
FIG. 18 illustrates a high-level block diagram of an example, non-limiting system that facilitates enhanced, biometric-based QR code generation in accordance with one or more embodiments described herein.

FIG. 18 illustrates a high-level block diagram of an example, non-limiting system 1800 that can facilitate enhanced, biometric-based QR code generation in accordance with one or more embodiments described herein. As shown, the system 1800 can, in some cases, comprise the same components as the system 1400, and can further comprise a biometric component 1802.

In various embodiments, the biometric component 1802 can receive, retrieve, obtain, store, and/or maintain biometric-based information regarding the user of the smart device 104 and/or regarding the financial instrument information 302 (not shown in FIG. 18 for sake of space). As explained herein, such biometric-based information can include any suitable biometric signatures that correspond to known authorized users of the financial instrument information 302

(e.g., fingerprint signatures of users that are authorized to use the financial instrument information 302, facial image signatures of users that are authorized to use the financial instrument information 302, vocal soundbite signatures of users that are authorized to use the financial instrument information 302). In various embodiments, such biometric-based information can be treated as triggering criteria for the generation and/or display of QR codes. In other words, the QR code system 102 can store biometric signatures (e.g., fingerprints, facial images, and/or vocal soundbites) of users/entities that are known to be authorized to use the financial instrument information 302. Moreover, in various cases, the QR code system 102 can query a current and/or attempted user of the smart device 104 for biometric samples (e.g., can scan the fingerprints of the current and/or attempted user, can capture an image of the face of the current and/or attempted user, and/or can capture an audio recording of the voice of the current and/or attempted user). In various aspects, the QR code system 102 can compare the collected biometric samples to the stored biometric signatures in order to determine whether the current and/or attempted user is authorized to use the financial instrument information 302. If the QR code system 102 biometrically determines that the current and/or attempted user is authorized to use the financial instrument information 302, the QR code system 102 can electronically generate and/or display a QR code that represents the financial instrument information 302. If the QR code system 102 biometrically determines that the current and/or attempted user is not authorized to use the financial instrument information 302, the QR code system 102 can refrain from electronically generating and/or displaying a QR code that represents the financial instrument information 302. In this way, the QR code system 102 can help to reduce fraud by generating and/or displaying QR codes only for authorized users.

Figure 19:
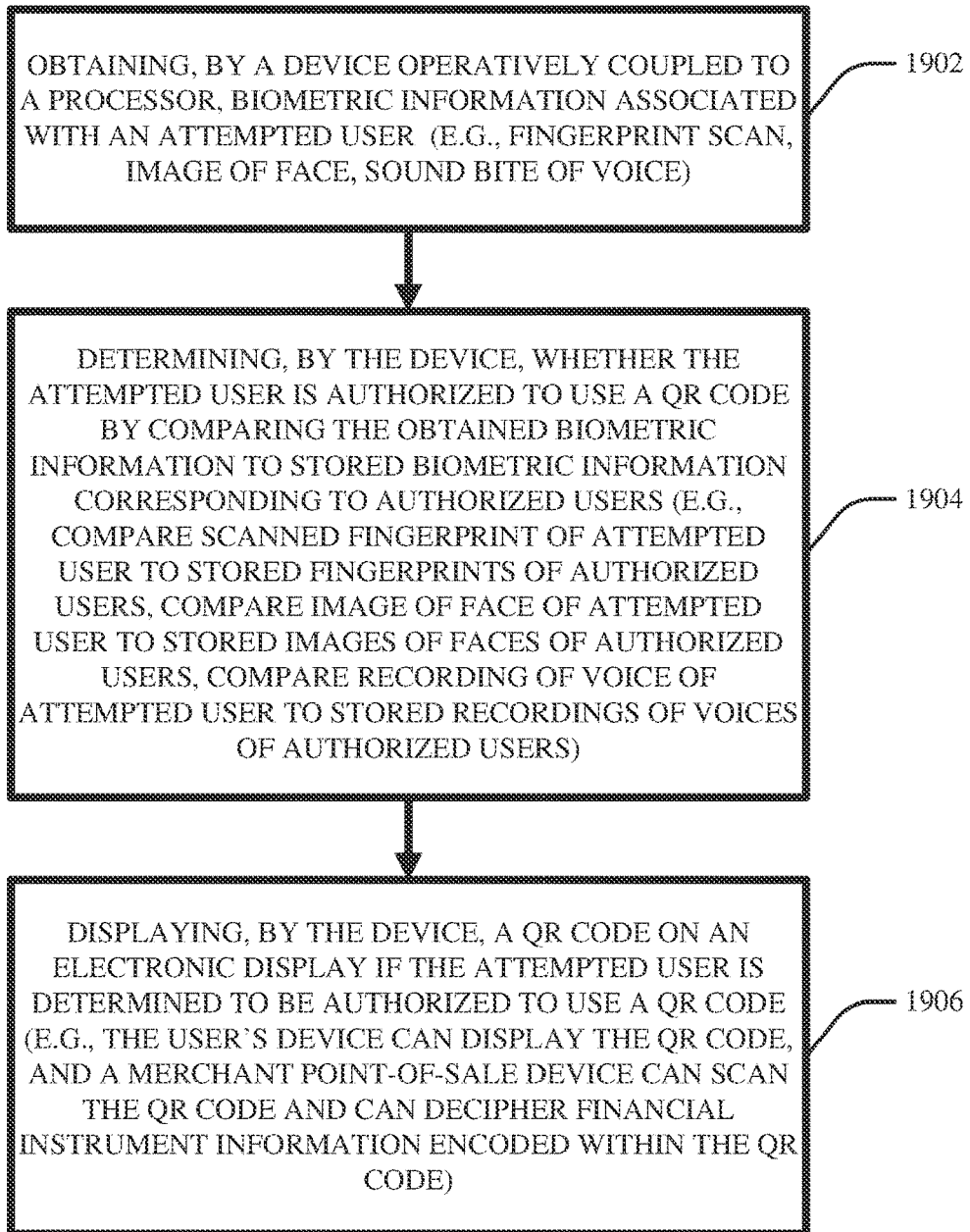
FIG. 19 illustrates a high-level flow diagram of an example, non-limiting computer-implemented method that facilitates enhanced, biometric-based QR code generation in accordance with one or more embodiments described herein.

FIG. 19 illustrates a high-level flow diagram of an example, non-limiting computer-implemented method 1900 that can facilitate enhanced, biometric-based QR code generation in accordance with one or more embodiments described herein. In various aspects, the computer-implemented method 1900 can be implemented by the system 1800.

In various embodiments, act 1902 can include obtaining, by a device operatively coupled to a processor (e.g., 104), biometric information associated with an attempted user (e.g., a user/entity that is prompting the QR code system 102 to generate and/or display a QR code with embedded financial instrument information). For example, the biometric information can include fingerprint scans of the attempted user, images of the face of the attempted user, soundbites of the voice of the attempted user, and/or any other suitable biometric data.

In various aspects, act 1904 can include determining, by the device (e.g., 102 and/or 1802), whether the attempted use is authorized to use a QR code by comparing the obtained biometric information to stored biometric information corresponding to authorized users. For instance, this can include comparing the scanned fingerprints of the attempted user to stored fingerprints of known authorized users, comparing the facial images of the attempted user to stored facial images of known authorized users, and/or comparing voice recordings of the attempted user to stored voice recordings of known authorized users.

In various cases, act 1906 can include displaying, by the device (e.g., 124 and/or 104), a QR code on an electronic display (e.g., 106) if the attempted user is determined to be authorized to use a QR code. For instance, after determining that biometric information provided by the attempted user matches and/or corresponds to stored biometric information of known authorized users, the user's device can display the QR code and a merchant point-of-sale device (e.g., 108) can scan the QR code and can decipher financial instrument information (e.g., 302) that is encoded within the QR code.

Figure 20:
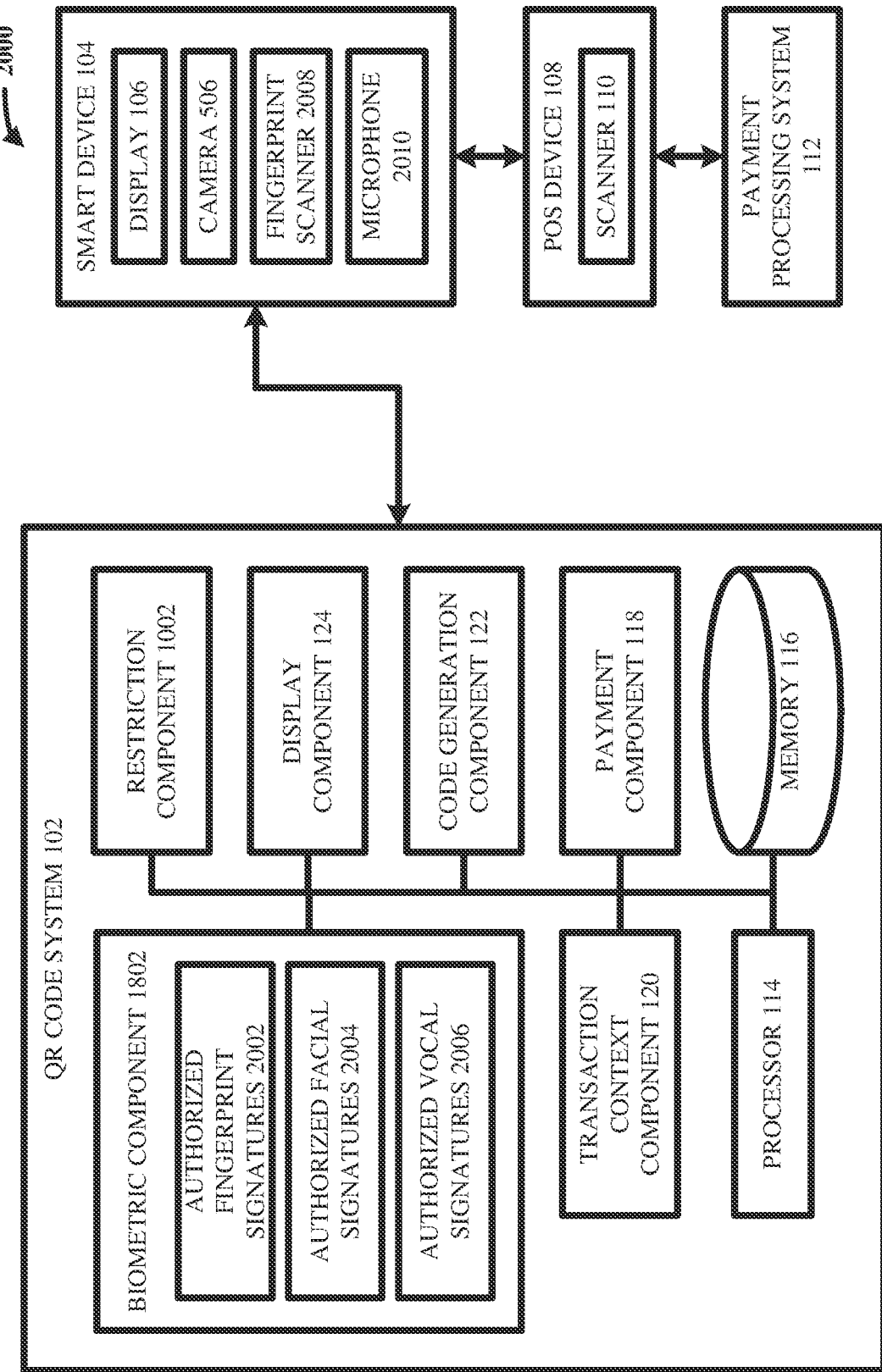
FIG. 20 illustrates a high-level block diagram of an example, non-limiting system including biometric signatures that facilitates enhanced, biometric-based QR code generation in accordance with one or more embodiments described herein.

FIG. 20 illustrates a high-level block diagram of an example, non-limiting system 2000 including biometric signatures that can facilitate enhanced, biometric-based QR code generation in accordance with one or more embodiments described herein. As shown, the system 2000 can, in some cases, comprise the same components as the system 1800, and can further comprise authorized fingerprint signatures 2002, authorized facial signatures 2004, and/or authorized vocal signatures 2006.

In various instances, the authorized fingerprint signatures 2002 can be any suitable fingerprint scans of users and/or entities that are known to be authorized to use in commercial transactions the financial instrument information 302. In various aspects, when an attempted user prompts the QR code system 102 to generate a QR code, the smart device 104 can leverage a fingerprint scanner 2008 to collect from the attempted user a fingerprint sample. The biometric component 1802 can then compare the fingerprint sample of the attempted user to the authorized fingerprint signatures 2002 (e.g., via any suitable computational and/or pattern recognition technique). If the fingerprint sample of the attempted user matches and/or corresponds to at least one of the authorized fingerprint signatures 2002, the biometric component 1802 can determine that the attempted user is an authorized user. The QR code system 102 can accordingly generate and/or display a QR code as prompted by the attempted user. If, however, the fingerprint sample of the attempted user does not match and/or correspond to at least one of the authorized fingerprint signatures 2002, the biometric component 1802 can determine that the attempted user is not an authorized user. The QR code system 102 can accordingly refrain from generating and/or displaying a QR code despite being prompted by the attempted user.

In various instances, the authorized facial signatures 2004 can be any suitable facial images of users and/or entities that are known to be authorized to use in commercial transactions the financial instrument information 302. In various aspects, when an attempted user prompts the QR code system 102 to generate a QR code, the smart device 104 can leverage the camera 506 to capture a facial image of the attempted user. The biometric component 1802 can then compare the facial image of the attempted user to the authorized facial signatures 2004 (e.g., via any suitable computational and/or pattern recognition technique). If the facial image of the attempted user matches and/or corresponds to at least one of the authorized facial signatures 2004, the biometric component 1802 can determine that the attempted user is an authorized user. The QR code system 102 can accordingly generate and/or display a QR code as prompted by the attempted user. If, however, the facial image of the attempted user does not match and/or correspond to at least one of the authorized facial signatures 2004, the biometric component 1802 can determine that the attempted user is not an authorized user. The QR code system 102 can accordingly refrain from generating and/or displaying a QR code despite being prompted by the attempted user.

In various instances, the authorized vocal signatures 2006 can be any suitable voice recordings and/or vocal soundbites of users and/or entities that are known to be authorized to use in commercial transactions the financial instrument information 302. In various aspects, when an attempted user prompts the QR code system 102 to generate a QR code, the smart device 104 can leverage the microphone 2010 to capture a voice sample of the attempted user. The biometric component 1802 can then compare the voice sample of the attempted user to the authorized vocal signatures 2006 (e.g., via any suitable computational and/or pattern recognition technique). If the voice sample of the attempted user matches and/or corresponds to at least one of the authorized vocal signatures 2006, the biometric component 1802 can determine that the attempted user is an authorized user. The QR code system 102 can accordingly generate and/or display a QR code as prompted by the attempted user. If, however, the voice sample of the attempted user does not match and/or correspond to at least one of the authorized vocal signatures 2006, the biometric component 1802 can determine that the attempted user is not an authorized user. The QR code system 102 can accordingly refrain from generating and/or displaying a QR code despite being prompted by the attempted user.

In various embodiments, any suitable biometric information and/or biometric data can be used as triggering criteria for the generation and/or display of QR codes (e.g., fingerprint recognition, facial recognition, voice recognition, DNA recognition, retina recognition, blood recognition). In such embodiments, any suitable biometric sensors can be employed (e.g., miniature DNA analyzer incorporated into the smart device 104, blood sampler and/or analyzer incorporated into the smart device 104).

Figure 21:
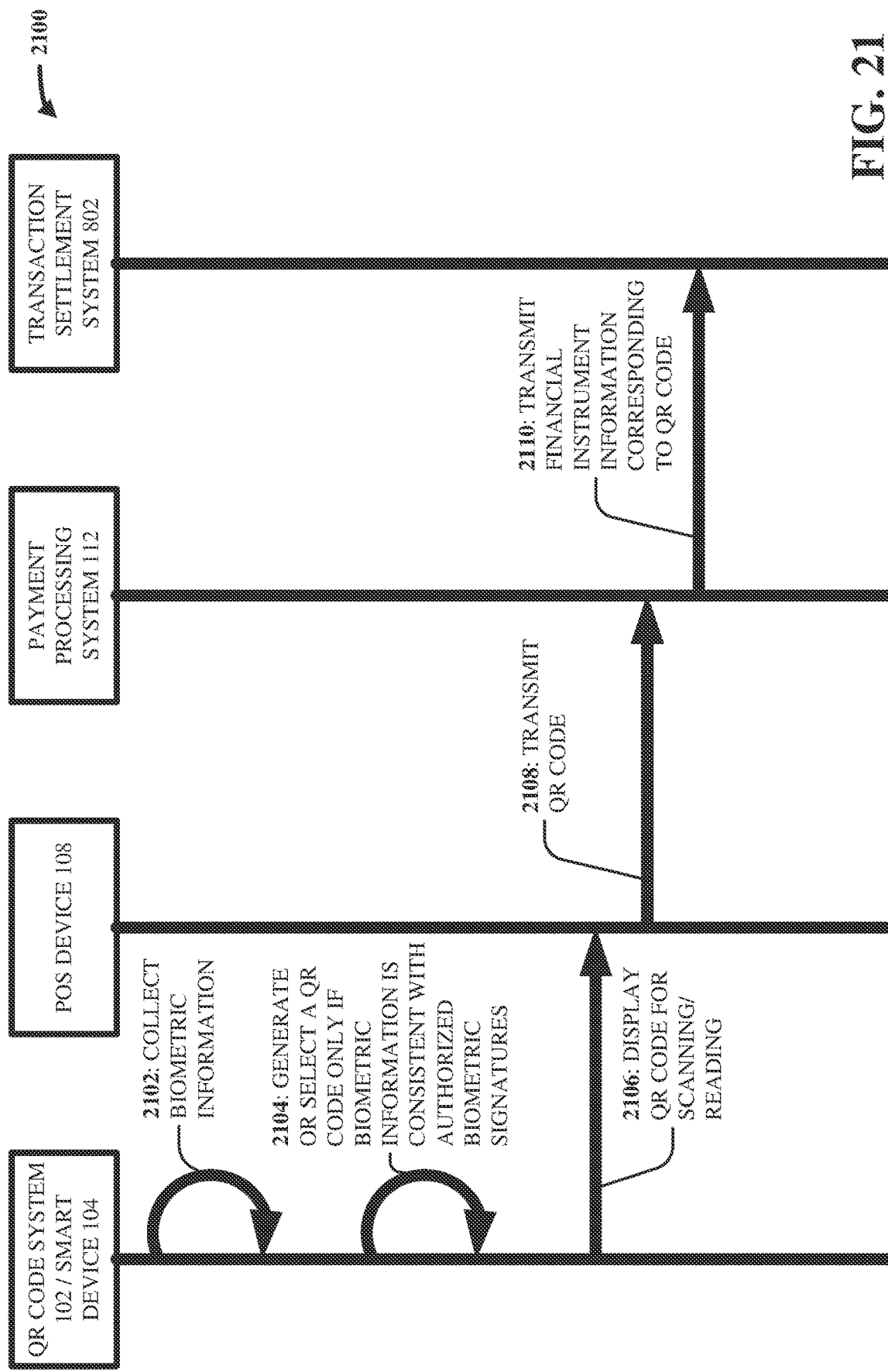
FIG. 21 illustrates a high-level communication diagram of an example, non-limiting workflow that facilitates enhanced, biometric-based QR code generation in accordance with one or more embodiments described herein.

FIG. 21 illustrates a high-level communication diagram of an example, non-limiting workflow 2100 that can facilitate enhanced, biometric-based QR code generation in accordance with one or more embodiments described herein.

In various embodiments, the QR code system 102 and/or the smart device 104 can collect biometric information (e.g., via 506, 2008, and/or 2010) from an attempted user, at act 2102.

In various instances, the QR code system 102 and/or the smart device 104 can generate and/or select a QR code (e.g., 702) only if the biometric information matches and/or corresponds to and/or is consistent with authorized biometric signatures (e.g., 2002, 2004, 2006) that are known and/or maintained by the QR code system 102, at act 2104.

In various aspects, the QR code system 102 and/or the smart device 104 can display (e.g., visually render) the QR code to the POS device 108 for scanning and/or reading, at act 2106.

In various instances, the POS device 108 can transmit to the payment processing system 112 the QR code at act 2108, and the payment processing system 112 can transmit to the transaction settlement system 802 the financial instrument information (e.g., 302) that is encoded and/or embedded within (and/or that corresponds to) the QR code, at act 2110.

Figure 22:
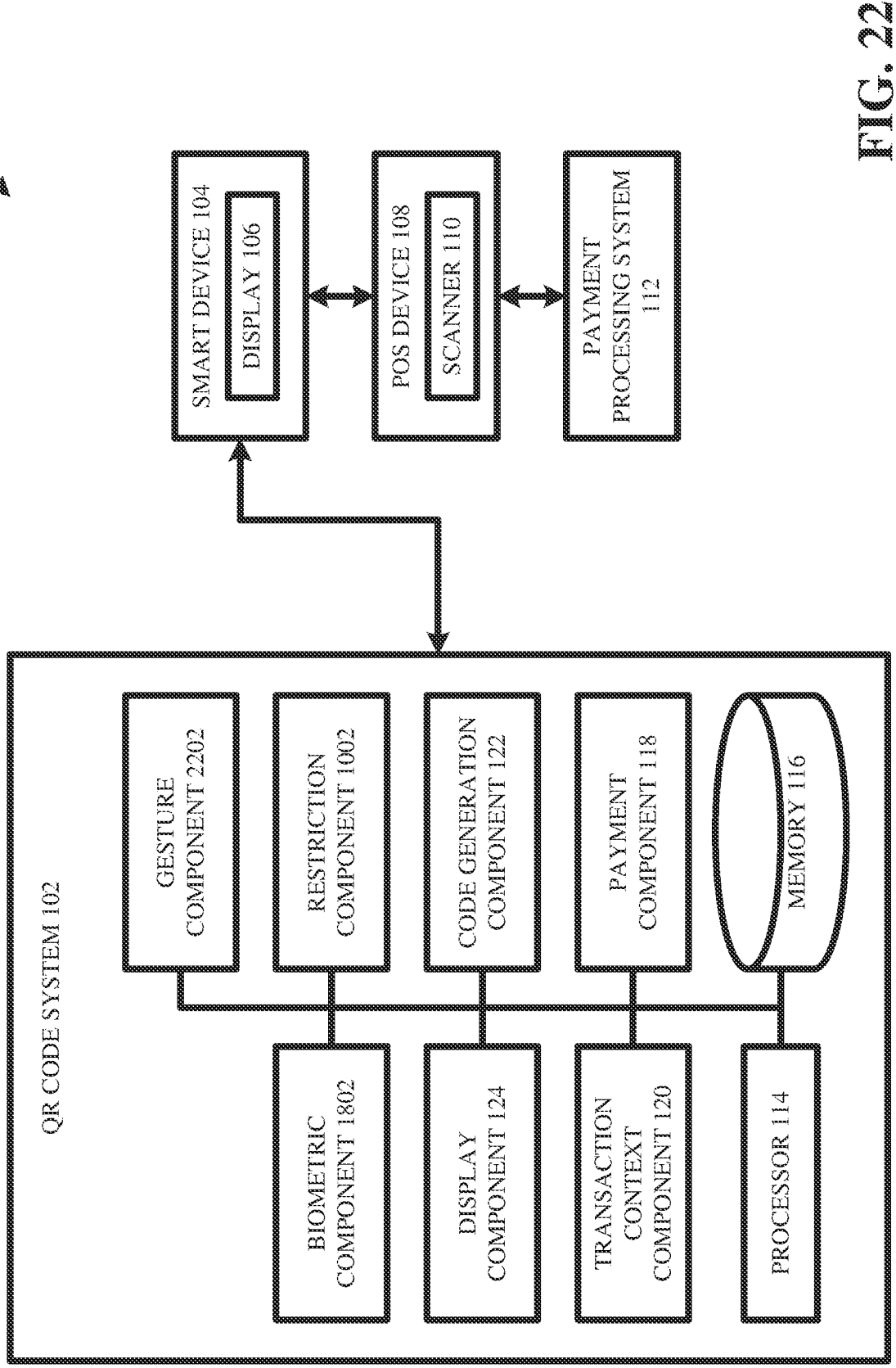
FIG. 22 illustrates a high-level block diagram of an example, non-limiting system that facilitates enhanced, gesture-based QR code generation in accordance with one or more embodiments described herein.

FIG. 22 illustrates a high-level block diagram of an example, non-limiting system 2200 that can facilitate enhanced, gesture-based QR code generation in accordance with one or more embodiments described herein. As shown, the system 2200 can, in some instances, comprise the same components as the system 2000, and can further comprise a gesture component 2202.

In various embodiments, the gesture component 2202 can receive, retrieve, obtain, store, and/or maintain gesture-based information regarding the user of the smart device 104 and/or regarding the financial instrument information 302 (not shown in FIG. 22 for sake of space). As explained herein, such gesture-based information can, in various cases, include any suitable physical manipulations of the smart device 104 that are required to be performed prior to the electronic generation and/or display of QR codes (e.g., prior to the divulgation of the financial instrument information 302). For example, such gesture-based information can include physical motions performed with the smart device 104, physical tilts and/or orientations performed with the smart device 104, and/or any other suitable physical manipulations performed with the smart device 104. In various embodiments, such gesture-based information can be treated as triggering criteria for the generation and/or display of QR codes. In other words, the QR code system 102 can store authorized gestures (e.g., motions, tilts, orientations, pans, rotations, bumps, and/or any other suitable movement patterns) that can be required to be performed with the smart device 104 prior to the generation and/or display of QR codes. In various cases, the QR code system 102 can utilize motion sensors (e.g., accelerometers, gyroscopic sensors) in the smart device 104 to determine whether or not an authorized gesture has been performed. In various cases, the QR code system 102 can refrain from generating and/or displaying QR codes that represent the financial instrument information 302 until the QR code system 102 senses and/or determines that an authorized gesture has been performed with the smart device 104. In this way, the QR code system 102 can help to reduce fraud and increase security by generating and/or displaying QR codes only when proper triggering criteria are present.

Figure 23:
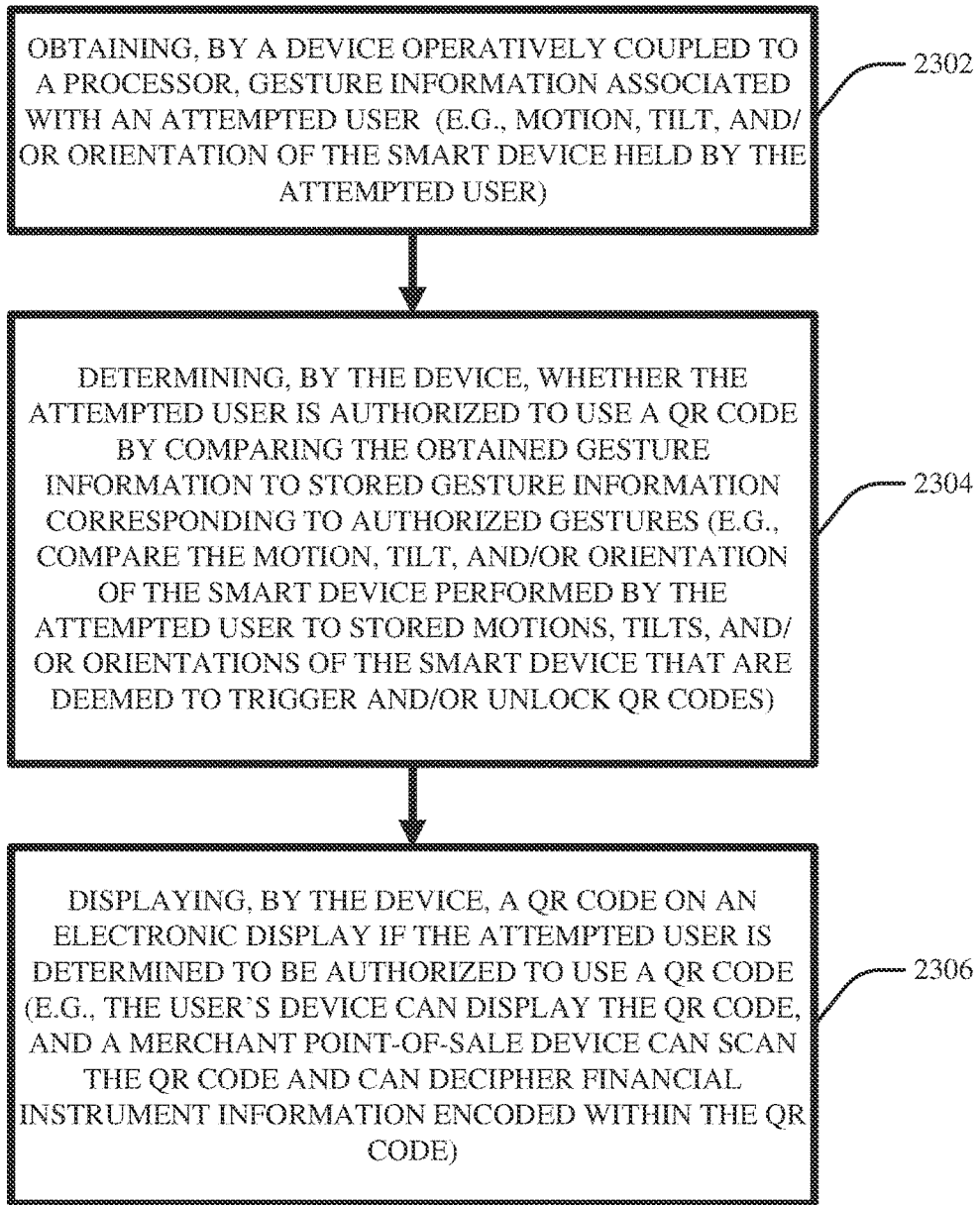
FIG. 23 illustrates a high-level flow diagram of an example, non-limiting computer-implemented method that facilitates enhanced, gesture-based QR code generation in accordance with one or more embodiments described herein.

FIG. 23 illustrates a high-level flow diagram of an example, non-limiting computer-implemented method 2300 that can facilitate enhanced, gesture-based QR code generation in accordance with one or more embodiments described herein. In various aspects, the computer-implemented method 2300 can be facilitated and/or implemented by the system 2200.

In various embodiments, act 2302 can include obtaining, by a device operatively coupled to a processor (e.g., 104), gesture information associated with an attempted user. For example, such gesture information can include a physical motion, a physical tilt, a physical orientation, a physical manipulation, and/or any other physical movement pattern that is performed by the smart device 104 held by the attempted user.

In various aspects, act 2304 can include determining, by the device (e.g., 2202), whether the attempted user is authorized to use a QR code by comparing the obtained gesture information to stored gesture information corresponding to authorized gestures. For example, this can include comparing the physical motion, tilt, orientation, manipulation, and/or movement pattern of the smart device performed by the attempted user to stored motions, tilts, orientations, manipulations, and/or movement patterns that are known and/or deemed to trigger and/or unlock QR codes.

In various instances, act 2306 can include displaying, by the device (e.g., 104 and/or 122), a QR code on an electronic display (e.g., 106) if the attempted user is determined to be authorized to use a QR code. For example, the user's device can display the QR code, and a merchant point-of-sale device can scan the QR code and can decipher financial instrument information (e.g., 302) that is encoded and/or embedded within the QR code.

Figure 24:
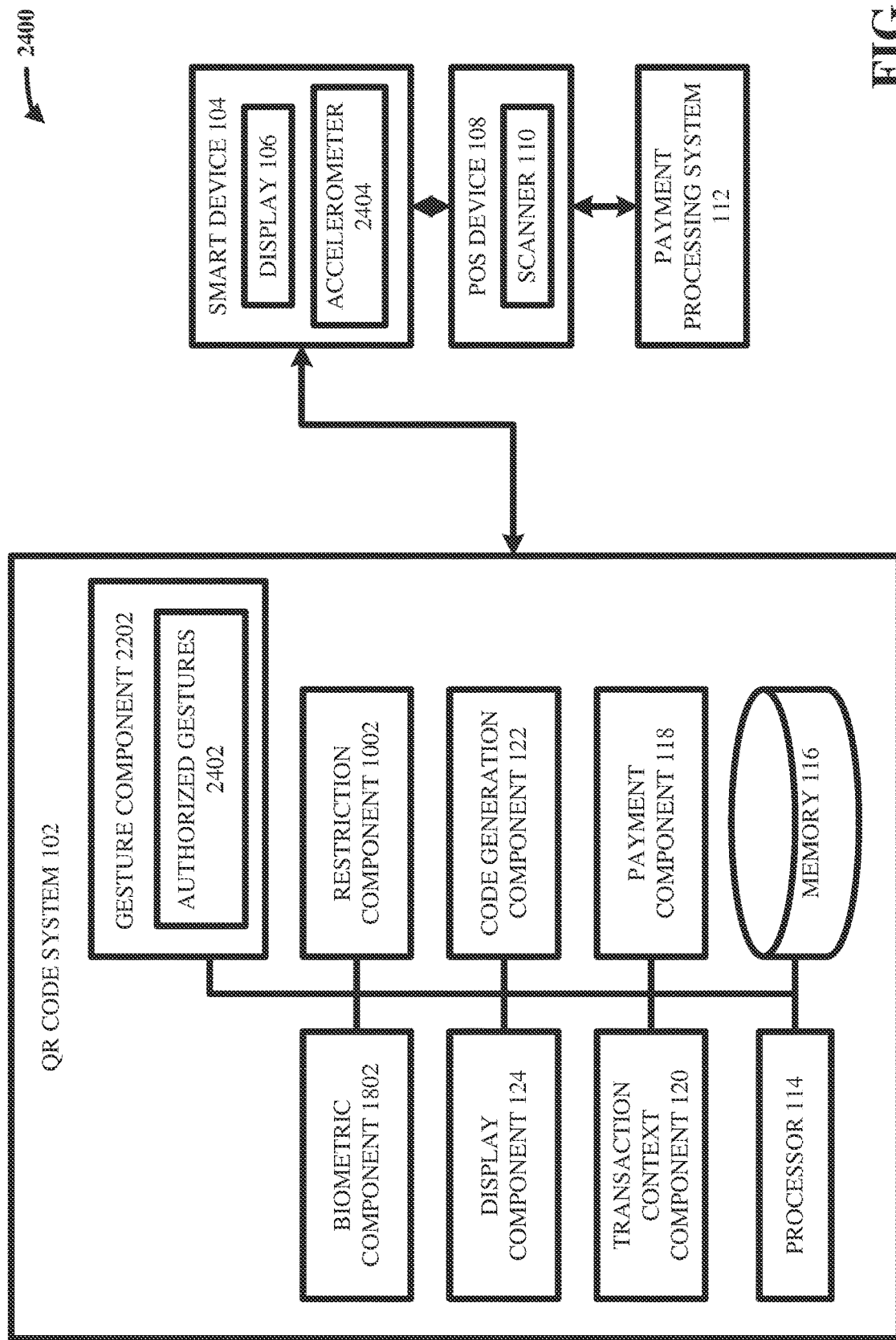
FIG. 24 illustrates a high-level block diagram of an example, non-limiting system including authorized gestures that facilitates enhanced, gesture-based QR code generation in accordance with one or more embodiments described herein.

FIG. 24 illustrates a high-level block diagram of an example, non-limiting system 2400 including authorized gestures that can facilitate enhanced, gesture-based QR code generation in accordance with one or more embodiments described herein. As shown, the system 2400 can, in some instances, comprise the same components as the system 2200, and can further comprise authorized gestures 2402.

In various embodiments, the authorized gestures 2402 can be any suitable physical motions, physical tilts, physical orientations, physical manipulations, and/or physical movement patterns of the smart device 104 that can be required to trigger the electronic generation and/or display of a QR code that represents the financial instrument information 302 (not shown in FIG. 24 for sake of space). Some non-limiting examples of the authorized gestures 2402 can include orienting the smart device 104 face-up, orienting the smart device 104 face-down, orienting the smart device at any other suitable angle and/or orientation in three-dimensional space, performing an up-and-down motion with the smart device 104, performing a side-to-side motion with the smart device 104, moving the smart device 104 in a circle (e.g., clockwise and/or counterclockwise), moving the smart device 104 in a figure-eight motion, moving the smart device 104 in an X-shaped motion, and/or moving the smart device 104 in any other suitable way. In various aspects, when an attempted user prompts the QR code system 102 to generate a QR code, the smart device 104 can leverage an accelerometer 2404 (e.g., and/or any other suitable motion sensor and/or gyroscopic sensor) to sense the motion and/or orientation of the smart device 104. The gesture component 2202 can then compare the sensed motion and/or orientation of the smart device 104 to the authorized gestures 2402 (e.g., via any suitable computational and/or pattern recognition technique). If the sensed motion and/or orientation matches and/or corresponds to at least one of the authorized gestures 2402, the gesture component 2202 can determine that the attempted user is an authorized user and/or that the attempted user has successfully unlocked QR code generation. The QR code system 102 can accordingly generate and/or display a QR code as prompted by the attempted user. If, however, the sensed motion and/or orientation does not match and/or correspond to at least one of the authorized gestures 2402, the gesture component 2202 can determine that the attempted user is not an authorized user and/or that the attempted user has not successfully unlocked QR code generation. The QR code system 102 can accordingly refrain from generating and/or displaying a QR code despite being prompted by the attempted user.

For example, suppose the user of the smart device 104 desires to engage in a transaction, and suppose that the authorized gestures 2402 include only a figure-eight motion. In various cases, the QR code system 102 can monitor the physical motion and/or orientation of the smart device 104 via the accelerometer 2404 (and/or via any other suitable motion sensors). In various aspects, the QR code system 102 can refrain from generating and/or displaying a QR code that represents the financial instrument information 302 until the user performs a figure-eight motion with the smart device 104 (e.g., by controllably moving the smart device 104 through the air in the path and/or pattern of a figure-eight). In this way, divulgation of QR codes (and thus of the financial instrument information 302) can be prevented until a triggering gesture is performed.

In various other embodiments, physical gestures/motions sensed by the gesture component 2202 via the accelerometer 2404 can be performed by a user of the smart device 104 in order to select a desired QR code to generate and/or display. As explained throughout, various embodiments of the subject innovation can include embedding various information (e.g., context-based information, restriction-based information, privacy-based information) into QR codes, and/or otherwise correlating/mapping QR codes to such various information. Thus, in various instances, different physical gestures/motions can be correlated to different information, and the performance of such different physical gestures/motions can trigger the creation and/or display of different QR codes that likewise correspond to the different information. For example, suppose that a first gesture/motion corresponds to a first financial instrument (e.g., a particular credit card) and that a second motion corresponds to a second financial instrument (e.g., a particular gift card). If the gesture component 2202 detects, via the accelerometer 2404, that the first gesture/motion is performed with the smart device 104, the QR code system 102 can generate, select, and/or display a QR code that corresponds and/or is correlated to the first financial instrument (e.g., the particular credit card number can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second financial instrument (e.g., the particular gift card number can be embedded within the QR code and/or otherwise mapped to the particular optical barcode pattern of the QR code).

As another example, suppose that a first gesture/motion corresponds to a first geo-location and/or set of geo-locations and that a second motion corresponds to a second geo-location and/or set of geo-locations. If the gesture component 2202 detects, via the accelerometer 2404, that the first gesture/motion is performed with the smart device 104, the QR code system 102 can generate, select, and/or display a QR code that corresponds and/or is correlated to the first geo-location and/or set of geo-locations (e.g., an indication of the first geo-location and/or set of geo-locations can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second geo-location and/or set of geo-locations (e.g., an indication of the second geo-location and/or set of geo-locations can be embedded within the QR code and/or otherwise mapped to the particular optical barcode pattern of the QR code).

As another example, suppose that a first gesture/motion corresponds to a first time/date and/or set of times/dates and that a second motion corresponds to a second time/date and/or set of times/dates. If the gesture component 2202 detects, via the accelerometer 2404, that the first gesture/motion is performed with the smart device 104, the QR code system 102 can generate, select, and/or display a QR code that corresponds and/or is correlated to the first time/date and/or set of times/dates (e.g., an indication of the first time/date and/or set of times/dates can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second time/date and/or set of times/dates (e.g., an indication of the second time/date and/or set of times/dates can be embedded within the QR code and/or otherwise mapped to the particular optical barcode pattern of the QR code).

As another example, suppose that a first gesture/motion corresponds to a first product/service and/or set of products/ services and that a second motion corresponds to a second product/service and/or set of products/services. If the gesture component 2202 detects, via the accelerometer 2404, that the first gesture/motion is performed with the smart device 104, the QR code system 102 can generate, select, and/or display a QR code that corresponds and/or is correlated to the first product/service and/or set of products/services (e.g., an indication of the first product/service and/or set of products/services can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second product/service and/or set of products/services (e.g., an indication of the second product/service and/or set of products/services can be embedded within the QR code and/or otherwise mapped to the particular optical barcode pattern of the QR code).

As another example, suppose that a first gesture/motion corresponds to a first transaction amount and/or set of transaction amounts and that a second motion corresponds to a second transaction amount and/or set of transaction amounts. If the gesture component 2202 detects, via the accelerometer 2404, that the first gesture/motion is performed with the smart device 104, the QR code system 102 can generate, select, and/or display a QR code that corresponds and/or is correlated to the first transaction amount and/or set of transaction amounts (e.g., an indication of the first transaction amount and/or set of transaction amounts can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second transaction amount and/or set of transaction amounts (e.g., an indication of the second transaction amount and/or set of transaction amounts can be embedded within the QR code and/or otherwise mapped to the particular optical barcode pattern of the QR code).

As another example, suppose that a first gesture/motion corresponds to a first merchant and/or set of merchants and that a second motion corresponds to a second merchant and/or set of merchants. If the gesture component 2202 detects, via the accelerometer 2404, that the first gesture/motion is performed with the smart device 104, the QR code system 102 can generate, select, and/or display a QR code that corresponds and/or is correlated to the first merchant and/or set of merchants (e.g., an indication of the first merchant and/or set of merchants can be embedded within the QR code and/or otherwise mapped to the particular optical barcode pattern of the QR code). If, on the other hand, the gesture component 2202 detects, via the accelerometer 2404, that the second gesture/motion is performed with the smart device 104, the QR code system 102 can generate, select, and/or display a QR code that corresponds and/or is correlated to the second merchant and/or set of merchants (e.g., an indication of the second merchant and/or set of merchants can be embedded within the QR code and/or otherwise mapped to the particular optical barcode pattern of the QR code).

In this way, physical/gestures can be considered as a way to receive input from the user of the smart device 104, which input can constitute a selection of a desired QR code to generate, select, and/or display.

In some embodiments, the accelerometer 2404 (and/or any other suitable motion sensors) can be used to pinpoint a precise time at which the smart device 104 is displayed to the POS device 108. That is, the accelerometer 2404 can detect a physical motion pattern that is consistent with displaying and/or presenting a mobile phone screen to a barcode scanner, and the time of such physical motion pattern can be marked, recorded, embedded within, and/or otherwise correlated to the QR code that is rendered on the mobile phone screen at the time that the physical motion pattern is performed. In some cases, the POS device 108 and/or the transaction settlement system 802 can compare the known/trusted time at which the transaction is occurring to the accelerometer-based time that is correlated to the QR code. If they are consistent, the POS device 108 and/or the transaction settlement system 802 can determine that the QR code is valid. If they are inconsistent, however, the POS device 108 and/or the transaction settlement system 802 can determine that the QR code is invalid.

Figure 25:
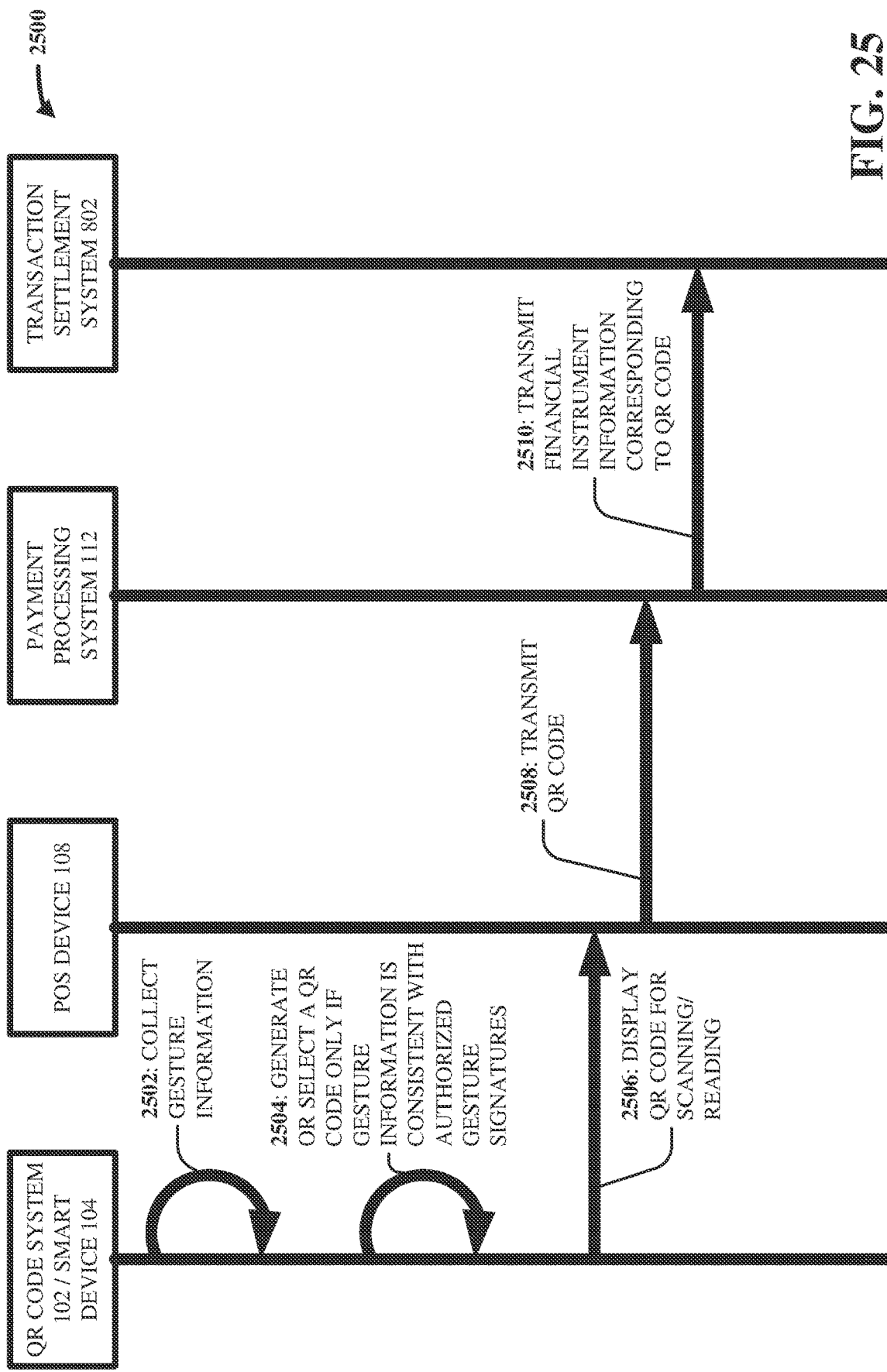
FIG. 25 illustrates a high-level communication diagram of an example, non-limiting workflow that facilitates enhanced, gesture-based QR code generation in accordance with one or more embodiments described herein.

FIG. 25 illustrates a high-level communication diagram of an example, non-limiting workflow 2500 that can facilitate enhanced, gesture-based QR code generation in accordance with one or more embodiments described herein.

In various embodiments, the QR code system 102 and/or the smart device 104 can collect gesture information (e.g., via the accelerometer 2404) at act 2502. As explained above, such gesture information can be the physical motions, tilts, orientations, manipulations, and/or movement patterns that are being performed with and/or experienced by the smart device 104.

In various cases, the QR code system 102 and/or the smart device 104 can generate and/or select a QR code (e.g., 702) only if the gesture information matches and/or corresponds to at least one authorized gesture (e.g., 2402) known and/or maintained by the QR code system 102, at act 2504.

In various aspects, the QR code system 102 and/or the smart device 104 can display to the POS device 108 the QR code for scanning and/or reading, at act 2506.

In various cases, the POS device 108 can transmit to the payment processing system 112 the QR code at act 2508, and the payment processing system 112 can transmit to the transaction settlement system 802 the financial instrument information encoded and/or encrypted in (and/or corresponding to) the QR code, at act 2510.

Figure 26:
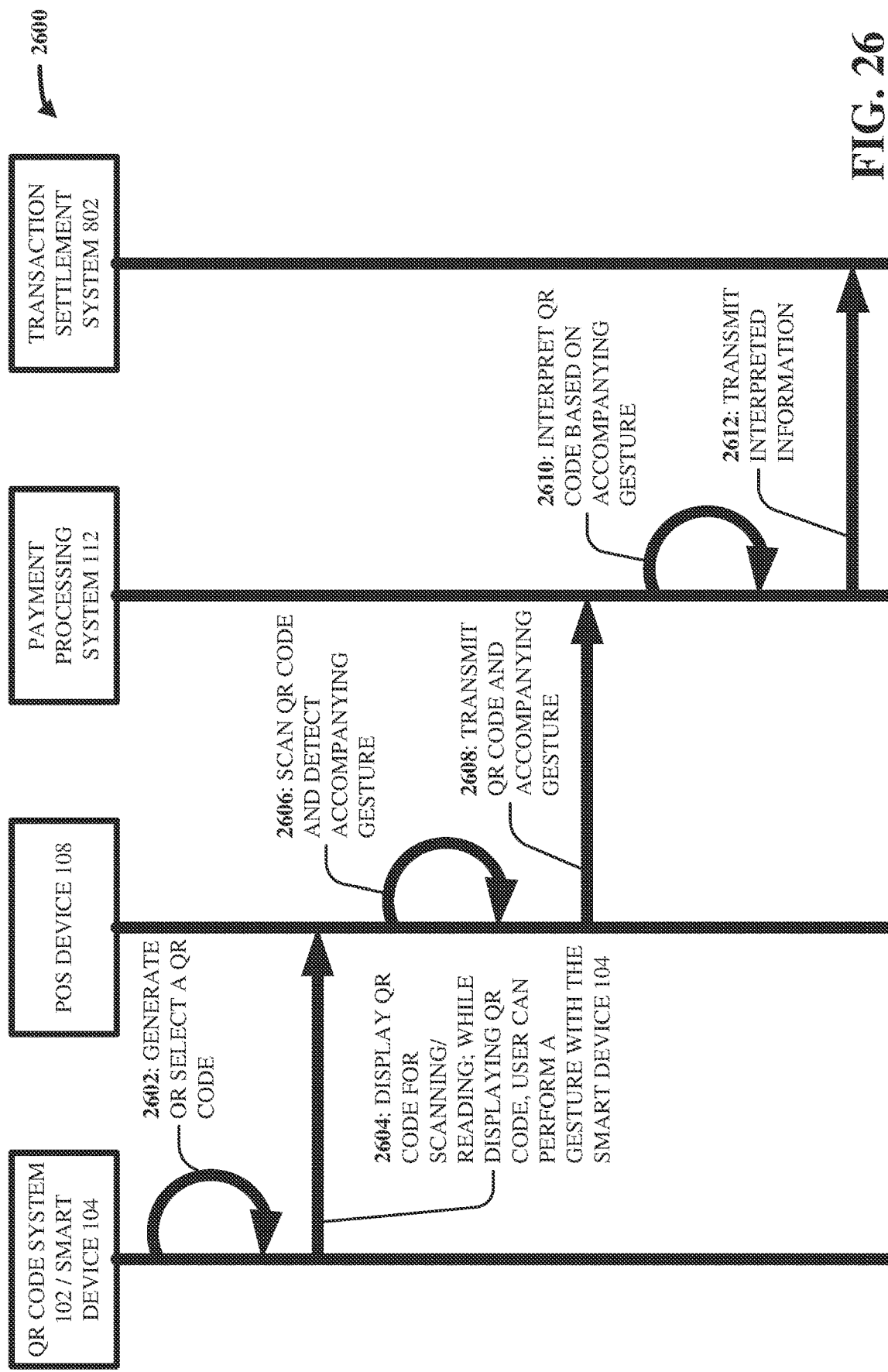
FIG. 26 illustrates a high-level communication diagram of an example, non-limiting workflow that facilitates enhanced, gesture-based QR code generation in accordance with one or more embodiments described herein.

FIG. 26 illustrates a high-level communication diagram of an example, non-limiting workflow 2600 that can facilitate enhanced, gesture-based QR code generation in accordance with one or more embodiments described herein.

The above discussion explains how various embodiments of the subject innovation can utilize gestures as triggering criteria for unlocking (and/or locking, in some cases) the electronic generation and/or display of QR codes. In various other aspects, however, gesture-based information can be used by the POS device 108 to interpret and/or process a QR code generated and/or displayed by the smart device 104. In other words, a QR code that is generated and/or displayed by the smart device 104 can be interpreted differently based upon a physical gesture of the smart device 104 that accompanies the QR code (e.g., based upon a physical motion of the smart device 104 while the smart device 104 is displaying the QR code).

In various embodiments, as shown, the QR code system 102 and/or the smart device 104 can generate a QR code (e.g., 702) at act 2602.

In various cases, the QR code system 102 and/or the smart device 104 can display the QR code to the POS device 108 for scanning and/or reading, at act 2604. In various aspects, while the smart device 104 is displaying the QR code, the user of the smart device 104 can perform a gesture with the smart device 104 (e.g., a physical motion, tilt, pan, orientation, and/or other movement pattern).

In various instances, the POS device 108 can scan the QR code and can detect the accompanying gesture performed with the smart device 104, at act 2606 (e.g., the POS device 108 can identify the physical motion, tilt, pan, and/or other movement pattern of the smart device 104 via video and/or image capturing technology).

In various aspects, the POS device 108 can transmit the QR code and an indication of the accompanying gesture to the payment processing system 112, at act 2608.

In various cases, the payment processing system 112 can interpret the QR code based on the accompanying gesture, at act 2610.

In various instances, the payment processing system 112 can transmit the interpreted information to the transaction settlement system 802, at act 2612.

To clarify the above discussion, consider the following non-limiting example. Suppose that a generated and/or displayed QR code represents financial instrument information. In various cases, any suitable supplemental information can be conveyed by a physical gesture/motion that accompanies the QR code. In some examples, a spending cap (e.g., a maximum amount that can be charged in a given transaction using that financial instrument information) can be indicated and/or communicated based on the physical gesture/motion that accompanies the QR code (e.g., a figure-eight motion can indicate a spending cap of $100.00, an X-motion can indicate a spending cap of $50.00, and/or any other motion can indicate no spending cap). In other examples, a desire for a printed and/or electronic receipt can be indicated and/or communicated based on the physical gesture/motion that accompanies the QR code (e.g., an up-and-down motion can indicate an electronic receipt, a side-to-side motion can indicate a printed receipt, and/or any other motion can indicate no receipt). In still other examples, a desire to make a donation can be indicated and/or communicated based on the physical gesture/motion that accompanies the QR code (e.g., a side-ways tilt can indicate a donation to a first charity, an upside-down tilt can indicate a donation to a second charity, and/or any other motion/tilt can indicate no donation). As yet other examples, a desire to redeem accrued reward points can be indicated and/or communicated based on the physical gesture/motion that accompanies the QR code (e.g., a shaking motion can indicate that available rewards points should be redeemed in the transaction, and/or any other motion can indicate that available rewards points should not be redeemed). In various aspects, any other suitable type of information can be conveyed based upon a physical motion and/or gesture that accompanies a generated and/or displayed QR code (e.g., a QR code paired with a certain gesture can denote certain financial instrument information, while the QR code paired with a different gesture can denote different financial instrument information, a QR code paired with a certain gesture can denote certain a certain geo-location stamp and/or time stamp, while the QR code paired with a different gesture can denote a different geo-location stamp and/or time stamp; a QR code paired with a certain gesture can denote certain a product or service identifier, while the QR code paired with a different gesture can denote a different product or service identifier; a QR code paired with a certain gesture can denote a certain price identifier, while the QR code paired with a different gesture can denote a different price identifier; a QR code paired with a certain gesture can denote a certain merchant identifier, while the QR code paired with a different gesture can denote a different merchant identifier).

The above discussion explains how various embodiments of the subject innovation can utilize biometric data and/or gesture-based data to lock and/or unlock the electronic generation and/or display of QR codes. In various aspects, password-protection and/or passcode protection can similarly be used as triggering criteria to lock and/or unlock generation and/or display of QR codes (e.g., the QR code system 102 can refrain from generating or displaying QR codes until a required password and/or passcode is inputted).

Figure 27:
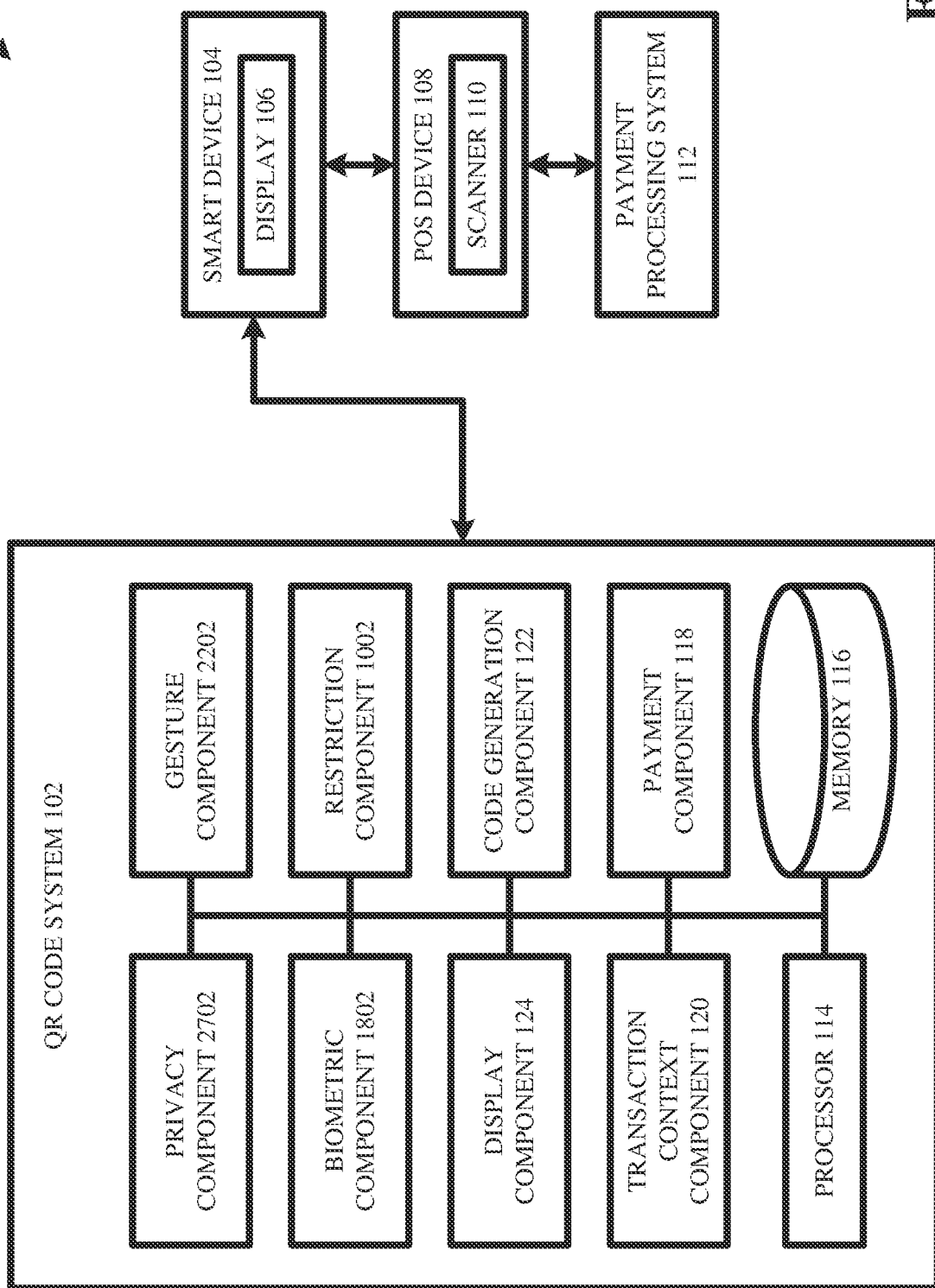
FIG. 27 illustrates a high-level block diagram of an example, non-limiting system that facilitates enhanced, privacy-based QR code generation in accordance with one or more embodiments described herein.

FIG. 27 illustrates a high-level block diagram of an example, non-limiting system 2700 that can facilitate enhanced, privacy-based QR code generation in accordance with one or more embodiments described herein. As shown, the system 2700 can, in some cases, comprise the same components as the system 2400, and can further comprise a privacy component 2702.

In various embodiments, the privacy component 2702 can receive, retrieve, obtain, store, and/or maintain privacy-based information regarding the user of the smart device 104. As explained throughout this disclosure, various types of information can be encoded, encrypted, and/or embedded into QR codes (e.g., financial instrument information 302, context-based information, restriction-based information, and/or so on). In various aspects, privacy-based information (e.g., preferences, contact information, biographical information) can be encoded, encrypted, and/or embedded into QR codes, as well. Thus, in various aspects, such privacy-based information can be securely, privately, and/or seamlessly communicated to the POS device 108. Such privacy-based information can, in various cases, include any suitable preference information of the user of the smart device 104 (e.g., product preferences, service preferences, food preferences, price preferences, media/platform/device preferences, language preferences), any suitable contact information of the user of the smart device 104 (e.g., phone number, email address, residential address), and/or any suitable biographical information of the user of the smart device 104 (e.g., birthdate, age, occupation, ethnicity, political affiliation, browsing/purchase history). In various aspects, the privacy component 2702 can obtain such privacy-based information from any suitable database and/or data structure which can be electronically accessed by the privacy component 2702 (e.g., preferences, contact information, and/or biographical information of the user can be stored locally on the smart device 104; and/or such information can be available from websites, application accounts, and/or online databases). In various embodiments, any suitable machine learning algorithms and/or techniques can be implemented to analyze available information regarding the user of the smart device 104 (e.g., to analyze social media accounts of the user, to analyze mobile application accounts/profiles of the user, to analyze available online information about the user) and to accordingly infer and/or determine such privacy-based information (e.g., the privacy component 2702 can scour and/or search through social media accounts of the user, mobile application profiles of the user, and/or any other suitable online and/or electronic information of the user in order to infer and/or guess such privacy-based information of the user). In some cases, such privacy-based information can be inputted manually by the user of the smart device 104.

Figure 28:
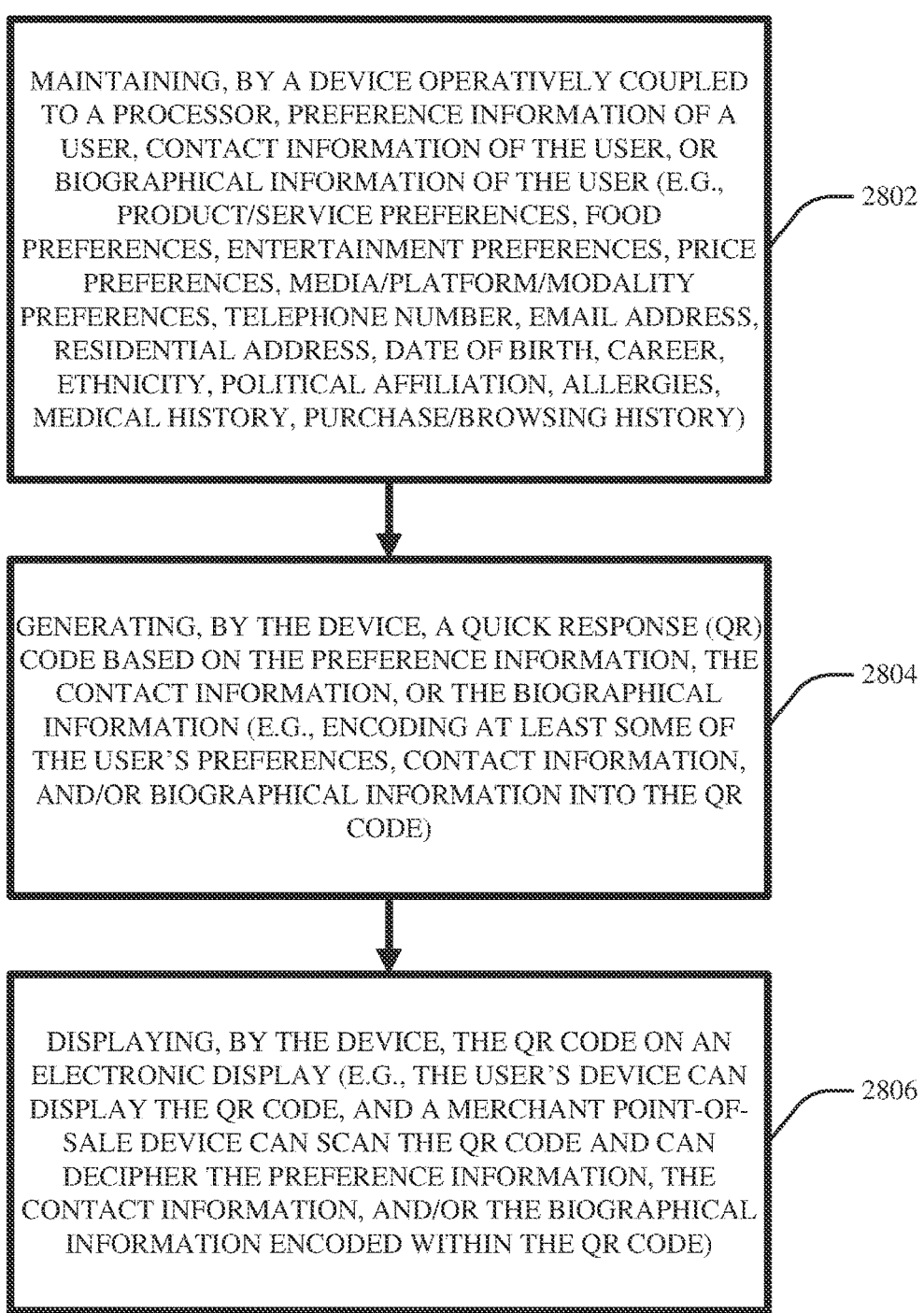
FIG. 28 illustrates a high-level flow diagram of an example, non-limiting computer-implemented method that facilitates enhanced, privacy-based QR code generation in accordance with one or more embodiments described herein.

FIG. 28 illustrates a high-level flow diagram of an example, non-limiting computer-implemented method 2800 that can facilitate enhanced, privacy-based QR code generation in accordance with one or more embodiments described herein. In various aspects, the computer-implemented method 2800 can be facilitated by the system 2700.

In various embodiments, act 2802 can include maintaining, by a device operatively coupled to a processor (e.g., 2702), preference information of a user, contact information of the user, or biographical information of the user. For example, this can include storing product/service preferences of the user (e.g., what products and/or services the user prefers to purchase and/or prefers to avoid), food preferences of the user (e.g., what foods and/or ingredients the user prefers to purchase and/or prefers to avoid), entertainment preferences of the user (e.g., what movies, activities, sports, games, and/or music the user prefers to purchase and/or prefers to avoid), price preferences of the user (e.g., what prices the user prefers to pay and/or prefers to avoid), media/platform/modality preferences (e.g., what computing devices the user prefers to use/interact with and/or prefers to avoid), and/or any other suitable preferences of the user. As another example, this can include storing telephone numbers of the user (e.g., cell phone, work phone, home phone), email address of the user (e.g., personal email address, work email address), physical address of the user (e.g., home/residential address, work address), and/or any other suitable contact information of the user. As yet another example, this can include storing birthdate of the user, career/occupation of the user, ethnicity of the user, political affiliations of the user, allergies of the user, medical history of the user, purchasing/browsing history of the user, transaction histories of the user, and/or any other suitable biographical information of the user.

In various cases, act 2804 can include generating, by the device (e.g., 120), a quick response (QR) code based on the preference information, the contact information, and/or the biographical information. In various cases, for example, this can include encoding and/or embedding at least some of the user's preferences, contact information, and/or biographical information into the QR code.

In various aspects, act 2806 can include displaying, by the device (e.g., 124 and/or 104), the QR code on an electronic display (e.g., 106). For example, the user's device can display the QR code, and a merchant point-of-sale device can scan the QR code and can decipher the preference information, the contact information, and/or the biographical information that is encoded within the QR code. In this way, such preference information, contact information, and/or biographical information can be securely, privately, and/or or seamlessly communicated to the point-of-sale device.

Figure 29:
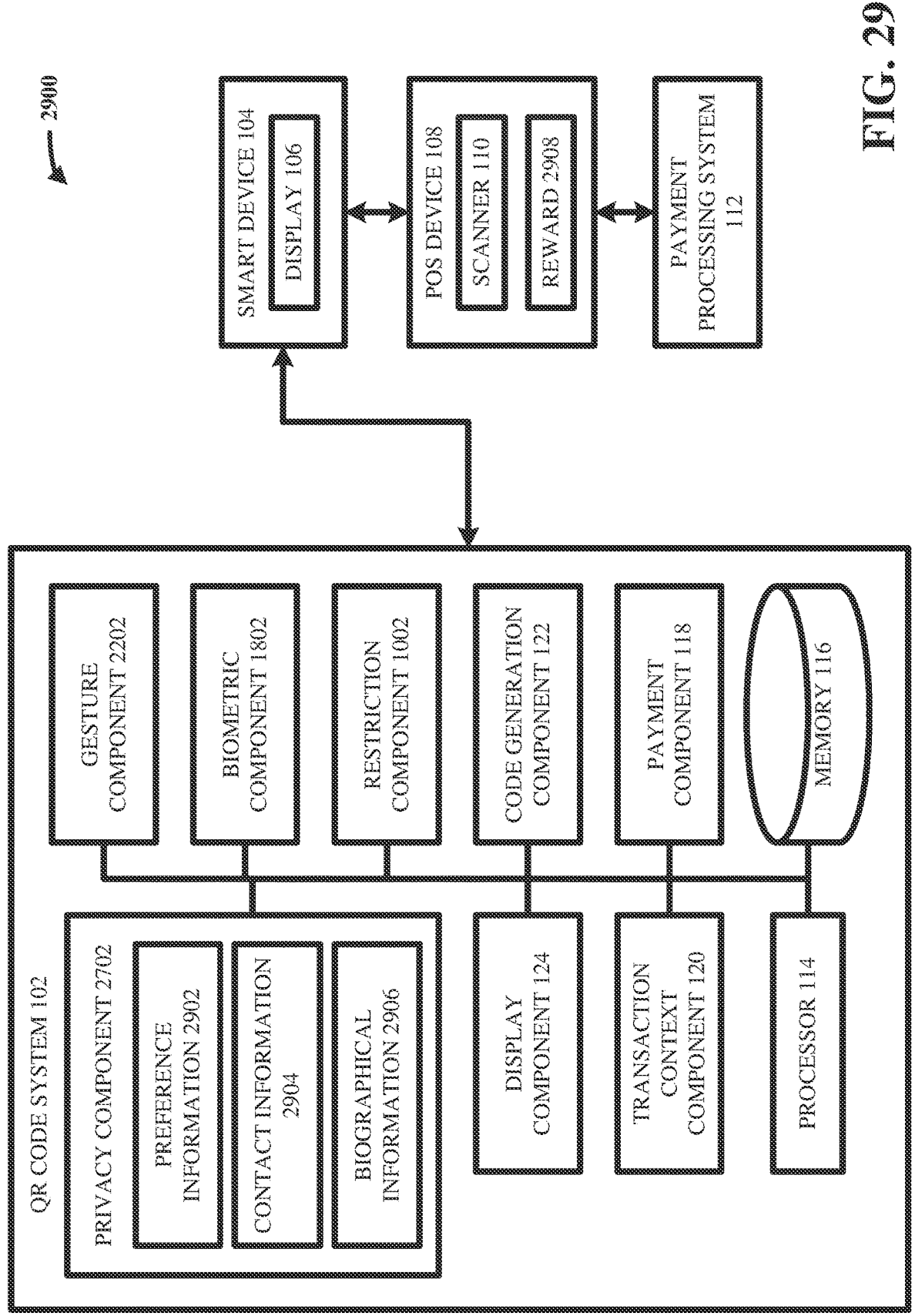
FIG. 29 illustrates a high-level block diagram of an example, non-limiting system including preference, contact, and biographical information that facilitates enhanced, privacy-based QR code generation in accordance with one or more embodiments described herein.

FIG. 29 illustrates a high-level block diagram of an example, non-limiting system 2900 including preference, contact, and biographical information that can facilitate enhanced, privacy-based QR code generation in accordance with one or more embodiments described herein. As shown, the system 2900 can, in some aspects, comprise the same components as the system 2700, and can further comprise preference information 2902, contact information 2904, and/or biographical information 2906.

In various embodiments, the preference information 2902 can be any suitable type of preference of the user of the smart device 104, and can be recited in any suitable way and/or at any suitable level of granularity. For example, the preference information 2902 can indicate and/or identify products and/or services that the user prefers to purchase and/or prefers to avoid, foods and/or ingredients that the user prefers to consume and/or prefers to avoid, movies and/or media that the user prefers to view and/or prefers to avoid, music that the user prefers to listen to and/or prefers to avoid, books/genres that the user prefers to read and/or prefers to avoid, computing devices that the user prefers to use and/or prefers to avoid, and/or any other suitable preferences.

In various embodiments, the contact information 2904 can be any suitable type of contact information of the user of the smart device 104, and can be recited in any suitable way and/or at any suitable level of granularity. For example, the contact information 2904 can indicate and/or identify phone numbers associated with the user (e.g., work phone, home phone, cell phone), email address associated with the user (e.g., personal email, work email), physical addresses associated with the user (e.g., residential address, work address), and/or any other suitable contact information.

In various embodiments, the biographical information 2906 can be any suitable type of biographical information of the user of the smart device 104, and can be recited in any suitable way and/or at any suitable level of granularity. For example, the biographical information 2906 can indicate and/or identify a birthdate of the user, demographics of the user (e.g., age, ethnicity, culture), medical history of the user (e.g., known allergies of the user, past medical procedures, current medical diagnoses, current medical prognoses, current and/or past medical treatment), purchasing/browsing history of the user (e.g., products recently purchased by the user, searches recently conducted online by the user), and/or any other suitable biographical information.

As mentioned above, the privacy component 2702 can obtain the preference information 2902, the contact information 2904, and/or the biographical information 2906 from any suitable database and/or data structure, either online and/or offline. In some cases, the privacy component 2702 can receive such information from the user as manual input.

In various aspects, the code generation component 122 can encode, encrypt, and/or embed (and/or otherwise correlate) the preference information 2902, the contact information 2904, and/or the biographical information 2906 into the QR code 702 (not shown in FIG. 29 for sake of space). In this way, the POS device 108 can learn the preference information 2902, the contact information 2904, and/or the biographical information 2906 upon scanning the QR code 702.

In various embodiments, the QR code system 102 can include privacy-based information (e.g., 2902, 2904, 2906) in the QR code 702 in exchange for a reward 2908 from the POS device 108. In various aspects, the reward 2908 can be any suitable electronic signal, message, and/or indication of a promotional offer and/or transactional discount for a current and/or future transaction (e.g., 10% off a current and/or future transaction, buy-one-get-one-free). In various cases, the POS device 108 can offer the reward 2908 to the QR code system 102, and the QR code system 102 can encode and/or encrypt into the QR code 702 a subset of the preference information 2902, a subset of the contact information 2904, and/or a subset of the biographical information 2906 based on a size, level, and/or extent of the reward 2908. In other words, the QR code system 102 can, in some embodiments, divulge and/or share an amount of the preference information 2902 that is commensurate with the reward 2908, can divulge and/or share an amount of the contact information 2904 that is commensurate with the reward 2908, and/or can divulge and/or share an amount of the biographical information 2906 that is commensurate with the reward 2908. In various instances, the user of the smart device 104 can establish (e.g., as input via any suitable interface device) settings and/or programming rules that dictate how much of the preference information 2902, how much of the contact information 2904, and/or how much of the biographical information 2906 to encode within the QR code 702 as a function of the reward 2908 (e.g., as a function of the size of a transactional discount and/or promotion offered by the POS device 108).

As an example, suppose that the POS device 108 does not offer the reward 2908 (e.g., 0% discount). In such case, the QR code system 102 can generate the QR code 702 and can refrain from including any of the preference information 2902, the contact information 2904, and/or the biographical information 2906 in the QR code 702. In other words, because the POS device 108 does not offer the reward 2908, the QR code system 102 has no incentive to divulge and/or share any privacy-based information with the POS device 108. Suppose, however, that the POS device 108 does offer the reward 2908, which can be a small discount and/or promotion (e.g., 5% discount). In such case, the QR code system 102 can generate the QR code 702 and can include in the QR code 702 a small amount of the preference information 2902, a small amount of the contact information 2904, and/or a small amount of the biographical information 2906. In other words, because the POS device 108 offers a small discount/promotion, the QR code system 102 has an incentive to divulge and/or share a commensurately small amount of privacy-based information with the POS device 108 in order to secure the reward 2908. Suppose, now, that the POS device 108 does offer the reward 2908, which can be a large discount and/or promotion (e.g., 20% discount). In such case, the QR code system 102 can generate the QR code 702 and can include in the QR code 702 a large amount of the preference information 2902, a large amount of the contact information 2904, and/or a large amount of the biographical information 2906. In other words, because the POS device 108 offers a large discount/promotion, the QR code system 102 has an incentive to divulge and/or share a commensurately large amount of privacy-based information with the POS device 108 in order to secure the reward 2908.

Although the above example uses a proportional and/or commensurate scheme to share privacy-based information, this is non-limiting and exemplary. In various cases, any suitable divulgation and/or sharing scheme can be implemented. In various instances, any suitable divulgation and/or sharing scheme can be specified and/or set by the user of the smart device 104. In some cases, rather than using explicitly programmed divulgation and/or sharing rules, an artificially intelligent avatar and/or computerized agent (not shown in FIG. 29) can be implemented on the smart device 104 to haggle and/or negotiate with the POS device 108 on behalf of the user of the smart device 104 (e.g., to haggle and/or negotiate a size of the reward 2908 in exchange for an amount of shared/divulged privacy-based data).

In various aspects, the reward 2908 can be communicated to the smart device 104 via the beacon 410 (not shown in FIG. 29 for sake of space).

Figure 30:
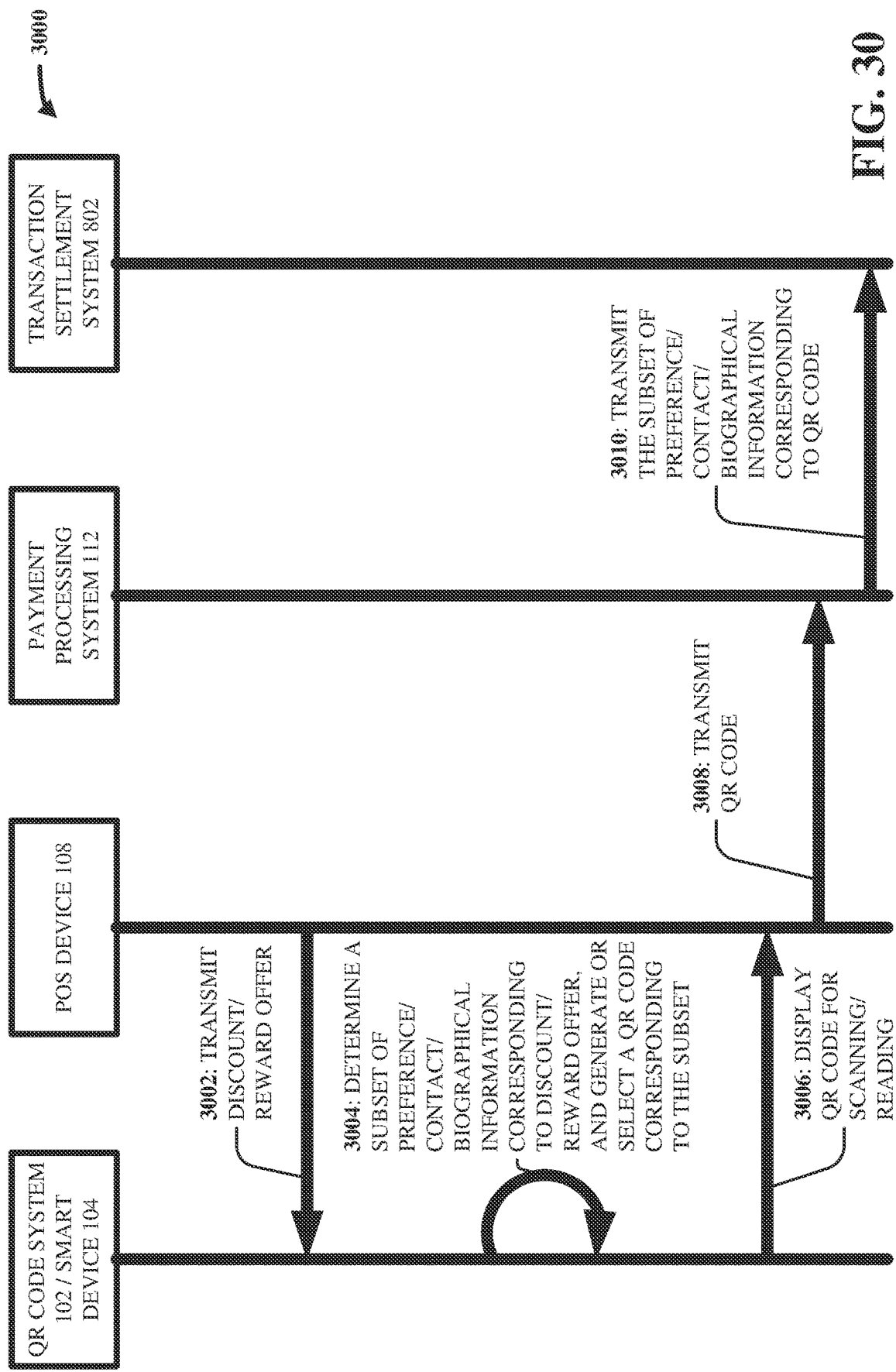
FIG. 30 illustrates a high-level communication diagram of an example, non-limiting workflow that facilitates enhanced, privacy-based QR code generation in accordance with one or more embodiments described herein.

FIG. 30 illustrates a high-level communication diagram of an example, non-limiting workflow 3000 that can facilitate enhanced, privacy-based QR code generation in accordance with one or more embodiments described herein.

In various embodiments, the POS device 108 can transmit to the QR code system 102 and/or the smart device 104 a discount/reward offer (e.g., 2908), at act 3002. In various aspects, this can be via a beacon (e.g., 410).

In various cases, the QR code system 102 and/or the smart device 104 can determine a subset of preference, contact, and/or biographical information corresponding to the discount/reward offer, and can generate and/or select a QR code (e.g., 702) that corresponds to the determined subset of information, at act 3004.

In various aspects, the QR code system 102 and/or the smart device 104 can display the QR code to the POS device 108 for scanning and/or reading, at act 3006.

In various cases, the POS device 108 can transmit to the payment processing system 112 the QR code, at act 3008. In various instances, the payment processing system 112 can transmit to the transaction settlement system 802 the subset of preference, contact, and/or biographical information that is encoded, encrypted, and/or embedded in (and/or otherwise correlated to) the QR code (e.g., can transmit the determined subset of privacy-based information that is represented by the QR code).

The above discussion explains how privacy-based information can be shared and/or divulged to the POS device 108 via QR codes in exchange for a reward/discount (e.g., 2908). However, in various cases, there can be other reasons for sharing and/or divulging such privacy-based information. For example, in some instances, sharing such privacy-based information with the POS device 108 (and/or with any other suitable barcode scanner) can allow the POS device 108 to provide to the smart device 104 (and thus to the user of the smart device 104) a filtered and/or customized catalogue and/or menu of products/services that are consistent with the shared privacy-based information. For instance, suppose that a customer enters a restaurant and displays to a barcode scanner of the restaurant a QR code which indicates that the customer is allergic to shellfish. In various aspects, a computing device of the restaurant can accordingly craft a customized electronic menu for the customer which highlights and/or emphasizes non-shellfish meal-options, which lists non-shellfish meal-options before shellfish meal-options, and/or which includes only non-shellfish meal-options (e.g., excludes all shellfish meal-options). As another example, suppose that the QR code indicates that the customer prefers organic ingredients. In various cases, a computing device of the restaurant can accordingly craft a customized electronic menu for the customer which highlights and/or emphasizes organic meal-options, which lists organic meal-options before non-organic meal-options, and/or which includes only organic meal-options (e.g., excludes non-organic meal options). As yet another example, suppose that the QR code indicates that the customer prefers to eat less than 1000 calories in a sitting. In various instances, a computing device of the restaurant can accordingly craft a customized electronic menu for the customer which highlights and/or emphasizes meals that include fewer than 1000 calories, which lists meals that include fewer than 1000 calories before meals that include more than 1000 calories, and/or which includes only meals that include fewer than 1000 calories (e.g., excludes meals exceeding 1000 calories). As shown, in various embodiments, the sharing and/or divulgation of privacy-based information to the POS device 108 can allow for the ad hoc and/or customized creation and/or filtration of menus and/or catalogs, based on the unique preferences and/or needs of the user of the smart device 104.

In various embodiments, the amount of preference information 2902, contact information 2904, and/or biographical information 2906 that is shared by the QR code system 102 (e.g., that is encrypted into a QR code) can be based upon a level of trust and/or a reputation of the merchant facilitating the current transaction. For instance, if the merchant is established and/or has a trustworthy reputation (e.g., few registered complaints are associated with the merchant, few published negative reviews are associated with the merchant, many published positive reviews are associated with the merchant, few criminal complaints and/or criminal records are associated with the merchant, the merchant has no known affiliations with criminal organizations), a larger proportion of the preference information 2902, the contact information 2904, and/or the biographical information 2906 can be shared. However, if the merchant instead is not well established and/or has a poor reputation (e.g., many published negative reviews are associated with the merchant, few published positive reviews are associated with the merchant, many criminal complaints and/or criminal records are associated with the merchant, the merchant has known affiliations with criminal organizations), a smaller proportion of the preference information 2902, the contact information 2904, and/or the biographical information 2906 can be shared. In various embodiments, the QR code system 102 can generate a trust score for a merchant that is facilitating a current transaction by analyzing available information about that merchant from the internet. In various instances, the trust score can be a number (e.g., between 0 and 1, inclusively) that represents a level of trustworthiness of the merchant. In various aspects, any suitable machine learning, computational, and/or mathematical technique can be used to generate such a trust score as a function of available online information pertaining to the merchant and/or as a function of prior transaction history with the merchant. That is, any suitable machine learning, computational, and/or mathematical technique (which can be treated as a black box function) can take as input published online reviews and/or articles regarding the merchant, can take as input available criminal records involving the merchant, and/or can take as input a number of prior transactions between the merchant and the user of the smart device 104, and can produce as output the trust score. In various aspects, the trust score can be based on any other suitable input information, such as location of the transaction (e.g., merchants/transactions located in high-crime areas can be considered as less trustworthy and/or more suspicious than merchants located in low-crime areas), time/date of the transaction (e.g., merchants transacting in the dead of night can be considered as less trustworthy and/or more suspicious than merchants transacting during daylight hours), products/services involved in the transaction (e.g., merchants providing certain classes/categories/types of products/services can be considered as less trustworthy and/or more suspicious than merchants providing other classes/categories/types of products/services), and/or monetary amounts involved in the transaction (e.g., transactions involving certain monetary amounts can be considered as less trustworthy and/or more suspicious than transactions involving other monetary amounts). In this way, any suitable machine learning model/algorithm (which can be considered as a black box function) can receive as input any suitable information pertaining to a merchant and/or to a transaction, and can generate as output a trust score for that merchant and/or transaction. If the trust score of a given merchant/transaction is higher (e.g., closer to 1), the QR code system 102 can encode more of the preference information 2902, more of the contact information 2904, and/or more of the biographical information 2906 into QR codes when transacting with the POS device 108 of that merchant. If, on the other hand, the trust score of a given merchant/transaction is lower (e.g., closer to 0), the QR code system 102 can encode less of the preference information 2902, less of the contact information 2904, and/or less of the biographical information 2906 into QR codes when transacting with the POS device 108 of that merchant.

Figure 31:
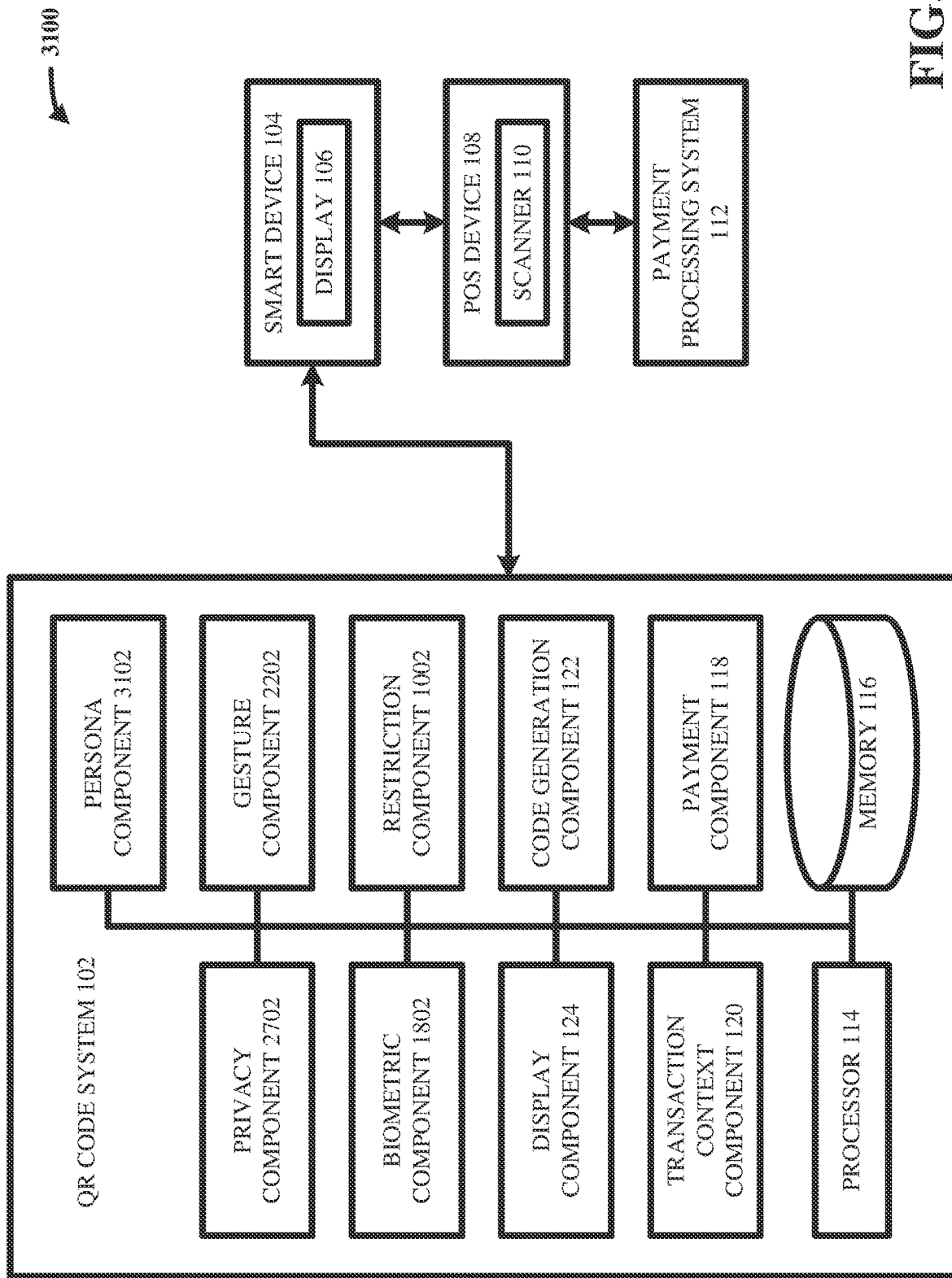
FIG. 31 illustrates a high-level block diagram of an example, non-limiting system that facilitates enhanced, persona-based QR code generation in accordance with one or more embodiments described herein.

FIG. 31 illustrates a high-level block diagram of an example, non-limiting system 3100 that can facilitate enhanced, persona-based QR code generation in accordance with one or more embodiments described herein. As shown, the system 3100 can, in various aspects, comprise the same components as the system 2900, and can further comprise a persona component 3102.

In various embodiments, the persona component 3102 can store and/or maintain a set of electronic personas. In various instances, an electronic persona can be any suitable electronic profile and/or account that respectively lists and/or corresponds to financial instrument information, restriction-based information, biometric-based information, gesture-based information, and/or privacy-based information. In other words, each electronic persona can, in various instances, be associated with its own unique and/or corresponding set of financial instrument information (e.g., different credit card numbers and/or different bank account numbers for different electronic personas), geo-fencing restrictions (e.g., different authorized and/or unauthorized geographic locations for different electronic personas), temporal restrictions (e.g., different authorized and/or unauthorized times/dates for different electronic personas), product/service restrictions (e.g., different authorized and/or unauthorized products and/or services for different electronic personas), value/price restrictions (e.g., different authorized and/or unauthorized overall and/or itemized prices for different electronic personas), merchant identity restrictions (e.g., different authorized and/or unauthorized merchants for different electronic personas), authorized biometric signatures (e.g., different stored fingerprint signatures, different facial images, and/or different vocal soundbites for different electronic personas), authorized gestures (e.g., different physical motions and/or different movement patterns as triggering criteria for different electronic personas), preference information (e.g., different preferences for different electronic personas), contact information (e.g., different available contact information for different electronic personas), and/or biographical information (e.g., different available biographical information for different electronic personas). In various embodiments, the QR code system 102 can select and/or identify an electronic persona to be active, and the QR code system 102 can accordingly generate and/or display QR codes based on the active electronic persona (e.g., can embed into a QR code the financial instrument information corresponding to the active electronic persona, can encode into the QR code the various restrictions corresponding to the active electronic persona, can encode into the QR code the various privacy-based information corresponding to the active electronic persona). In various cases, the QR code system 102 can automatically select and/or identify an electronic persona to be active based on a context of a current transaction (e.g., a first electronic persona can be selected for a transaction taking place at a first location and/or at a first time/date, involving a first product/service and/or a first price/value, and/or facilitated by a first merchant; a different electronic persona can be selected for a transaction taking place at a different location and/or at a different time/date, involving a different product/service and/or a different price/value, and/or facilitated by a different merchant). In some cases, the user of the smart device 104 can manually select (e.g., via any suitable form of input on any suitable interface device) a persona to be active.

In various embodiments, each electronic persona can correspond to a different user. For example, a family of users can share the smart device 104 (and thus the QR code system 102). In various cases, each member of the family can have a corresponding electronic persona which can list the corresponding financial instrument information of that family member, the corresponding restriction-based information of that family member, the corresponding biometric-based information of that family member, the corresponding gesture-based information of that family member, and/or the corresponding privacy-based information of that family member. Accordingly, the smart device 104 can, via the QR code system 102, generate and display QR codes that correspond to the family member currently using the smart device 104. In some cases, the smart device 104 can automatically detect the identity of the family member currently using the smart device 104 (e.g., via biometric sensors and/or passcode verification) and can select and/or identify the corresponding electronic persona. In various aspects, the purchasing/transaction histories of each of the electronic personas can be tracked. In cases where each electronic persona corresponds to a different entity/user, this can allow the different purchasing/transaction histories of the different entities/users to be independently recorded.

In some cases, multiple electronic personas can correspond to a single user of the smart device 104. In some cases, each persona can list different financial instrument information of the user (e.g., different credit card numbers of the user and/or different bank account numbers of the user), different restriction-based information of the user, different biometric-based information of the user, different gesture-based information of the user, and/or different privacy-based information of the user. There can be various purposes for a single user having multiple electronic personas. For example, a single user may want to use different financial instruments in different geographic locations, at different times/dates, with different products/services, for different monetary amounts, and/or with different merchants. As another example, a single user may want to embed different privacy information (e.g., preference information, contact information, biographical/demographic information) into QR codes in different transaction contexts (e.g., some merchants can be considered trustworthy, and thus more privacy information can be embedded into QR codes when dealing with such merchants; other merchants can be considered untrustworthy, and thus less privacy information can be embedded into QR codes when dealing with such merchants). In some cases, the QR code system 102 can identify an appropriate electronic persona to make active based on a context of a current transaction (e.g., the QR code system 102 can select an appropriate electronic persona for the current location, for the current time/date, for the current product/service being procured, for the current price/value being charged, and/or for the current merchant providing the product/service). In other cases, the personas can be regularly and/or periodically rotated and/or changed and/or cycled (e.g., to keep the single user's true identity hidden from merchants). In various instances, the personas can be randomly rotated and/or changed and/or cycled. In various embodiments, any other suitable persona rotation/changing scheme can be implemented. In various embodiments where multiple electronic personas correspond to a single entity/user, the QR code system 102 can designate that such multiple electronic personas correspond to the single entity/user. Accordingly, the QR code system 102 can mark and/or track all purchases/transactions that use any of the multiple electronic personas as purchases/transactions performed by the single entity/user. In this way, purchasing/transaction histories can be recorded and/or tracked across electronic personas (e.g., even if the single entity/user uses different personas for different transactions, it can be determined that all the different transactions correspond to the single entity/user).

Figure 32:
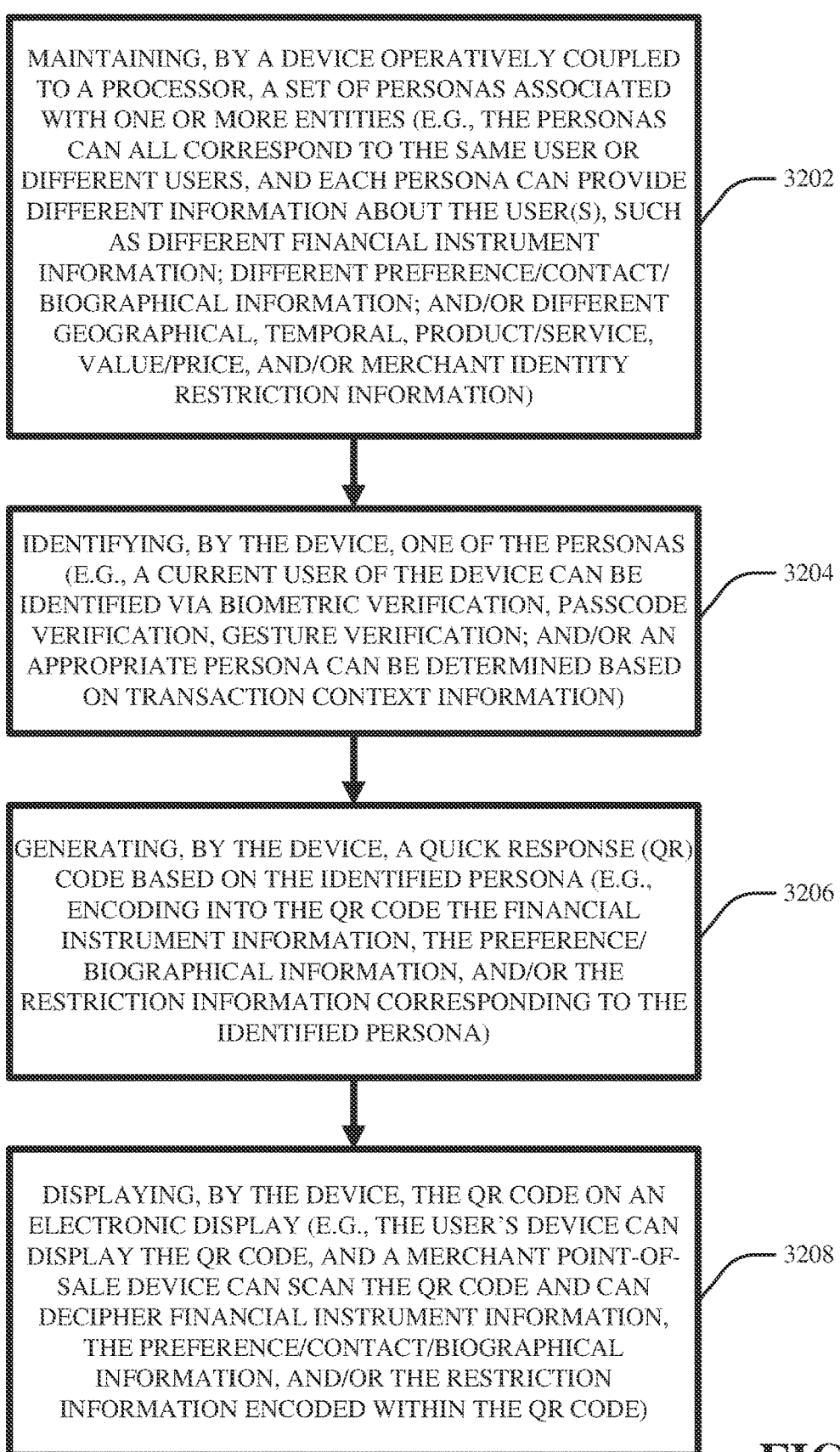
FIG. 32 illustrates a high-level flow diagram of an example, non-limiting computer-implemented method that facilitates enhanced, persona-based QR code generation in accordance with one or more embodiments described herein.

FIG. 32 illustrates a high-level flow diagram of an example, non-limiting computer-implemented method 3200 that can facilitate enhanced, persona-based QR code generation in accordance with one or more embodiments described herein. In various cases, the computer-implemented method 3200 can be implemented by the system 3100.

In various embodiments, act 3202 can include maintaining, by a device operatively coupled to a processor (e.g., 3102), a set of personas associated with one or more entities. For example, the personas can all correspond to the same user and/or to different users, as explained above. Moreover, in various cases, each persona can provide different information about the user(s), such as different financial instrument information; different preference/biographical/contact information; and/or different geographical, temporal, product/service, value/price, and/or merchant identity restriction information.

In various instances, act 3204 can include identifying, by the device (e.g., 3102), one of the personas. For example, a current user of the device can be identified via biometric verification, password/passcode verification, and/or gesture verification, and an appropriate and/or corresponding person can be identified/activated. As another example, an appropriate persona can be determined based on transaction context information (e.g., different personas for different locations, different times/dates, different products/services, different values/prices, and/or different merchant identifies).

In various aspects, act 3206 can include generating, by the device (e.g., 120), a quick response (QR) code based on the identifies persona. For example, this can include encoding and/or encrypting and/or embedding into the QR code the financial instrument information corresponding to the identified persona, the restriction-based information corresponding to the identified persona, and/or the preference, contact, and/or biographical information corresponding to the identified persona.

In various cases, act 3208 can include displaying, by the device (e.g., 104 and/or 122), the QR code on an electronic display (e.g., 106). For instance, the user's device can display the QR code, and a merchant point-of-sale device (e.g., 108) can scan the QR code and can decipher the financial instrument information, the restriction-based information, and/or preference/contact/biographical information encoded within the QR code.

Figure 33:
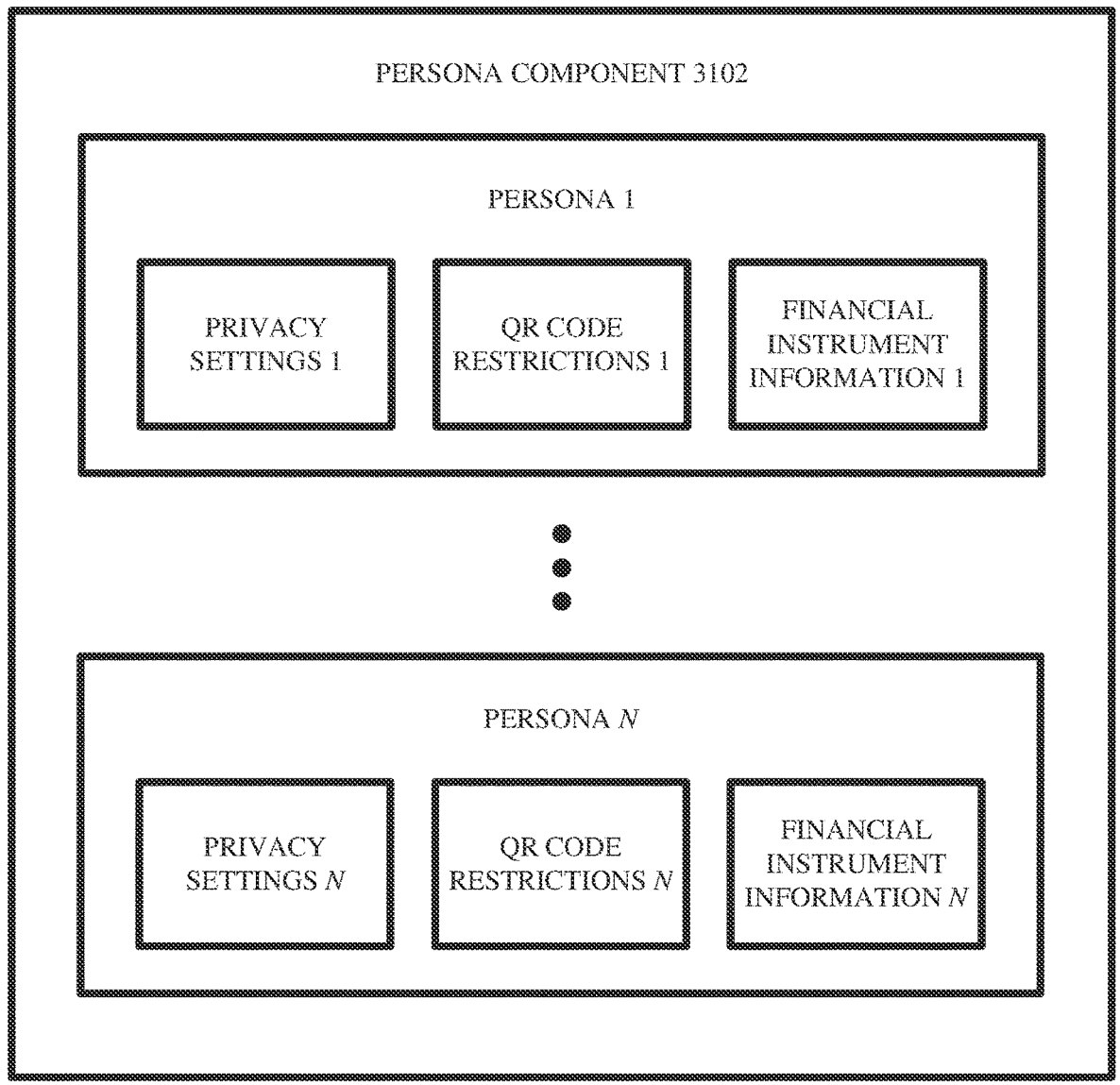
FIG. 33 illustrates a high-level block diagram of an example, non-limiting system including multiple personas that facilitates enhanced, persona-based QR code generation in accordance with one or more embodiments described herein.

FIG. 33 illustrates a high-level block diagram of an example, non-limiting system 3300 including multiple personas that can facilitate enhanced, persona-based QR code generation in accordance with one or more embodiments described herein.

As shown, the persona component 3102 can, in various cases, comprise a set of N personas, for any suitable integer N. In various aspects, each persona (e.g., 1 to N) can have its own corresponding privacy settings (e.g., own preferences, own contact information, own biographical information, own rules for determining how much privacy information to share/divulge as a function of an offered reward/discount), can have its own corresponding QR code restrictions (e.g., own geo-fencing restrictions, own temporal restrictions, own product/service restrictions, own value/price restrictions, own merchant identity restrictions), and/or can have its own corresponding financial instrument information (e.g., own credit card numbers, own bank account numbers). As mentioned above, each of the N personas can, in various aspects, correspond to a different user of the smart device 104 (e.g., such as where multiple users share the smart device 104). In various other aspects, each of the N personas can correspond to the same user (e.g., in such case, the same user can desire to have different privacy levels and/or different payment information and/or different payment restrictions depending upon transactional circumstances). In various other cases, any suitable combination of the aforementioned is possible (e.g., some of the N personas can correspond to a same user while others of the N personas can correspond to different users).

Figure 34:
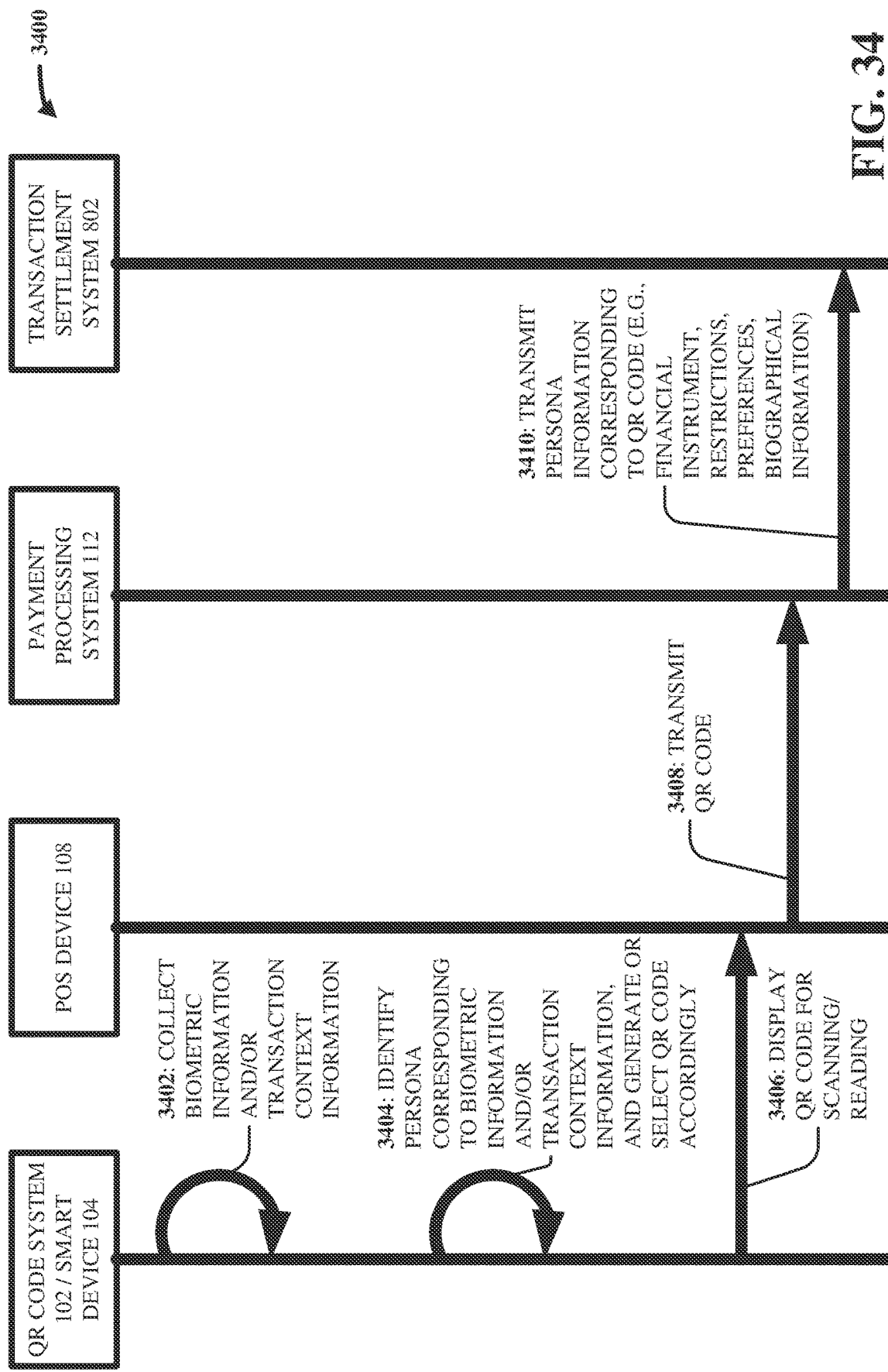
FIG. 34 illustrates a high-level communication diagram of an example, non-limiting workflow that facilitates enhanced, persona-based QR code generation in accordance with one or more embodiments described herein.

FIG. 34 illustrates a high-level communication diagram of an example, non-limiting workflow 3400 that can facilitate enhanced, persona-based QR code generation in accordance with one or more embodiments described herein.

In various embodiments, the QR code system 102 and/or the smart device 104 can collect biometric information (e.g., fingerprints of the current user, facial images of the current user, voice recordings of the current user) and/or transaction context information (e.g., geographic location of the current transaction, time/date of the current transaction, product/service involved the current transaction, price/value involved in the current transaction, identity of merchant facilitating the transaction), at act 3402.

In various cases, the QR code system 102 and/or the smart device 104 can identify a persona corresponding to the biometric information and/or corresponding to the transaction context information, and can generate and/or select a QR code (e.g., 702) accordingly based on the identified persona, at act 3404.

In various aspects, the QR code system 102 and/or the smart device 104 can display to the POS device 108 the QR code for scanning and/or reading, at act 3406.

In various instances, the POS device 108 can transmit to the payment processing system 112 the QR code at act 3408. In various cases, the payment processing system 112 can transmit to the transaction settlement system 802 the persona information encoded in and/or corresponding the QR code (e.g., financial instrument information, restriction information, preferences, biographical information, contact information), at act 3410.

Figure 35:
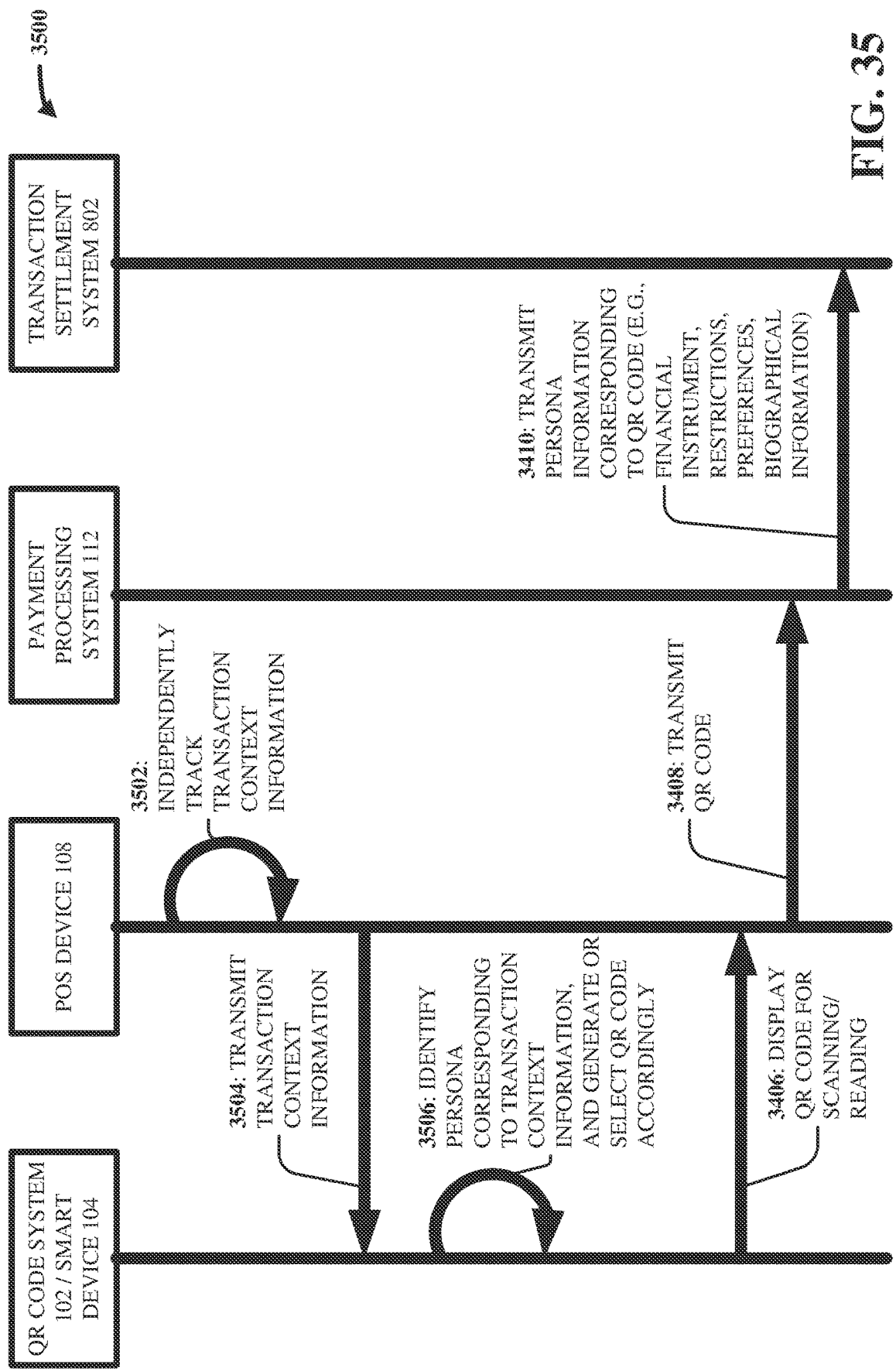
FIG. 35 illustrates a high-level communication diagram of an example, non-limiting workflow that facilitates enhanced, persona-based QR code generation in accordance with one or more embodiments described herein.

FIG. 35 illustrates a high-level communication diagram of an example, non-limiting workflow 3500 that can facilitate enhanced, persona-based QR code generation in accordance with one or more embodiments described herein.

As shown, in various aspects, the POS device 108 can independently track transaction context information (e.g., the location of the transaction, the time/date of the transaction, the products/services involved in the transaction, the values/prices involved in the transaction, and/or the identity of the merchant facilitating the transaction), at act 3502.

In various cases, the POS device 108 can transmit the transaction context information to the QR code system 102 and/or the smart device 104 (e.g., such as by the beacon 410), at act 3504.

In various instances, the QR code system 102 and/or the smart device 104 can identify a persona corresponding to the transaction context information, and can generate and/or select a QR code (e.g., 702) accordingly based on the transaction context information, at act 3506.

In various cases, as shown, acts 3406-3410 can be as described above.

Figure 36:
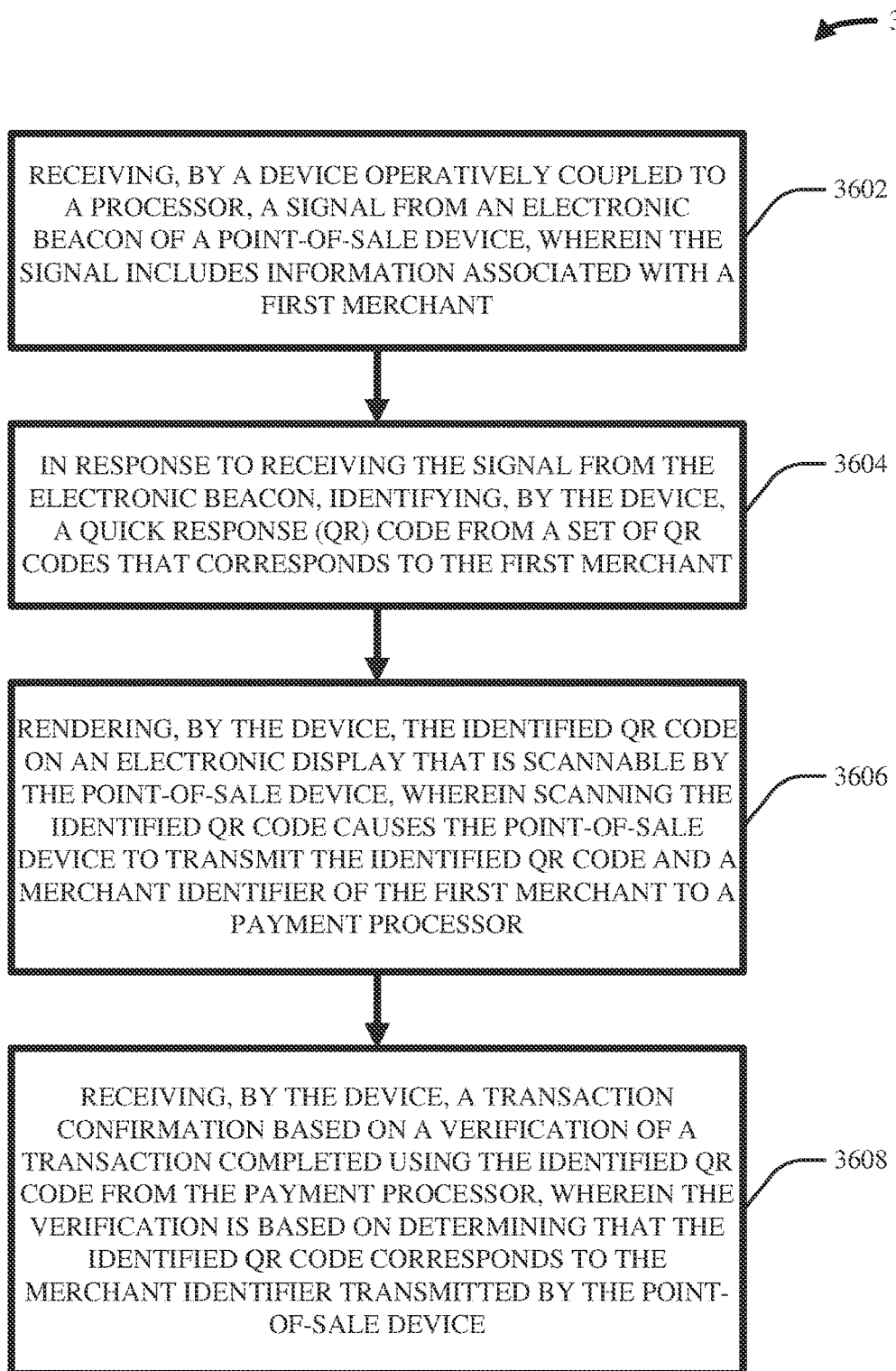
FIG. 36 illustrates a high-level flow diagram of an example, non-limiting computer-implemented method that facilitates enhanced QR code generation in accordance with one or more embodiments described herein.

FIG. 36 illustrates a high-level flow diagram of an example, non-limiting computer-implemented method that can facilitate enhanced QR code generation in accordance with one or more embodiments described herein.

In various embodiments, act 3602 can include receiving, by a device operatively coupled to a processor (e.g., 102), a signal from an electronic beacon (e.g., 410) of a point-of-sale device (e.g., 108). In various cases, the signal can include information associated with a first merchant (e.g., 602).

In various aspects, act 3604 can include identifying, by the device and in response to receiving the signal from the electronic beacon, a quick response (QR) code (e.g., 702) from a set of QR codes (e.g., a vault and/or data structure storing already-generated QR codes) that corresponds to the first merchant (e.g., an identifier of the first merchant can be embedded and/or encoded into the identified QR code, and/or the identifier QR code can be otherwise mapped and/or correlated to the first merchant).

In various instances, act 3606 can include rendering, by the device (e.g., 124 and/or 104) the identified QR code on an electronic display (e.g., 106) that is scannable by the point-of-sale device. In various cases, scanning the identified QR code can cause the point-of-sale device to transmit the identified QR code and a merchant identifier (e.g., which can be known/trusted information) of the first merchant to a payment processor (e.g., 112).

In various aspects, act 3608 can include receiving, by the device, a transaction confirmation based on a verification of a transaction completed using the identified QR code from the payment processor. In various aspects, the verification can be based on determining that the identified QR code corresponds to the merchant identifier transmitted by the point-of-sale device.

As shown in FIG. 36, a QR code can correspond to and/or be correlated/mapped with a particular merchant and/or merchant identifier. Thus, in various cases, a QR code can be deemed valid and/or usable with a particular merchant and can be deemed invalid and/or unusable with other merchants (e.g., the QR code can be bound to the particular merchant). However, this is non-limiting and exemplary. In various aspects, QR codes can correspond to and/or be correlated/mapped with any other suitable information (e.g., geo-location stamps, time stamps, product or service identifiers, price identifiers, restriction-based information).

In various embodiments, the identified QR code can be correlated to a first geographic range. In various cases, the point-of-sale device can further transmit an identifier for the first geographic range to the payment processor. In various instances, the verification by the payment processor can be further based on determining that the identified QR code corresponds to the first geographic range. Thus, in various aspects, a QR code can correspond to and/or be correlated/mapped with a particular geo-location and/or set of geo-locations, such that the QR code is deemed valid and/or usable at the particular geo-location and/or set of geo-locations and is deemed invalid and/or unusable at different geo-locations and/or sets of geo-locations. In other words, the QR code can be bound to the particular geo-location and/or set of geo-locations.

In various embodiments, the identified QR code can be correlated to a first temporal window. In various cases, the point-of-sale device can further transmit an identifier for the first temporal window to the payment processor. In various instances, the verification by the payment processor can be further based on determining that the identified QR code corresponds to the first temporal window. Thus, in various aspects, a QR code can correspond to and/or be correlated/mapped with a particular time/date and/or set of times/dates, such that the QR code is deemed valid and/or usable at the particular time/date and/or set of times/dates and is deemed invalid and/or unusable at different times/dates and/or sets of times/dates. In other words, the QR code can be bound to the particular time/date and/or set of times/dates.

In various embodiments, the identified QR code can be correlated to a first product or service. In various cases, the point-of-sale device can further transmit an identifier for the first product or service to the payment processor. In various instances, the verification by the payment processor can be further based on determining that the identified QR code corresponds to the first product or service. Thus, in various aspects, a QR code can correspond to and/or be correlated/mapped with a particular product/service and/or set of products/services, such that the QR code is deemed valid and/or usable for the particular product/service and/or set of products/services and is deemed invalid and/or unusable for different products/services and/or sets of products/services. In other words, the QR code can be bound to the particular product/service and/or set of products/services.

In various embodiments, the identified QR code can be correlated to a first transaction amount. In various cases, the point-of-sale device can further transmit an identifier for the first transaction amount to the payment processor. In various instances, the verification by the payment processor can be further based on determining that the identified QR code corresponds to the first transaction amount. Thus, in various aspects, a QR code can correspond to and/or be correlated/mapped with a particular transaction amount and/or set of transaction amounts, such that the QR code is deemed valid and/or usable for the particular transaction amount and/or set of transaction amounts and is deemed invalid and/or unusable for different transaction amounts and/or sets of transaction amounts. In other words, the QR code can be bound to the particular transaction amounts and/or set of transaction amounts.

In various embodiments, the computer-implemented method 3600 can further include: detecting, by the device (e.g., 2202), a first motion (e.g., a detected gesture performed with the smart device 104) via an accelerometer (e.g., 2404) coupled to the device. In various cases, the computer-implemented method 3600 can further include determining, by the device, that the first motion corresponds to a first transaction amount. In various aspects, the computer-implemented method 3600 can further include correlating, by the device (e.g., 122), the identified QR code to the first transaction amount. In other words, various embodiments of the subject innovation can involve implementing gestures/motions performed with the smart device 104 as triggering criteria to generate, select, and/or display QR codes. In various cases, different gestures/motions can correspond to different transaction amounts and/or transaction amount restrictions. Thus, when a particular gesture/motion that is correlated with a particular transaction amount is performed, embodiments of the subject innovation can generate and display (and/or can select from a QR code vault and display) a QR code that corresponds to the particular transaction amount. For example, suppose that a figure-eight motion performed with the smart device 104 corresponds to a transaction spending cap of $100. If the figure-eight motion is performed with the smart device 104, the smart device 104 can generate (and/or can select from a QR code vault) a QR code that likewise corresponds to the $100 transaction spending cap. Such a QR code can be deemed valid and/or usable for transaction amounts up to $100, and can be deemed invalid and/or unusable for transaction amounts exceeding $100. In other words, different QR codes can be bound to different transaction amounts/prices/values, and such different QR codes can be selected by the user of the smart device 104 by performing appropriate physical gestures/motions with the smart device 104.

In various embodiments, the computer-implemented method 3600 can further include: detecting, by the device (e.g., 2202), a first motion (e.g., a detected gesture performed with the smart device 104) via an accelerometer (e.g., 2404) coupled to the device. In various cases, the computer-implemented method 3600 can further include determining, by the device, that the first motion corresponds to a first product or service. In various aspects, the computer-implemented method 3600 can further include correlating, by the device (e.g., 122), the identified QR code to the first product or service. In other words, various embodiments of the subject innovation can involve implementing gestures/motions performed with the smart device 104 as triggering criteria to generate, select, and/or display QR codes. In various cases, different gestures/motions can correspond to different products/services and/or to different product/service restrictions. Thus, when a particular gesture/motion that is correlated with a particular product/service is performed, embodiments of the subject innovation can generate and display (and/or can select from a QR code vault and display) a QR code that corresponds to the particular product/service. For example, suppose that a clockwise circular motion performed with the smart device 104 corresponds to fruits. If the clockwise circular motion is performed with the smart device 104, the smart device 104 can generate (and/or can select from a QR code vault) a QR code that likewise corresponds to fruits. Such a QR code can be deemed valid and/or usable for purchasing fruits, and can be deemed invalid and/or unusable for purchasing products/services other than fruits. In other words, different QR codes can be bound to different products/services, and such different QR codes can be selected by the user of the smart device 104 by performing appropriate physical gestures/motions with the smart device 104.

In various embodiments, the computer-implemented method 3600 can further include: detecting, by the device (e.g., 2202), a first motion (e.g., a detected gesture performed with the smart device 104) via an accelerometer (e.g., 2404) coupled to the device. In various cases, the computer-implemented method 3600 can further include determining, by the device, that the first motion corresponds to a first financial instrument. In various aspects, the computer-implemented method 3600 can further include correlating, by the device (e.g., 122), the identified QR code to the first financial instrument. In other words, various embodiments of the subject innovation can involve implementing gestures/motions performed with the smart device 104 as triggering criteria to generate, select, and/or display QR codes. In various cases, different gestures/motions can correspond to different financial instruments. Thus, when a particular gesture/motion that is correlated with a particular financial instrument is performed, embodiments of the subject innovation can generate and display (and/or can select from a QR code vault and display) a QR code that corresponds to the particular financial instrument. For example, suppose that a counter-clockwise circular motion performed with the smart device 104 corresponds to a credit card xyz. If the counter-clockwise circular motion is performed with the smart device 104, the smart device 104 can generate (and/or can select from a QR code vault) a QR code that likewise corresponds to the credit card xyz. Such a QR code can include and/or represent the payment information associated with the credit card xyz, and can exclude and/or not represent payment information associated with a different credit card. In other words, different QR codes can be bound to different financial instruments, and such different QR codes can be selected by the user of the smart device 104 by performing appropriate physical gestures/motions with the smart device 104.

Figure 37:
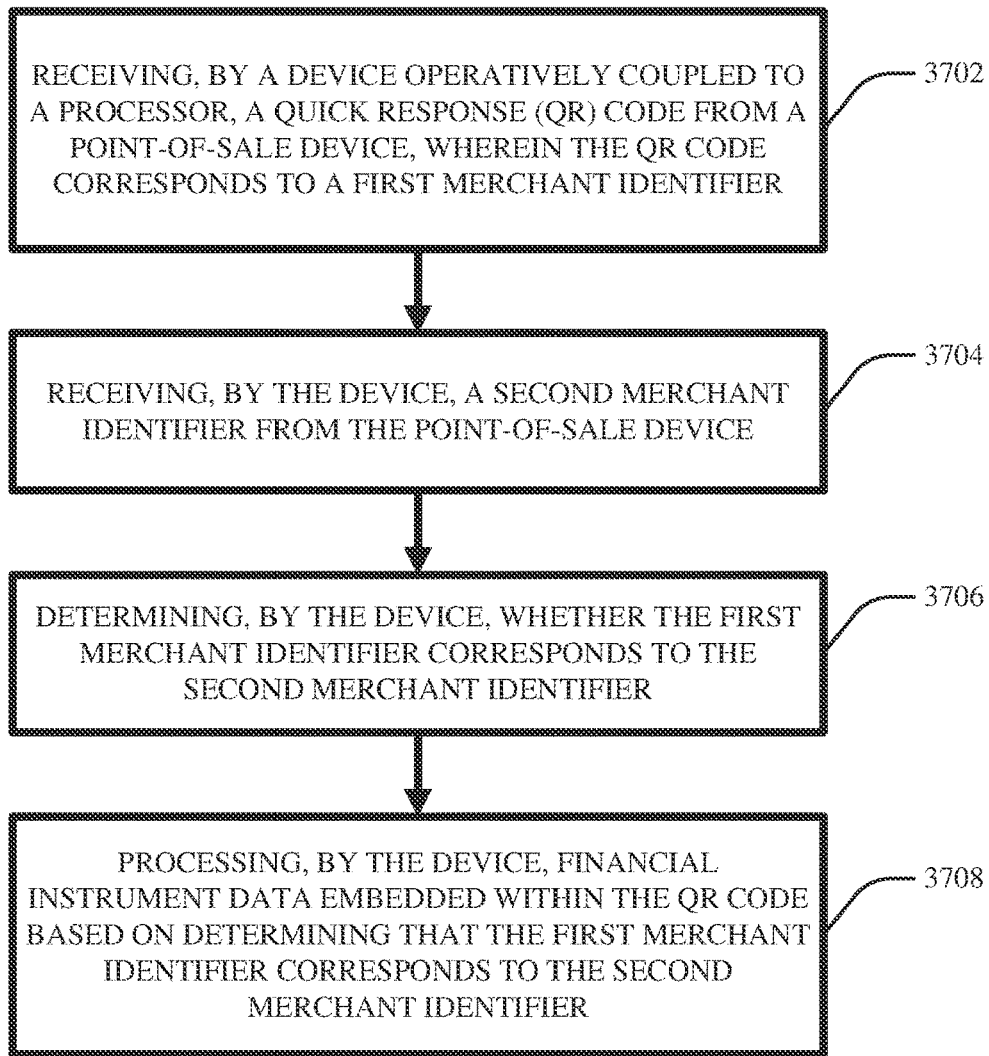
FIG. 37 illustrates a high-level flow diagram of an example, non-limiting computer-implemented method that facilitates enhanced QR code processing in accordance with one or more embodiments described herein.

FIG. 37 illustrates a high-level flow diagram of an example, non-limiting computer-implemented method that can facilitate enhanced QR code processing in accordance with one or more embodiments described herein.

In various embodiments, act 3702 can include receiving, by a device operatively coupled to a processor (e.g., 112), a quick response (QR) code (e.g., 702) from a point-of-sale device (e.g., 108). In some cases, the QR code can correspond to a first merchant identifier (e.g., 602).

In various instances, act 3704 can include receiving, by the device (e.g., 112), a second merchant identifier (e.g., known/trusted information) from the point-of-sale device.

In various aspects, act 3706 can include determining, by the device (e.g., 112), whether the first merchant identifier matches and/or corresponds to the second merchant identifier.

In various instances, act 3708 can include processing, by the device (e.g., 112), financial instrument data (e.g., 302) embedded within the QR code based on determining that the first merchant identifier matches and/or corresponds to the second merchant identifier.

Although FIG. 37 shows that merchant identifiers can be embedded within and/or correlated to a QR code for transaction verification, this is non-limiting and exemplary. In various aspects, any other suitable information can be embedded within and/or correlated with the QR code (e.g., geo-location stamps, time stamps, product or service identifiers, price identifiers, restriction-based information).

In various embodiments, the QR code can further correspond to and/or be correlated with accelerometer data (e.g., produced by the accelerometer 2404). In various cases, the accelerometer data can indicate a first time at which a detected motion occurs, where the detected motion corresponds to a presentation of an electronic display rendering the QR code to the point-of-sale device (e.g., the accelerometer 2404 and the clock 408 can collectively detect a time at which a movement pattern occurs, where the movement pattern is consistent with a user of the smart device 104 presenting the display 106 of the smart device 104 to the scanner 110 of the POS device 108). In some instances, the computer-implemented method 3700 can further include receiving, by the device, a time stamp from the point-of-sale device. In various cases, the time stamp can correspond to a second time at which the point-of-sale device scans the QR code. In various aspects, the computer-implemented method 3700 can further include determining, by the device, whether the accelerometer data corresponds to and/or is consistent with the time stamp. In various instances, the computer-implemented method 3700 can further include processing, by the device, the financial instrument data embedded within the QR code based on determining that the accelerometer data corresponds to the time stamp.

In various embodiments, the QR code can further correspond to and/or be correlated with global positioning data (e.g., produced by the GPS 406). In various cases, the global positioning data can indicate a first geo-location at which a detected motion occurs, where the detected motion corresponds to a presentation of an electronic display rendering the QR code to the point-of-sale device (e.g., the accelerometer 2404 and the GPS 406 can collectively detect a geo-location at which a movement pattern occurs, where the movement pattern is consistent with a user of the smart device 104 presenting the display 106 of the smart device 104 to the scanner 110 of the POS device 108). In some instances, the computer-implemented method 3700 can further include receiving, by the device, a geo-location stamp from the point-of-sale device. In various cases, the geo-location stamp can correspond to a second geo-location at which the point-of-sale device scans the QR code. In various aspects, the computer-implemented method 3700 can further include determining, by the device, whether the global positioning data corresponds to and/or is consistent with the geo-location stamp. In various instances, the computer-implemented method 3700 can further include processing, by the device, the financial instrument data embedded within the QR code based on determining that the global positioning data corresponds to the geo-location stamp.

In various embodiments, the QR code can further correspond to and/or be correlated with a first product or service identifier (e.g., 502). In some instances, the computer-implemented method 3700 can further include receiving, by the device, a second product or service identifier from the point-of-sale device. In various aspects, the computer-implemented method 3700 can further include determining, by the device, whether the first product or service identifier corresponds to and/or is consistent with the second product or service identifier. In various instances, the computer-implemented method 3700 can further include processing, by the device, the financial instrument data embedded within the QR code based on determining that the first product or service identifier corresponds to and/or is consistent with the second product or service identifier.

Figure 38:
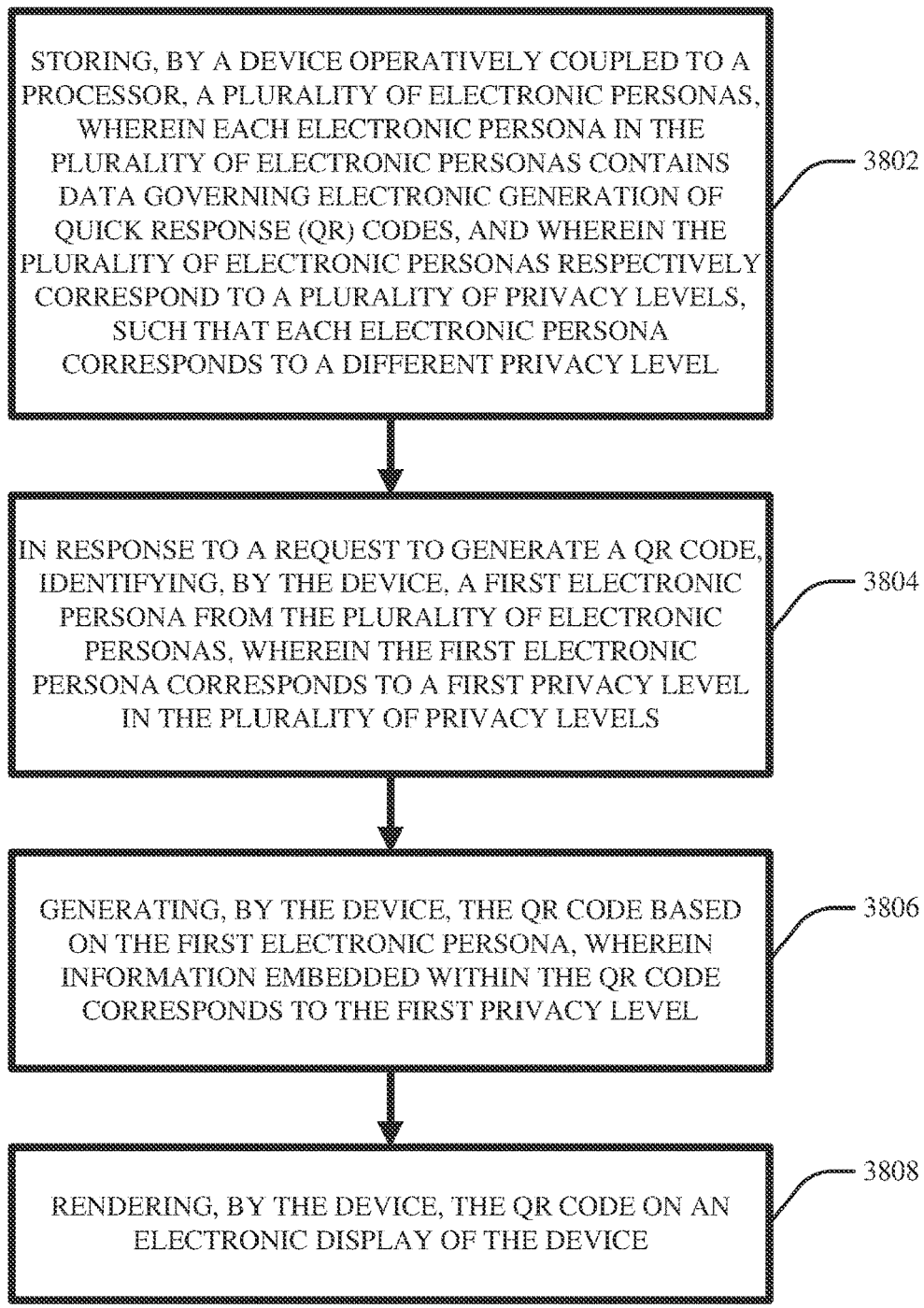
FIG. 38 illustrates a high-level flow diagram of an example, non-limiting computer-implemented method that facilitates enhanced, persona-based QR code in accordance with one or more embodiments described herein.

FIG. 38 illustrates a high-level flow diagram of an example, non-limiting computer-implemented method that can facilitate enhanced, persona-based QR code in accordance with one or more embodiments described herein.

In various embodiments, act 3802 can include storing, by a device operatively coupled to a processor (e.g., 3100), a plurality of electronic personas (e.g., 1 to N). In various aspects, each electronic persona in the plurality of electronic personas can contain data governing electronic generation of quick response (QR) codes. In various cases, the plurality of electronic personas can respectively correspond to a plurality of privacy levels, such that each electronic persona corresponds to a different privacy level.

In various instances, act 3804 can include, in response to a request to generate a QR code, identifying, by the device (e.g., 3100), a first electronic persona from the plurality of electronic personas. In various cases, the first electronic persona can correspond to a first privacy level in the plurality of privacy levels.

In various aspects, act 3806 can include generating, by the device (e.g., 122), the QR code based on the first electronic persona. In various cases, information embedded within the QR code can correspond to the first privacy level.

In various instances, act 3808 can include rendering, by the device (e.g., 124 and/or 104), the QR code on an electronic display (e.g., 106) of the device.

In various embodiments, the identifying the first electronic persona of act 3804 can be based on detecting a selection of the first electronic persona by a user of the device via a user interface on the device, wherein the user interface provides one or more user interface elements corresponding to one or more of the plurality of electronic personas. In various cases, any suitable user interface device (e.g., keyboard, keypad, joysticks, mouse, remote controller, touchscreen, voice control) can be implemented to allow a user of the device to provide manual input and/or selections (e.g., to select a desired electronic persona from a list of available electronic personas).

In various embodiments, the identifying the first electronic persona can be based on detecting information associated with a transaction (e.g., context-based information detected by 120). In some cases, the information associated with the transaction can be a geo-location of the transaction (e.g., 402), a time of the transaction (e.g., 404), a product or service involved in the transaction (e.g., 502), a monetary amount of the transaction (e.g., 504), and/or an identity of a merchant involved in the transaction (e.g., 602). In other words, various embodiments of the subject innovation can automatically select an applicable and/or suitable electronic persona based on the context of a current transaction (e.g., different personas can be bound to different transaction contexts). As described above, such information regarding the transaction can be detected by an electronic beacon at a point-of-sale device or via any other suitable technique.

In various embodiments, the identifying the first electronic persona can be based on biometric identification of a user of the device (e.g., via 1802). That is, in various cases, different electronic personas can be associated with different users. So, biometric verification can be used to identify the current user, and an appropriate/suitable electronic persona corresponding to the biometrically identified user can be selected.

In various embodiments, the identifying the first electronic persona can be based on detecting a physical gesture of a user operating the device (e.g., via 2202). That is, in various cases, different electronic personas can be triggered and/or selected by performing different physical gestures/motions/manipulations with the device (e.g., 104). For instance, an X-shaped motion can trigger and/or select a first electronic persona, a figure-eight-shaped motion can trigger and/or select a second electronic persona, an up-and-down motion can trigger and/or select a third electronic persona, a side-to-side motion can trigger and/or select a fourth electronic persona, and so on.

In various embodiments, the first electronic persona can correspond to one or more first transaction restrictions (e.g., 1202, 1204, 1302, 1304, 1402). In various cases, the one or more first transaction restrictions can be different from one or more second transaction restrictions corresponding to a second electronic persona in the plurality of electronic personas. That is, in various instances, different electronic personas can be associated with different restriction-based information (e.g., a certain persona can be utilized only in certain geo-locations, only at certain times, only with certain products/services, only for certain monetary amounts, and/or only with certain merchants).

In various embodiments, the first electronic persona can correspond to first preference data (e.g., 2902), contact data (e.g., 2904), or demographic data (e.g., 2906) that corresponds to the first privacy level. In various cases, the first preference data, contact data, or demographic data can be embedded within the QR code. In various cases, the first preference data, contact data, or demographic data can be different from second preference data, contact data, or demographic data that corresponds to a second privacy level of a second electronic persona in the plurality of electronic personas. That is, in various instances, different personas can contain different amounts of personal information of a user, so that the user can have different secrecy and/or privacy levels when engaging in different transactions. For example, when engaging in a certain transaction, an electronic persona having a high privacy level can be used (e.g., when the merchant is not trustworthy), such that little and/or no preference information of the user, contact information of the user, and/or demographic information of the user is embedded within the QR code. Thus, when this electronic persona having a high privacy level is used, little and/or no personal information of the user can be shared with the point-of-sale device with which the user is transacting. On the other hand, a different electronic persona having a low privacy level can be used (e.g., when the merchant is trustworthy), such that much and/or all preference information of the user, contact information of the user, and/or demographic information of the user can be shared with the point-of-sale device with which the user is transacting. Thus, in various embodiments, the user can establish different electronic personas having different privacy levels and/or privacy settings for different contexts and/or transactions.

In various instances, embodiments of the subject innovation can include automatically updating electronic personas based on user activity. For instance, in various aspects, a machine learning model (e.g., a trainable function as described herein) can receive as input any suitable information related to a user (e.g., transaction/purchase history of the user, online shopping carts associated with the user, online wish lists associated with the user, online product/service reviews written by the user, online social media accounts associated with the user, any other information associated with the user's behavior, and/or so on) and can update/change, as output, settings of one or more electronic personas associated with the user (e.g., can increase/decrease an amount of privacy-based information that is available to be shared by one or more electronic personas, can change the content of the privacy-based information that is associated with one or more electronic personas, can change the content of transaction restrictions that are associated with one or more electronic personas, can change the content of biometric and/or gesture-based triggering criteria that are associated with one or more electronic personas, and/or so on). In various embodiments, a set of default electronic personas can be created (e.g., a first default electronic persona that is created for members of a first group, a second default electronic persona that is created for members of a second group, and/or so on). In various aspects, the default personas can be updated and/or customized based on specific user usage/behavior, as described above (e.g., a user can receive a default electronic persona to begin with, and the electronic persona can be automatically tailored to the user based on the user's activity and/or behavior over time). In various instances, users can manually update/customize their associated electronic personas via manual input.

In various embodiments, automatic updates to the electronic personas of a given user can be made and/or recommended based on updates and/or customizations performed by other/different users. For example, in various aspects, one or more users that are similar to a given user can be identified via any suitable technique (e.g., via a similarity algorithm, such as collaborative filtering, that can compare profile/persona characteristics, preferences, demographics, transaction histories, QR code restrictions, and/or so on in order to determine whether the one or more users are similar to the given user). In various instances, when the one or more users make updates, changes, and/or customizations to their electronic personas, various embodiments of the subject innovation can recommend and/or suggest such updates, changes, and/or customizations to the given user. For instance, suppose that a similarity algorithm (e.g., which can be based on artificial intelligence) compares the preferences, demographics, transaction histories, and/or QR code restrictions of user A with the preferences, demographics, transaction histories, and/or QR code restrictions of user B and determines that user A is similar to user B (e.g., determines that the preferences, demographics, transaction histories, and/or QR code restrictions of user A differ from those of user B by no more than a predetermined margin). In such case, if user A approves/authorizes one or more changes to one or more of his/her electronic personas, various embodiments of the subject innovation can recommend/suggest that the same and/or similar changes be made to one or more of the electronic personas of user B. In some cases, various embodiments of the subject innovation can automatically perform such changes to the one or more electronic personas of user B.

In various embodiments of the subject innovation, the QR code system 102 (e.g., the code generation component 122) can encode, encrypt, and/or embed within an electronically generated and/or displayed QR code a digital watermark. In various aspects, a digital watermark can be any suitable marker, symbol, token, and/or visual pattern that can be hidden within a QR code and that can be used to verify the authenticity and/or integrity of the QR code. In various cases, any suitable digital watermarking techniques can be implemented so that the digital watermark can be included in an original electronic display and/or image of a QR code and/or so that the digital watermark can be not included in a copied and/or screen-captured electronic display and/or image of the QR code. For example, the POS device 108 can expect to detect (e.g., via any suitable decryption technique) a digital watermark in the QR code 702 as electronically displayed by the smart device 104. If the POS device 108 does detect such a digital watermark in the QR code 702 as electronically displayed by the smart device 104, the POS device 108 can determine that the QR code 702 is valid and/or that the smart device 104 authentically generated the QR code 702. If, however, the POS device 108 does not detect such a digital watermark in the QR code 702 as electronically displayed by the smart device 104, the POS device 108 can determine that the QR code 702 is invalid and/or that the smart device 104 did not authentically generate the QR code 702 (e.g., in such case, it is possible that the smart device 104 screen-captured the QR code 702 from its true owner). In this way, digital watermarks can be incorporated into QR codes to improve safety, security, and/or privacy of transactions.

As described throughout, various embodiments of the subject innovation can electronically generate enhanced and/or enriched QR codes in real-time in order to facilitate a current transaction between a buyer/customer (e.g., the user of the smart device 104) and a seller/merchant. In various aspects, embodiments of the subject innovation can electronically generate such QR codes ahead of time and/or prior to the initiation of a current transaction. Specifically, in some cases, embodiments of the subject innovation can employ any suitable machine learning model/algorithm that can receive specified input information pertaining to the user of the smart device 104 and that can produce as output a prediction and/or inference indicating a future transaction that is likely to be initiated by the user of the smart device 104. In various aspects, embodiments of the subject innovation can electronically generate a QR code based on the predicted and/or inferred future transaction. In various instances, the machine learning model/algorithm can receive as input any suitable information regarding the user of the smart device 104, such as product/service preferences of the user of the smart device 104 (e.g., the preference information 2902), purchase history and/or transaction history and/or browsing history of the user of the smart device 104 (e.g., the biographical information 2906), social media posts and/or social media accounts associated with the user of the smart device 104, online shopping carts associated with the user of the smart device 104, and/or any other suitable information pertaining to the user of the smart device 104. As mentioned above, based on such input data, the machine learning model/algorithm can predict and/or infer a future transaction that is likely to be engaged in by the user of the smart device 104 (e.g., can predict and/or infer a merchant that the user of the smart device 104 is likely to visit, can predict and/or infer a geo-location of the merchant, can predict and/or infer a time/date on which the user of the smart device 104 is likely to visit the merchant, can predict and/or infer a product/service that the user of the smart device is likely to purchase from the merchant, and/or can predict and/or infer a price that the user of the smart device 104 is likely to pay to the merchant). In various aspects, an appropriate QR code can be electronically generated based on such predicted and/or inferred information (e.g., the QR code can be generated ahead of time so as to represent an identifier of the predicted/inferred merchant, so as to represent an indication of the predicted/inferred geo-location, so as to represent an indication of the predicted/inferred time/date, so as to represent an indication of the predicted/inferred product/service, and/or so as to represent an indication of the predicted/inferred price). In this way, machine learning and/or artificial intelligence can be leveraged to predict future transactions that are likely to occur and to preemptively generate and/or queue up QR codes for those future transactions. In some cases, embodiments of the subject innovation can generate a trust score, as described above, for the predicted/inferred future transaction, and can accordingly encode and/or embed within the generated and/or queued up QR codes preferences, contact information, and/or demographic/biographical information corresponding to and/or based on the trust score.

As described throughout, various embodiments of the subject innovation can electronically generate enhanced and/or enriched QR codes based on myriad types of information (e.g., the QR code system 102 can generate in real-time QR codes that contain, represent, symbolize, and/or otherwise correspond/correlate to financial instrument information, transaction context information, restriction-based information, and/or privacy-based information). In various other embodiments, however, a set of already-generated and/or already-prepared QR codes can be stored within a QR code vault (not shown in the figures). In such case, rather than generating in real-time QR codes, the QR code system 102 can, in some cases, select in real-time an already-generated QR code based on any suitable information (e.g., based on transaction context, based on biometric verification, and/or based on gesture activation). That is, in some cases, each already-generated QR code can correspond to and/or be triggered by a respective transaction context, a respective biometric identification, and/or a respective physical gesture/motion (e.g., as determined and/or inferred through the GPS 406, the clock 408, the camera 506, the beacon 410, the fingerprint scanner 2008, the microphone 2010, the accelerometer 2404, and/or and so on). So, in various instances, the QR code system 102 can determine, infer, and/or learn a transaction context, biometric identification, and/or physical gesture/motion as explained above, and can select and/or identify a suitable and/or corresponding QR code from the QR code vault based on the transaction context, biometric identification, and/or physical gesture/motion. The selected and/or identified QR code can then be displayed.

As described throughout, electronically generated and/or displayed QR codes can be optical bar codes of any suitable shape, any suitable dimensionality, and/or any suitable colors and/or combinations of colors. However, in various aspects, an electronically generated and/or displayed QR code can be any other suitable symbol and/or combination of symbols that can be used to cryptographically and/or secretly convey information. For example, in some cases, as explained above, an electronically generated QR code can be a matrix barcode. In other cases, however, an electronically generated QR code can comprise any other suitable symbols and/or images, such as emoticons, thumbnails, and/or so on. In other words, although the utility and/or functionality of a QR code can be achieved via a grid and/or matrix of black/white squares, such utility and/or functionality can also be achieved, in some cases, via any suitable visual images and/or symbols that can be deemed to correspond (such as by a crypto key) to particular meanings and/or to particular information.

As explained throughout, electronically generated and/or displayed QR codes can be implemented during transactional checkout procedures to facilitate payment for the provision of products/services. However, in some cases, electronically generated and/or displayed QR codes can be implemented during transactional check-in procedures, as well. For example, electronically generated and/or displayed QR codes can be used by customers to automatically check-in to restaurants without having to physically interact with a host/hostess and/or without having to physically wait in and/or physically enter the restaurant at all. In such cases, an electronically generated and/or displayed QR code can represent identification information of a group of customers that wishes to dine in a restaurant, a number of customers in the group, and/or food/menu preferences of the customers in the group, and the QR code can be presented to a QR code scanner that is outside of the restaurant. Upon scanning, the QR code scanner be informed of the identification information of the group, the number of customers in the group, and/or the preferences of the group. Accordingly, the group can be automatically included in a queue that is waiting to be seated at the restaurant.

As explained throughout, QR codes can be electronically generated and/or displayed in real-time in various embodiments of the subject innovation. In various aspects, as described herein, such QR codes can be based upon electronic signals received by a beacon that is at or near the POS device 108. Indeed, as explained above, the beacon 410 can, in some cases, communicate various types of information to the QR code system 102, such as geo-location of a transaction, time/date of a transaction, products/services involved in a transaction, prices/values involved in a transaction, and/or identifiers of the merchant facilitating the transaction. In various aspects, as mentioned above, such information can be embedded and/or incorporated into a QR code (e.g., such that transaction context information is communicated and/or represented by the QR code). In other embodiments, however, as mentioned above, a set of already-generated QR codes can be stored and/or maintained within a QR code vault. In such cases, each QR code in the set of already-generated QR codes can be dedicated to particular transaction contexts (e.g., bound to particular locations, bound to particular times/dates, bound to particular products/services, bound to particular prices/values, bound to particular merchants). So, in various cases, a suitable and/or corresponding QR code can be automatically selected from the QR code vault based on the transaction context information provided by the beacon 410. In such cases, the beacon 410 can be considered as queuing up the selected QR code and/or queuing up the transaction on the smart device 104. In other words, rather than requiring the user of the smart device 104 to manually select which QR code in the QR code vault to use for a given transaction, the QR code system 102 can automatically select an appropriate QR code as a function of the context information that is provided by the beacon 410.

In various aspects described above, embodiments of the subject innovation can involve receiving manual input from the user of the smart device 104. In various cases, such manual input can be facilitated by any suitable human-interface apparatus (e.g., buttons, keyboard, keypad, touchscreen, voice command, motion-based commands, and/or so on). That is, various embodiments of the subject innovation can include any suitable graphical user interfaces, application programming interfaces, and/or human-interface devices.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 39:
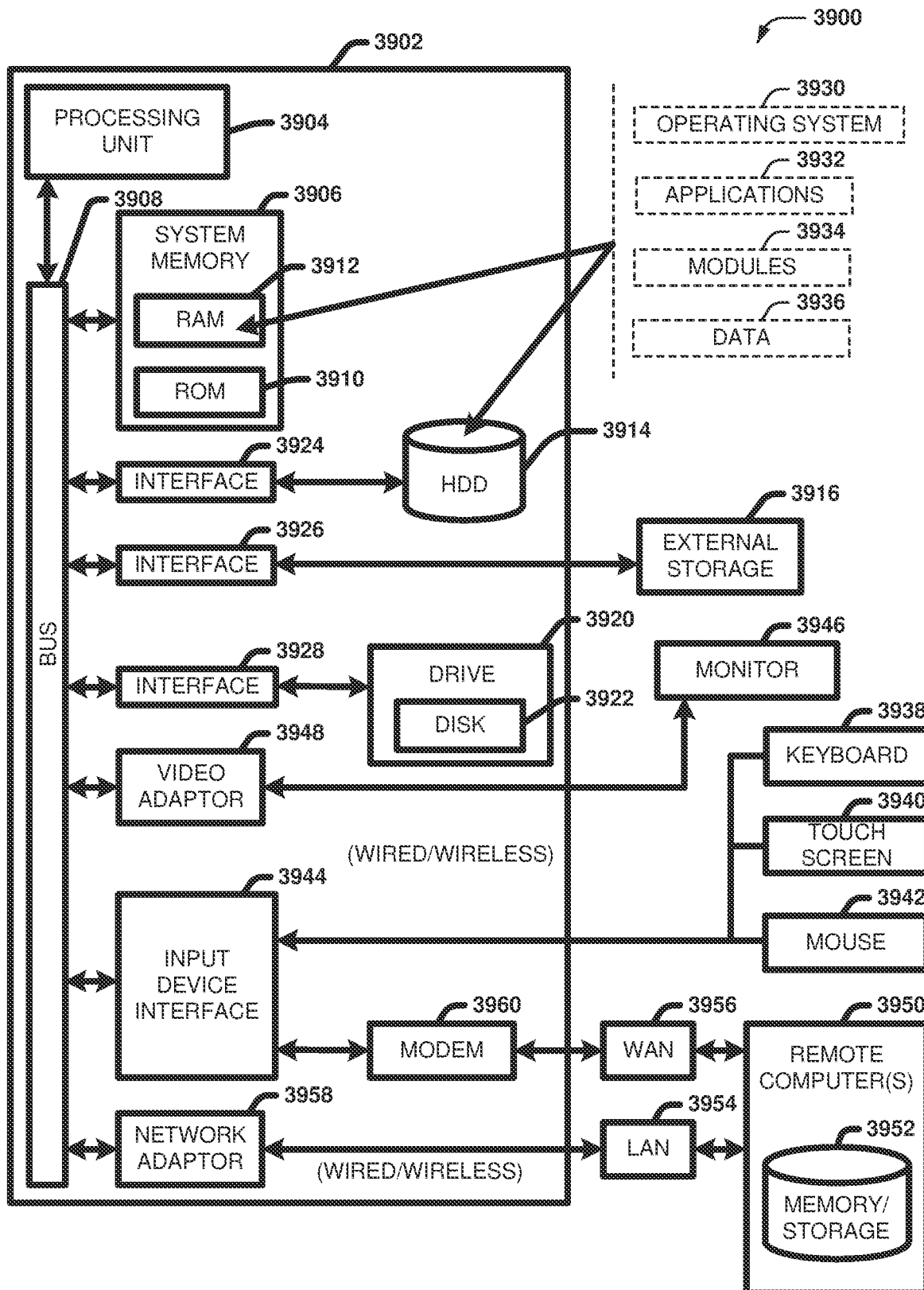
FIG. 39 illustrates a block diagram of an example, non-limiting operating environment in which one or more embodiments described herein can be facilitated.

In order to provide additional context for various embodiments described herein, FIG. 39 and the following discussion are intended to provide a brief, general description of a suitable computing environment 3900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 39, the example environment 3900 for implementing various embodiments of the aspects described herein includes a computer 3902, the computer 3902 including a processing unit 3904, a system memory 3906 and a system bus 3908. The system bus 3908 couples system components including, but not limited to, the system memory 3906 to the processing unit 3904. The processing unit 3904 can be any of various commercially available processors. Dual microprocessors and other multi-processor architectures can also be employed as the processing unit 3904.

The system bus 3908 can be any of several types of bus structure that can further interconnect to a memory bus (with or without a memory controller), a peripheral bus, and a local bus using any of a variety of commercially available bus architectures. The system memory 3906 includes ROM 3910 and RAM 3912. A basic input/output system (BIOS) can be stored in a non-volatile memory such as ROM, erasable programmable read only memory (EPROM), EEPROM, which BIOS contains the basic routines that help to transfer information between elements within the computer 3902, such as during startup. The RAM 3912 can also include a high-speed RAM such as static RAM for caching data.

The computer 3902 further includes an internal hard disk drive (HDD) 3914 (e.g., EIDE, SATA), one or more external storage devices 3916 (e.g., a magnetic floppy disk drive (FDD) 3916, a memory stick or flash drive reader, a memory card reader, etc.) and a drive 3920, e.g., such as a solid state drive, an optical disk drive, which can read or write from a disk 3922, such as a CD-ROM disc, a DVD, a BD, etc. Alternatively, where a solid state drive is involved, disk 3922 would not be included, unless separate. While the internal HDD 3914 is illustrated as located within the computer 3902, the internal HDD 3914 can also be configured for external use in a suitable chassis (not shown). Additionally, while not shown in environment 3900, a solid state drive (SSD) could be used in addition to, or in place of, an HDD 3914. The HDD 3914, external storage device(s) 3916 and drive 3920 can be connected to the system bus 3908 by an HDD interface 3924, an external storage interface 3926 and a drive interface 3928, respectively. The interface 3924 for external drive implementations can include at least one or both of Universal Serial Bus (USB)

and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 3902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 3912, including an operating system 3930, one or more application programs 3932, other program modules 3934 and program data 3936. All or portions of the operating system, applications, modules, and/or data can also be cached in the RAM 3912. The systems and methods described herein can be implemented utilizing various commercially available operating systems or combinations of operating systems.

Computer 3902 can optionally comprise emulation technologies. For example, a hypervisor (not shown) or other intermediary can emulate a hardware environment for operating system 3930, and the emulated hardware can optionally be different from the hardware illustrated in FIG. 39. In such an embodiment, operating system 3930 can comprise one virtual machine (VM) of multiple VMs hosted at computer 3902. Furthermore, operating system 3930 can provide runtime environments, such as the Java runtime environment or the .NET framework, for applications 3932. Runtime environments are consistent execution environments that allow applications 3932 to run on any operating system that includes the runtime environment. Similarly, operating system 3930 can support containers, and applications 3932 can be in the form of containers, which are lightweight, standalone, executable packages of software that include, e.g., code, runtime, system tools, system libraries and settings for an application.

Further, computer 3902 can be enable with a security module, such as a trusted processing module (TPM). For instance with a TPM, boot components hash next in time boot components, and wait for a match and/or correspond to of results to secured values, before loading a next boot component. This process can take place at any layer in the code execution stack of computer 3902, e.g., applied at the application execution level or at the operating system (OS) kernel level, thereby enabling security at any level of code execution.

A user can enter commands and information into the computer 3902 through one or more wired/wireless input devices, e.g., a keyboard 3938, a touch screen 3940, and a pointing device, such as a mouse 3942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 3904 through an input device interface 3944 that can be coupled to the system bus 3908, but can be connected by other interfaces, such as a parallel port, an IEEE 1394 serial port, a game port, a USB port, an IR interface, a BLUETOOTH® interface, etc.

A monitor 3946 or other type of display device can be also connected to the system bus 3908 via an interface, such as a video adapter 3948. In addition to the monitor 3946, a computer typically includes other peripheral output devices (not shown), such as speakers, printers, etc.

The computer 3902 can operate in a networked environment using logical connections via wired and/or wireless communications to one or more remote computers, such as a remote computer(s) 3950. The remote computer(s) 3950 can be a workstation, a server computer, a router, a personal computer, portable computer, microprocessor-based entertainment appliance, a peer device or other common network node, and typically includes many or all of the elements described relative to the computer 3902, although, for purposes of brevity, only a memory/storage device 3952 is illustrated. The logical connections depicted include wired/wireless connectivity to a local area network (LAN) 3954 and/or larger networks, e.g., a wide area network (WAN) 3956. Such LAN and WAN networking environments are commonplace in offices and companies, and facilitate enterprise-wide computer networks, such as intranets, all of which can connect to a global communications network, e.g., the Internet.

When used in a LAN networking environment, the computer 3902 can be connected to the local network 3954 through a wired and/or wireless communication network interface or adapter 3958. The adapter 3958 can facilitate wired or wireless communication to the LAN 3954, which can also include a wireless access point (AP) disposed thereon for communicating with the adapter 3958 in a wireless mode.

When used in a WAN networking environment, the computer 3902 can include a modem 3960 or can be connected to a communications server on the WAN 3956 via other means for establishing communications over the WAN 3956, such as by way of the Internet. The modem 3960, which can be internal or external and a wired or wireless device, can be connected to the system bus 3908 via the input device interface 3944. In a networked environment, program modules depicted relative to the computer 3902 or portions thereof, can be stored in the remote memory/storage device 3952. It will be appreciated that the network connections shown are example and other means of establishing a communications link between the computers can be used.

When used in either a LAN or WAN networking environment, the computer 3902 can access cloud storage systems or other network-based storage systems in addition to, or in place of, external storage devices 3916 as described above, such as but not limited to a network virtual machine providing one or more aspects of storage or processing of information. Generally, a connection between the computer 3902 and a cloud storage system can be established over a LAN 3954 or WAN 3956 e.g., by the adapter 3958 or modem 3960, respectively. Upon connecting the computer 3902 to an associated cloud storage system, the external storage interface 3926 can, with the aid of the adapter 3958 and/or modem 3960, manage storage provided by the cloud storage system as it would other types of external storage. For instance, the external storage interface 3926 can be configured to provide access to cloud storage sources as if those sources were physically connected to the computer 3902.

The computer 3902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 40:
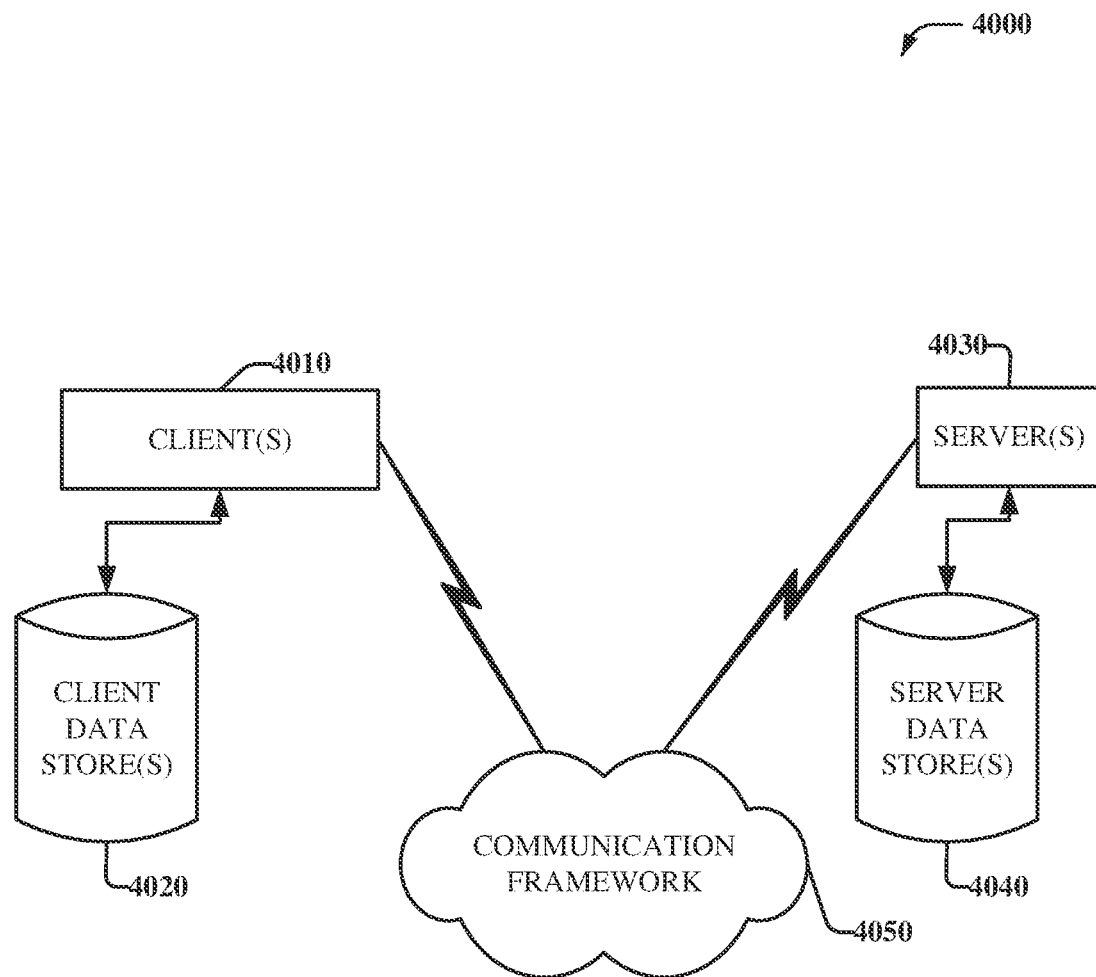
FIG. 40 illustrates an example networking environment operable to execute various implementations described herein.

FIG. 40 is a schematic block diagram of a sample computing environment 4000 with which the disclosed subject matter can interact. The sample computing environment 4000 includes one or more client(s) 4010. The client(s) 4010 can be hardware and/or software (e.g., threads, processes, computing devices). The sample computing environment 4000 also includes one or more server(s) 4030. The server(s) 4030 can also be hardware and/or software (e.g., threads, processes, computing devices). The servers 4030 can house threads to perform transformations by employing one or more embodiments as described herein, for example. One possible communication between a client 4010 and a server 4030 can be in the form of a data packet adapted to be transmitted between two or more computer processes. The sample computing environment 4000 includes a communication framework 4050 that can be employed to facilitate communications between the client(s) 4010 and the server(s) 4030. The client(s) 4010 are operably connected to one or more client data store(s) 4020 that can be employed to store information local to the client(s) 4010. Similarly, the server(s) 4030 are operably connected to one or more server data store(s) 4040 that can be employed to store information local to the servers 4030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device, comprising:
  a processor that executes computer-executable instructions stored in a memory, which causes the processor to:
    receive a signal from an electronic beacon of a point-of-sale device,
      wherein the point-of-sale device is an in-store device including a point-of-sale device processor,
      wherein the signal includes first information associated with a transaction;
    detect, via an accelerometer, a first motion of the mobile device;
    determine that the first motion corresponds to the financial instrument;
    in response to receiving the signal from the electronic beacon, generate a quick response (QR) code encoding:
      a second information comprising the first information received via the signal; and
      a financial instrument information associated with a user;
      wherein the QR code is generated based on at least one rule or restriction associated with at least two of a user, a first merchant, or the transaction;
      wherein the QR code is correlated to the financial instrument based on the determination that the first motion corresponds to the first financial instrument;
    instruct to render the QR code on an electronic display that is scannable by the point-of-sale device,
      wherein scanning the QR code instructs the point-of-sale device to:
        determine whether the second information corresponds to the first information; and
    transmit, based on a determination that the second information corresponds to the first information, the second information encoded in the QR code, the transaction information encoded in the QR code and the first information to a payment processor; and
    receive a transaction confirmation, from the payment processor, based on a verification of the transaction completed using the QR code.

2. The mobile device of claim 1, wherein the signal from the electronic beacon further indicates a first geo-location stamp, wherein the first geo-location stamp is embedded within the QR code, wherein the point-of-sale device further transmits a second geo-location stamp to the payment processor, and wherein the verification is further based on determining that the first geo-location stamp embedded within the QR code corresponds to the second geo-location stamp transmitted by the point-of-sale device.

3. The mobile device of claim 1, wherein the signal from the electronic beacon further indicates a first time stamp, wherein the first time stamp is embedded within the QR code, wherein the point-of-sale device further transmits a second time stamp to the payment processor, and wherein the verification is further based on determining that the first time stamp embedded within the QR code corresponds to the second time stamp transmitted by the point-of-sale device.

4. The mobile device of claim 1, wherein the QR code is correlated to a first product or service, wherein the point-of-sale device further transmits an identifier for the first product or service to the payment processor, and wherein the verification is further based on determining that the QR code corresponds to the first product or service.

5. The mobile device of claim 1, wherein the QR code is associated with a transaction amount restriction, and wherein the verification is further based on determining that a transaction amount of the transaction satisfies the transaction amount restriction.

6. The mobile device of claim 1, wherein the processor is triggered to render the QR code based on detection of a predetermined gesture by an accelerometer that is operatively coupled to the processor.

7. A computer-implemented method, comprising:
  receiving, by a device operatively coupled to a processor, a signal from an electronic beacon of a point-of-sale device,
    wherein the point-of-sale device is an in-store device including a point-of-sale device processor, wherein the signal includes first information associated with a transaction;
detecting, by the device, a first motion via an accelerometer coupled to the device;
determining, by the device, that the first motion corresponds to a first product or service;
in response to receiving the signal from the electronic beacon, generating, by the device, a quick response (QR) code encoding:
  a second information comprising the first information received via the signal; and
  a financial instrument information associated with a user;
    wherein the QR code is generated based on at least one rule or restriction associated with at least two of a user, a first merchant or the transaction;
    wherein the QR code is correlated to the first product or service based on the determination that the first motion corresponds to the first product or service;
instructing to render, by the device, the QR code on an electronic display that is scannable by the point-of-sale device,
  wherein scanning the QR code instructs the point-of-sale device to:
    determine whether the second information corresponds to the first information; and
    transmit, based on a determination that the second information corresponds to the first information, the second information encoded in the QR code, the transaction information encoded in the QR code and the first information to a payment processor; and
receiving, by the device, from the payment processor, a transaction confirmation based on a verification of the transaction completed using the QR code.

8. The computer-implemented method of claim 7, wherein the QR code is correlated to a first geographic range,
  wherein the point-of-sale device further transmits an identifier for the first geographic range to the payment processor, and
  wherein the verification is further based on determining that the QR code corresponds to the first geographic range.

9. The computer-implemented method of claim 7, wherein the QR code is correlated to a first temporal window,
  wherein the point-of-sale device further transmits an identifier for the first temporal window to the payment processor, and
  wherein the verification is further based on determining that the QR code corresponds to the first temporal window.

10. The computer-implemented method of claim 7, further comprising:
  detecting, by the device, a first motion via an accelerometer coupled to the device;
  determining, by the device, that the first motion corresponds to a first transaction amount; and
  correlating, by the device, the QR code to the first transaction amount.

11. The computer-implemented method of claim 7, wherein the rendering the QR code is triggered based on detecting, by the device, a predetermined gesture by an accelerometer.

12. The computer-implemented method of claim 7, wherein the rendering the QR code is triggered based on detecting a predetermined biometric signature by a biometric sensor.

13. A system, comprising:
  a processor that executes computer-executable instructions stored in a memory, which causes the processor to:
    receive a quick response (QR) code from a point-of-sale device,
      wherein the point-of-sale device is an in-store device including a point-of-sale device processor,
      wherein the QR code encodes:
        a first information associated with a transaction; and
        a financial instrument information associated with a user;
      wherein the QR code is generated based on at least one rule or restriction associated with the user, a first merchant, and the transaction;
      wherein the QR code is received by the point-of-sale device from a mobile device associated with the user;
      wherein the mobile device detected, via an accelerometer, a first motion of the mobile device;
      wherein the mobile device determined that the first motion corresponds to the financial instrument; and
      wherein the QR code is correlated to the financial instrument based on the determination that the first motion corresponds to the financial instrument;
    receive a second information associated with the first transaction from the point-of-sale device;
    determine whether the first information corresponds to the second information; and
    process the financial instrument information based on determining that the first information corresponds to the second information.

14. The system of claim 13, wherein the QR code further corresponds to accelerometer data indicating a first time at which a detected motion occurs,
  wherein the detected motion corresponds to a presentation of an electronic display rendering the QR code to the point-of-sale device, and
  wherein the computer-executable instructions are further executable to cause the processor to:
    receive a time stamp from the point-of-sale device, wherein the time stamp corresponds to a second time at which the point-of-sale device scans the QR code;
    determine whether the accelerometer data corresponds to the time stamp; and
    process the financial instrument information based on determining that the accelerometer data corresponds to the time stamp.

15. The system of claim 13, wherein the QR code further corresponds to global positioning data indicating a first geo-location at which a detected motion occurs, wherein the detected motion corresponds to a presentation of an electronic display rendering the QR code to the point-of-sale device, and wherein the computer-executable instructions are further executable to cause the processor to:
  receive a geo-location stamp from the point-of-sale device, wherein the geo-location stamp corresponds to a second geo-location at which the point-of-sale device scans the QR code;

determine whether the global positioning data corresponds to the geo-location stamp; and process the financial instrument information based on determining that the global positioning data corresponds to the geo-location stamp.

16. The system of claim 13, wherein the computer-executable instructions are further executable to cause the processor to:

interpret information embedded within the QR code based on accelerometer data that indicates a detected gesture that accompanies presentation of the QR code to the point-of-sale device.

17. The system of claim 13, wherein the QR code is visually rendered on an electronic display that is scanned by the point-of-sale device, and wherein the visual rendering is based on a signal from an electronic beacon at the point-of-sale device.

* * * * *